US008180649B2

(12) United States Patent
Graff

(10) Patent No.: US 8,180,649 B2
(45) Date of Patent: *May 15, 2012

(54) COMPUTER CONTROL OF NON-DEBT FUNDING SYSTEM FOR HOME FINANCE

(75) Inventor: Richard A Graff, Chicago, IL (US)

(73) Assignee: Ross/Graff Holdings LLC, Chicago, IL (US)

( * ) Notice: Subject to any disclaimer, the term of this patent is extended or adjusted under 35 U.S.C. 154(b) by 1082 days.

This patent is subject to a terminal disclaimer.

(21) Appl. No.: 10/580,083

(22) PCT Filed: Nov. 19, 2004

(86) PCT No.: PCT/US2004/039041
§ 371 (c)(1),
(2), (4) Date: Dec. 27, 2007

(87) PCT Pub. No.: WO2005/052750
PCT Pub. Date: Jun. 9, 2005

(65) Prior Publication Data
US 2011/0246243 A9    Oct. 6, 2011

Related U.S. Application Data

(63) Continuation-in-part of application No. 10/719,474, filed on Nov. 23, 2003, now Pat. No. 7,295,987.

(51) Int. Cl.
G06Q 10/00    (2006.01)
(52) U.S. Cl. ........................................................ 705/1.1
(58) Field of Classification Search .................... 705/1.1
See application file for complete search history.

(56) References Cited

U.S. PATENT DOCUMENTS

| 5,802,501 A | 9/1998 | Graff | 705/36 |
|---|---|---|---|
| 6,167,384 A | 12/2000 | Graff | |
| 6,192,347 B1 * | 2/2001 | Graff | 705/36 R |
| 6,393,406 B1 | 5/2002 | Eder | |
| 6,760,709 B2 | 7/2004 | Graff | |
| 7,908,202 B2 * | 3/2011 | Graff | 705/37 |
| 2002/0138419 A1 | 9/2002 | Melone et al. | 705/38 |

(Continued)

FOREIGN PATENT DOCUMENTS
JP    2003141355 A    5/2003

OTHER PUBLICATIONS

Web Pages of Projector Center labeled as Projector Center, 2000-2002, projectorcenter.com, http://web.archive.org/web/20021026135235/http://www.projectorcenter.com/lease_end.asp, printed Jul. 19, 2005.

(Continued)

Primary Examiner — Naresh Vig
(74) Attorney, Agent, or Firm — Peter K. Trzyna, Esq.

(57) ABSTRACT

Machine for controlling a system changing electrical signals to separately value components temporally decomposed from residential property, the computer apparatus including: a computer system, arranged for receiving information into a memory, the data representing the residential property, the computer system further comprising: logic means controlling the computer system to change the data to produce modified signals representing a separate valuation of each of a plurality of components temporally decomposed from the residential property, the components including a residential estate for years interest and a residential remainder interest; and an output device connected to convert the modified signals into documentation including the respective valuation of each of the components.

59 Claims, 18 Drawing Sheets

U.S. PATENT DOCUMENTS

2003/0225665 A1  12/2003  Gross et al. .................. 705/36
2003/0229555 A1  12/2003  Marlowe-Noren ............ 705/38

OTHER PUBLICATIONS

"Office Action" USPTO, Mailed: Jun. 20, 2005, for U.S. Appl. No. 10/719,474, filed Nov. 21, 2003.
"Office Action" USPTO, Mailed: Feb. 14, 2006, for U.S. Appl. No. 10/719,474, filed Nov. 21, 2003.
"Office Action" USPTO, Mailed: Aug. 28, 2006, for U.S. Appl. No. 10/719,474, filed Nov. 21, 2003.
"Notice of Allowance" USPTO, for U.S. Appl. No. 10/719,474, filed Nov. 21, 2003.
"Principles of Shariah Concerning Islamic Investment Funds," USMANI, Mufti Tai, http://web.archive.org/web/20010126191600 Feb. 6, 2006 9 pages.
Seyad Shariat Finance, Mar. 26, 2003, printed through www.archive.org.
Shariah Financing Eases Muslims' Minds, Harrison, David, Aug. 21, 2002.
"*Muniauction, Inc.* v. *Thomson Corporation*". United States Court of Appeals for the Federal Circuit, 2007-1485. pp. 1-20.
Richard A. Graff, "Augmented System and Methods for Computing to Support Fractional Contingent Interests in Property" filed on Jul. 6, 2004. pp. 1-458. USA.
Peter K. Trzyna, "Preliminary Amendment" filed on Jun. 20, 2008, in U.S. Appl. No. 10/885,569, filed Jul. 6, 2004. pp. 1-12. USA.
Susanna M. Meinecke Diaz, "Office Action" mailed on Jun. 26, 2008, in U.S. Appl. No. 10/885,569, filed Jul. 6, 2004. pp. 1-38. USA.
Peter K. Trzyna, "Response" filed on Jul. 9, 2008, in U.S. Appl. No. 10/885,569, filed Jul. 6, 2004. pp. 1-2. USA.
Peter K. Trzyna, "Response to Notice of Non-Responsive Reply" filed on Nov. 14, 2008, in U.S. Appl. No. 10/885,569, filed Jul. 6, 2004. pp. 1-5. USA.
Susanna M. Meinecke Diaz, "Office Action" mailed on Apr. 17, 2009, in U.S. Appl. No. 10/885,569, filed Jul. 6, 2004. pp. 1-19. USA.
Susanna M. Meinecke Diaz, "Supplemental Office Action" mailed on Dec. 3, 2009, in U.S. Appl. No. 10/885,569, filed Jul. 6, 2004. pp. 1-18. USA.
Peter K. Trzyna, "Amendment and Response" filed on May 24, 2010, in U.S. Appl. No. 10/885,569, filed Jul. 6, 2004. pp. 1-59. USA.
Peter K. Trzyna, "Amendment" filed on Jul. 22, 2010, in U.S. Appl. No. 10/885,569, filed Jul. 6, 2004. pp. 1-3. USA.
Susanna M. Meinecke Diaz, "Office Action-Final Rejection" mailed on Aug. 4, 2010, in U.S. Appl. No. 10/885,569, filed Jul. 6, 2004. pp. 1-36. USA.
Peter K. Trzyna, "Response and Request for Reconsideration" filed on Oct. 4, 2010, in U.S. Appl. No. 10/885,569, filed Jul. 6, 2004. pp. 1-32. USA.
Peter K. Trzyna, "Appeal Brief" filed on Sep. 6, 2011, in U.S. Appl. No. 10/885,569, filed Jul. 6, 2004. pp. 1-114. USA.
Hawkins, George B. "Using Business Valuation Techniques to Quantify Discounts for Fractional Interests in Real Estate." Banister Financial, Inc. Reprinted from the Spring 1997 Issue.
Schlenger et al. "Discount Available When Property Was Held Partly Outright and Partly in QTIP Trust." Estate Planning, vol. 23, No. 9, p. 435(2), Nov. 1996.
Davidson, Brad. Valuation of Fractional Interests in Real Estate Limited Partnerships—Another Appraisal Journal, vol. 60, No. 2, p. 184(11), Apr. 1992.

\* cited by examiner

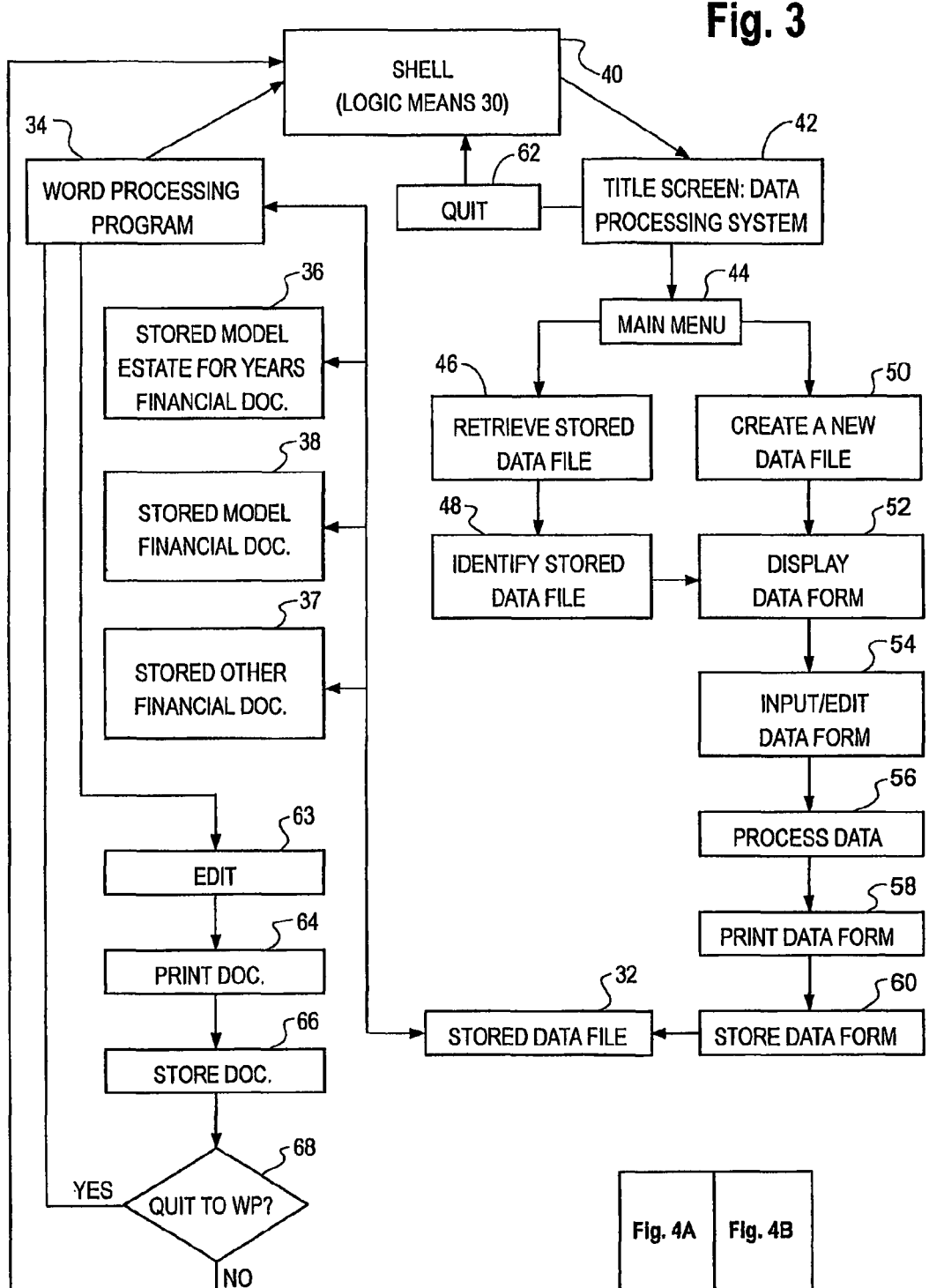
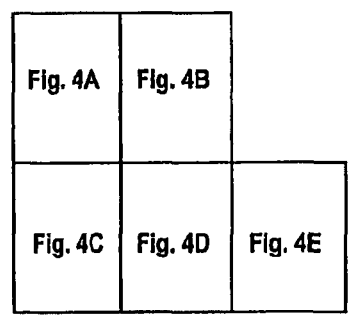

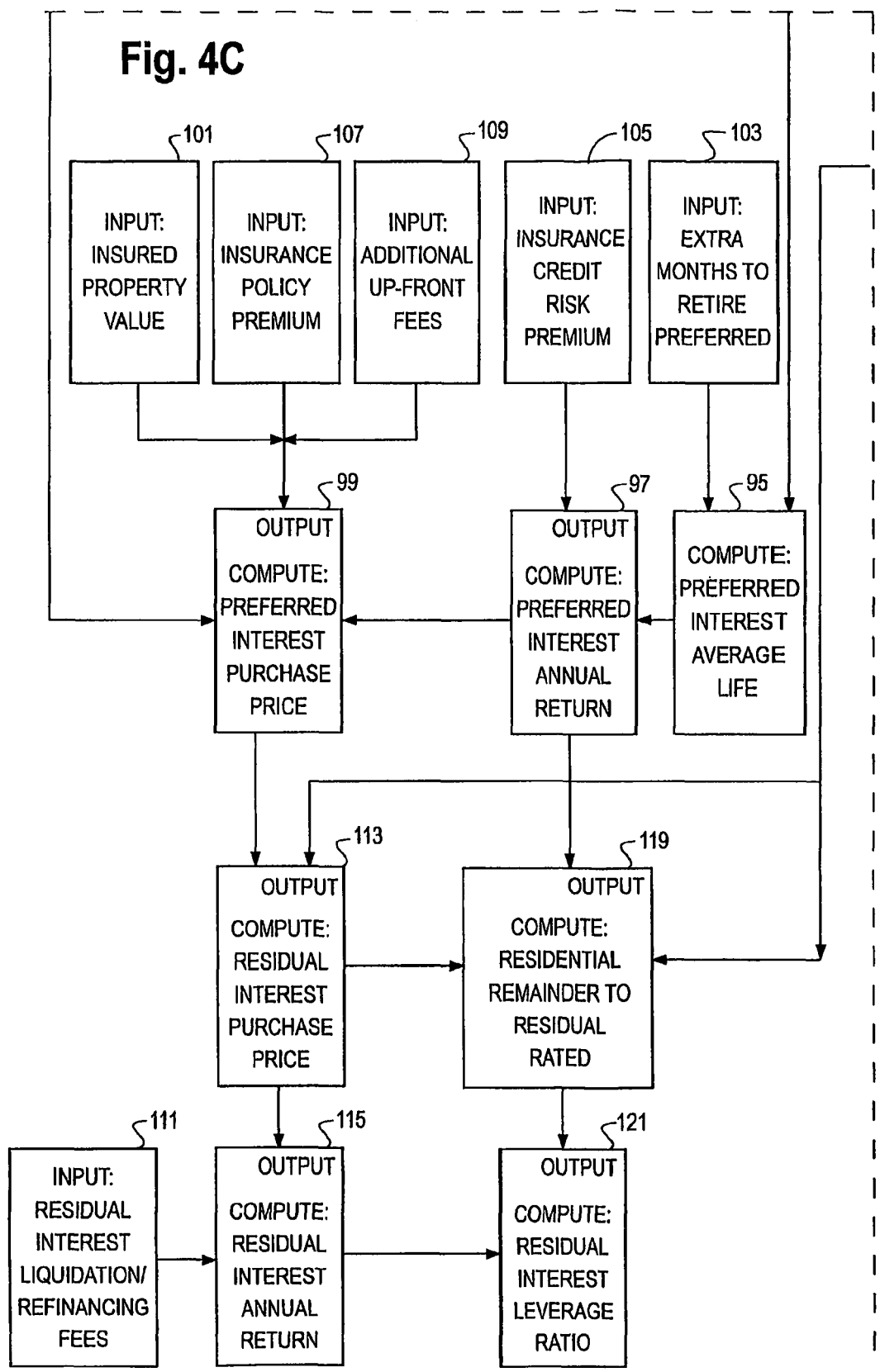

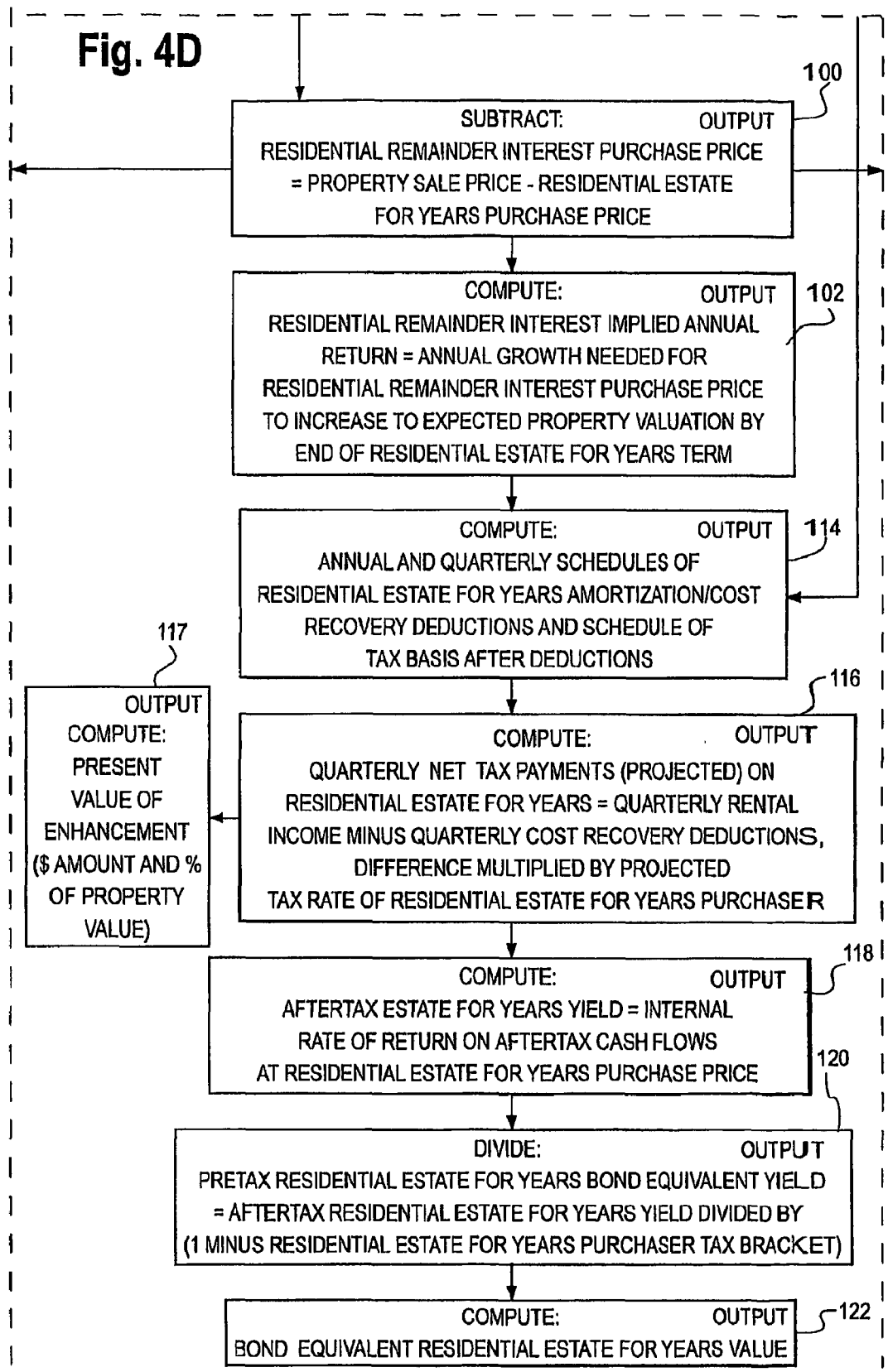

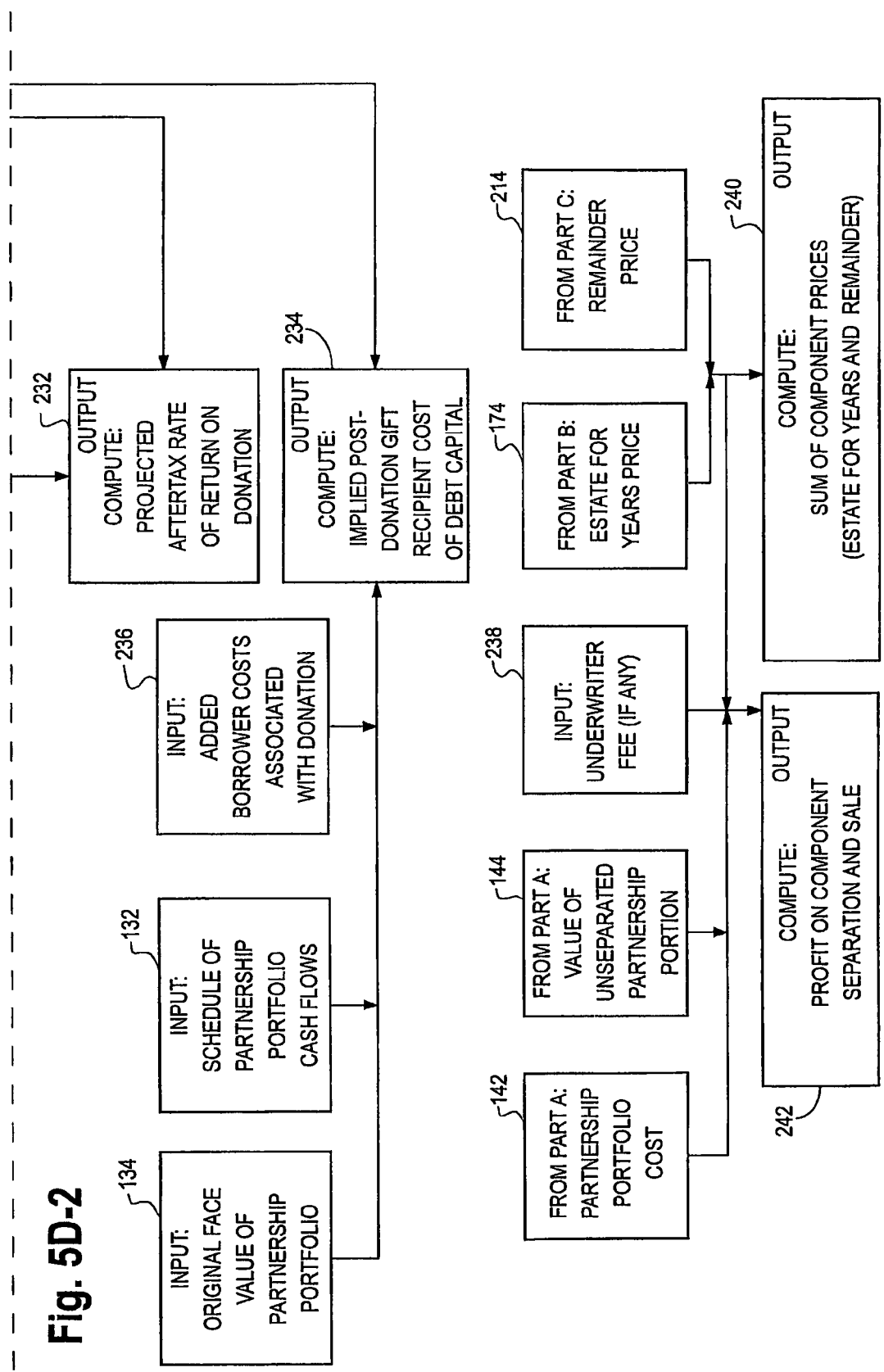

COMPUTER CONTROL OF NON-DEBT FUNDING SYSTEM FOR HOME FINANCE

PRIORITY DATA

The present patent application is a 371 of international application PCT/US04/39041 filed Nov. 19, 2004, and is a continuation-in-part of Ser. No. 10/719,474 filed Nov. 21, 2003, and issued as U.S. Pat. No. 7,295,987 on Nov. 13, 2007. PCT/US04/39041 is a continuation-in-part of Ser. No. 10/719,474 filed Nov. 21, 2003, and issued as U.S. Pat. No. 7,295,987 on Nov. 13, 2007.

TECHNICAL FIELD

The technical field is computers and data processing systems. Depending on the implementation, there is apparatus, a method for use and method for making, and corresponding products produced thereby, as well as data structures, computer-readable media tangibly embodying program instructions, manufactures, and necessary intermediates of the foregoing. A control system of the foregoing governs the computer system, which in turn is applied to the financial fields of securities, real estate, and taxation in supporting securitization of property, preferably by its decomposition into at least two components, e.g., an estate for years and/or an augmented estate for years interest, and a remainder and/or a complementary remainder interest.

BACKGROUND ART

Problems with residential property finance are acute for the more than twenty million Islamic residents of the United States. The Shariah (Islamic religious law) forbids interest-bearing debt as a financing tool. This has long placed Muslims who wish to purchase a home but who don't have the resources for an all-cash purchase at a disadvantage. Although lease-based financial instruments have been developed recently by Islamic financial institutions that comply with the Shariah, such instruments cannot be securitized by the financial institutions as would take place routinely in the case of home mortgages. The inability to recycle capital via securitization limits the amount of capital available for such financings and increases the financing cost for homeowners relative to mortgage finance.

As a reflection in the technical arts, computer support and control therefore has not evolved beyond the limits of previous Shariah financing.

DISCLOSURE

A new financial product has been developed based on the concept that property value consists of separately valuable property rights that can be worth more when sold separately. In a manner of speaking, the whole can be less than the sum of its parts. With the development of a new financial product, a need has arisen for new machines and processes to use in bringing the product to market and sustaining it, and in turn control thereof.
(add independent claim language)

Industrial applicability is directed to computer control and implementation therefrom, as well as in computer networking. This is applicable to the computer industry and specifically to that portion used in industries such as finance, including real estate. While embodiments and modes have been disclosed, variations and changes may be made without departing from the spirit of what is indicated herein.

BRIEF DESCRIPTION OF THE DRAWINGS

FIG. 3 is a flow chart showing the logic of a logic means for controlling the computer system.

FIG. 4a-4e is a flow chart showing the data input, computational and other logic, and data output of the logic means for controlling the computer system.

MODES

Figure 1:
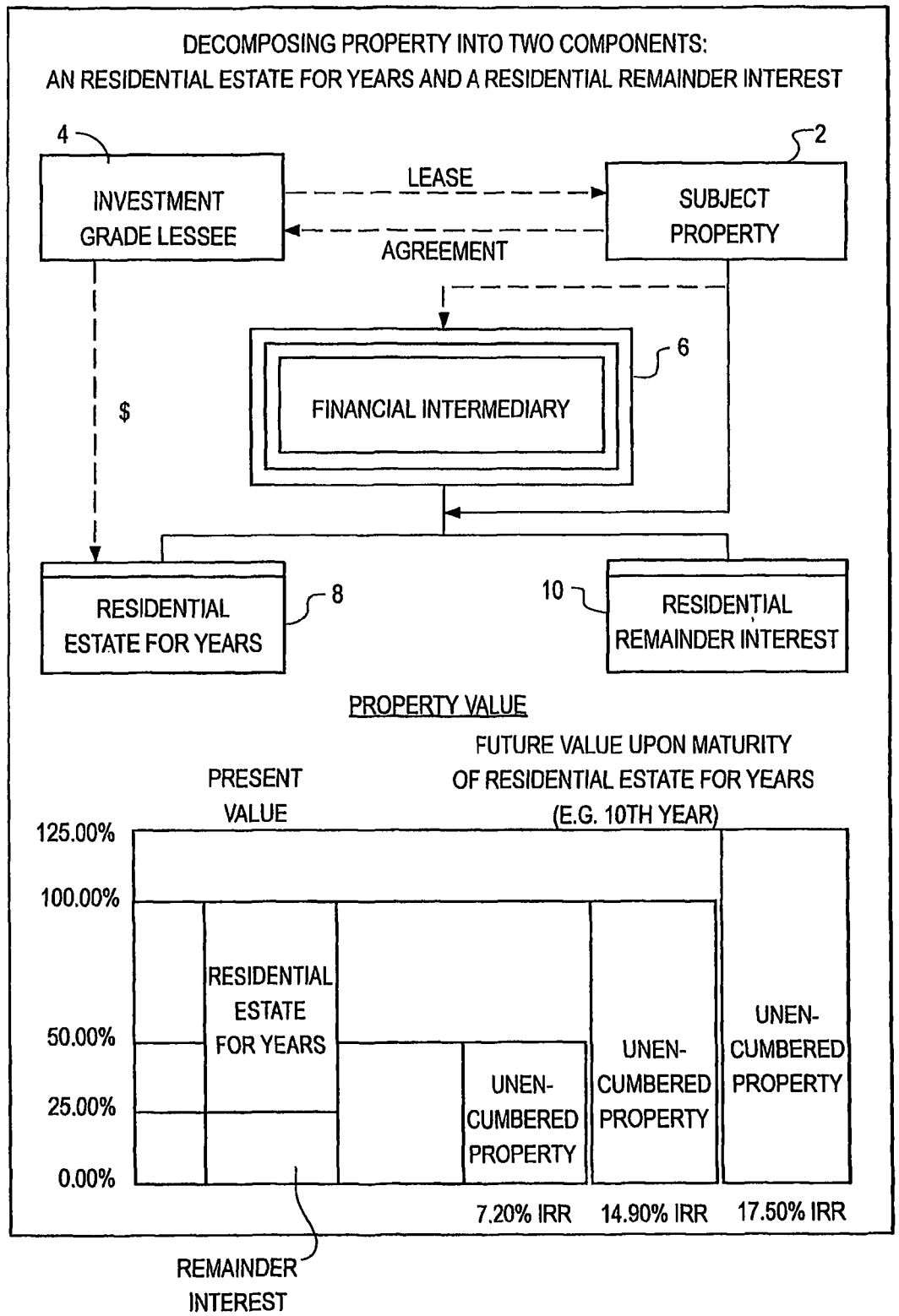
FIG. 1 is a graphic representation of a separated purchase transaction.

The accompanying drawings illustrate embodiments intended to illustrate and exemplify in a teaching manner.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow can be implemented in discrete circuits. Computer-readable media, as used herein can comprise at least one of a RAM, a ROM, a disk, an ASIC, and a PROM. Industrial applicability is clear from the description, and is also stated below.

By way of the following prophetic teaching, there is provided computer support, as in a data processing system, for implementing parts of, or from, a financial product or instrument to accomplish certain financial objectives. To understand the computer system and its control, consider first the context, e.g., the financial objectives and the financial product(s).

A. Real and Personal Property

As an example, in the case of property that is customarily leased by corporations, leased and unleased property have different investment characteristics. Ownership of leased property is a fixed-income asset with investment characteristics that depend upon lease covenants, the market for corporate debt, and the lessees' credit ratings. By contrast, ownership of unleased property is a speculative asset having investment characteristics that depend on the spot rental market for that type of property. Thus it is possible to split ownership of this type of property into at least two components, at least one of which is a fixed-income asset.

Consider real estate, for example, which can be divided into an estate for years and a remainder interest, which could be viewed as equity interests. Lenders can purchase the estate for years outright instead of writing a commercial mortgage on the whole property. Alternatively, a special purpose entity can be established to purchase the estate for years, and the lenders can purchase ownership or equity interests in the entity. Similarly, the other component—the remainder interest—can be purchased by real estate investors (or, again, the remainder interest can be purchased by a special purpose entity in which the real estate investors purchase equity or ownership interests) in lieu of the standard investment approach, in which the investor would purchase all rights to the property using some funds from a commercial loan. Examples of such special purpose entities include, but are not limited to, trusts, limited partnerships, and limited liability companies. The term of the estate for years can be determined by the parameters that describe the property, in particular by the remaining lengths of the terms of the existing leases.

For purposes herein, in those cases in which a special purpose entity is created to hold a component, for example, such as the estate for years or remainder interest, an equity interest in the component is intended to refer to an equity interest in the special purpose entity.

If the property is fully leased (or is almost fully leased), and the leases will not expire until after the estate for years has expired, then the estate for years has the investment characteristics of a fixed-income asset rather than of property. Under these circumstances, at least for real estate, insurance companies are allowed by regulators to treat the estate for years as a fixed-income investment, and to compute its value accordingly. In other words, the insurance companies value the estate for years based on cash flow characteristics of the leases and credit ratings of the tenants, and not based on the value of real estate or the risk in the real estate markets.

Due to an interplay of values for the property components and the needs of respective purchasers, including tax needs, it is frequently possible to sell the components of the property separately for more than the price that the property as a whole would command.

From the perspective of an investor who acquires the remainder interest, a purchaser of the estate for years has accepted an assignment of the lease payments for the term of the estate for years in return for financing the acquisition of the property by the remainder interest purchaser. From this perspective, the amount of financing provided is equal to the purchase price of the estate for years, the lease payments during the estate for years term completely amortize the financing, and the length of the financing term equals the term of the estate for years.

Unlike traditional mortgage finance, shorter financing terms (less than fifteen years) are not a problem under this structure for the remainder interest investor, because: (1) during the estate for years term, the investor does not incur any tax liabilities; and (2) taking possession of the property upon expiration of the estate for years is not a taxable event for the investor. In other words, the investor does not have any tax liability until there is an obligation to pay taxes on rent payments received after taking possession of the property at the expiration of the estate for years, and those rental payments provide the cash to meet the taxes due on those payments. Therefore, the estate for years term is irrelevant to the remainder interest investor, except insofar as the term determines the amount of financing the estate for years purchaser provides (the longer the estate for years term, the greater the amount of financing). In addition, upon expiration of the estate for years, the remainder interest investor owns the property outright (i.e., without any debt).

From the perspective of a financier, this financing product has no claim on the property investor (i.e., the remainder interest investor), but the strongest possible direct claim on the tenants, because the financier is the owner of record during the estate for years term. In other words, this financing product is more efficient than a commercial mortgage at matching the legal recourse claims in event of default with the asset that is actually being financed: tenant promises to pay future rent. The estate for years term can be as long as the existing leases are committed to run—typically ten years or less, although sometimes longer in the case of property that is fully leased for long terms. However, investor preferences may dictate an estate for years term that is significantly shorter than the longest lease term, and technical considerations may suggest an estate for years term that is slightly longer than the longest lease term.

In addition, ownership can be structured so that the transaction creates the estate for years and the remainder interest, in order to create the most favorable tax consequences for the financier and the property investor.

It is frequently the case that special purpose entities with one or more limited liability equity interests created to hold one or more components can enhance the value of equity interest(s) in the components. An opportunity for value enhancement can arise because direct ownership of an equity interest in tangible property can expose the owner to potentially unlimited legal liability as a result of events involving the property, whereas component ownership via an equity interest in the entity is a limited liability equity interest in the component. In other words, a special purpose entity with one or more limited liability equity interests can transform one or more components of a property into limited liability components, i.e., components with one or more limited liability equity interests. Thus market-based component valuation, in the case in which a component is held by an entity, involves both valuation of the investment characteristics of a component and the effect of the entity on the investment characteristics of the component.

Any additional tax liability created by existence of a special purpose entity that contains one or more components of a property detracts from the investment returns that flow from the property to investors in the components, resulting in a reduction in the market values of the relevant components. The loss of value is most significant in the case of United States federal tax liabilities, since United States federal tax rates are usually higher than corresponding state and local taxes. Thus an appropriate entity for purposes of holding estate for years and remainder interests is an entity that does not incur additional tax liabilities, at least at the United States federal tax level. A pass-through entity for United States federal tax purposes is an example of such an entity. An example of such a pass-through entity is a grantor trust.

Since an entity that holds one or more component interests in a property is not expected to retain significant amounts of income, another appropriate type of entity is an entity that is allowed a United States federal tax deduction for distributions to holders of equity interests in the entity.

In cases in which an entity holds one or more components of a property, the entity can be used to modify investment characteristics of the components without modifying underlying leases on the property. For example, put or call options on some equity interests in the entity can be inserted into the organizational document of the entity. In the case of fixed-income components, these can be used to add features that are sometimes found in United States government bonds and corporate bonds without approaching lessees to renegotiate the leases.

It is not necessary for a component to be purchased in its entirety by one investor. A component can be divided into shares so that investors can purchase fractional interests in the component (the fraction representing the fractional interest being a positive number less than or equal to one). In those cases in which there is a special purpose entity for the component, fractional interests in the component can be created by dividing the equity interest in the entity into shares with equal equity participation rights. This accords prospective investors the investment option of purchasing fractional interests in the component simply by purchasing fewer than the entire number of shares in the equity interest.

More generally, multiple classes of shares with various equity participation rights in an entity can be created, according investors the investment option of purchasing more general types of equity interests, e.q., in a component.

More particularly, an investor can purchase an equity interest (e.q., in a component) that is less than the entire equity interest (e.q., in the component). In the case wherein the entire equity interest is divided into fractional interests, each fractional interest is valued by multiplying the valuation of the entire equity interest by the fraction represented by the fractional interest. For example, in the case wherein the entire equity interest in the component is divided into more general types of equity interests, the equity interests may be valued by more general market-based techniques, such as by regarding an individual equity interest as a separate temporal component if the investment characteristics of the equity interest are those of a temporal component and valuing each such interest by the methodology introduced herein for valuing components. If one of these equity interests is then further subdivided into fractional subinterests, then each fractional subinterest is valued by multiplying the valuation of the entire equity interest by the fraction represented by the fractional subinterest.

An example of more general equity interests (e.q., in one or more remainder components) occurs in cases in which insurance is available to protect remainder component investors against the risk of a decline in property value below some specified value at some specified future time or time interval close to the expiration date of the estate for years term. Such insurance, known as residual value insurance, implies that the minimum possible return over the estate for years term for remainder component investors is greater than −100% so long as the insurer remains solvent, and that the value of the minimum possible investment return for the remainder component over the estate for years term is equal to the return value that will transform the remainder component purchase price into the insured minimum future property value. The existence of residual value insurance implies that the remainder component can in turn be decomposed into at least two types of equity interests, including a preferred equity interest that receives most or all of the protection of the residual value insurance and a residual equity interest that receives little or none of the protection of the residual value insurance.

The preferred equity interest may be viewed for investment purposes as a zero-coupon fixed-income asset, possibly with a bonus feature of an equity participation on the upside, with a bond term approximately equal to the estate for years term and a credit rating equal to the credit rating of the insurer. Accordingly, the preferred equity interest will be of interest primarily to fixed-income investors and the residual equity interest will be of interest primarily to equity investors. Such preferred/residual decompositions of remainder interests carve additional fixed-income assets out of property that are essentially independent of the fixed-income assets represented by the estate for years components.

Another example of a more general equity interest in property (e.q., in a component, for example, a remainder interest) is a contingent equity interest, e.q., a contingent equity interest that will only become an unconditional (or less-conditional, if there is at least one additional contingency) equity interest at some future date if some event or combination of events occurs or fails to occur, whose future occurrence is uncertain when the contingent interest is established. For example, the specified contingency can be the occurrence (or nonoccurrence) of the default conditions (or a subset of the default conditions) in one or more property leases, the occurrence (or nonoccurrence) of a further specified combination of which (e.q., the occurrence of any one of which) will activate the contingency. It follows that each specified contingency actually corresponds to at least two contingent equity interests: the primary equity interest, which is the contingent equity interest in the property that represents an equity interest in the property until and/or unless the specified contingency does in fact occur or fail to occur (e.q., an equity interest in the property subject to a condition subsequent), and the secondary equity interest, which is the contingent equity interest in the property that only represents an equity interest in the property once the specified contingency does in fact occur or fail to occur (e.q., an equity interest in the property subject to a condition precedent).

A secondary contingent equity interest in property (e.q., in a remainder component) that can only be activated by a specified set of lease default conditions (for example, a specified set of lease default conditions that includes the lease default conditions that relate to lessee bankruptcy) can be valuable to a property holder (e.q., an estate for years holder) if held as protection or supplemental protection against economic loss in event of lessee nonperformance. More particularly, in event of lessee default and/or bankruptcy, one or more secondary contingent property interest(s) can provide an equity property interest holder with loss protection or supplemental loss protection to legal remedies available from lease default provisions and/or bankruptcy law. For example, in event of lessee default and/or bankruptcy, secondary contingent remainder interest(s) can provide an estate for years holder with an equity property interest after expiration of the estate for years term in addition to legal remedies available from the estate for years interest alone (e.q., legal claims on the defaulting lessee and/or rights to re-lease the property during the estate for years term). However, if no lessee defaults occur during the estate for years term, then the secondary contingent interest never becomes an actual equity interest in the property, and hence never entitles the holder to any investment returns from the property.

An augmented interest in property can be viewed as an interest in property together with one or more secondary contingent interests. For example, a combination of an estate for years interest in property (or more than one estate for years interests in property) and at least one secondary contingent interest in the property (e.q., at least one secondary interest in at least one remainder interest in the property) can be viewed as an augmented estate for years interest that provides the holder with greater protection against economic loss due to lessee default than the corresponding protection against loss provided by an estate for years interest alone. Such an augmented estate for years is an additional example of a component temporally decomposed from property. In cases in which there is an augmented estate for years interest, the expression "complementary remainder interest" will refer in this description to the portion of the equity interest(s) in the property that is not included in at least one augmented estate for years interest. For example, the complementary remainder interest can include any primary contingent interest(s) that corresponds to the at least one secondary contingent interest included in the at least one augmented estate for years. An augmented estate for years interest and complementary remainder interest in a property can be viewed as an example of a temporal decomposition of the property that is an alternative and/or supplemental temporal decomposition to an estate for years interest and a remainder interest in the property.

As is the case with an estate for years, an augmented estate for years can be viewed as an alternative and/or supplemental financing instrument to a conventional mortgage. (In this view, the corresponding complementary remainder interest can be viewed as analogous to conventional mortgaged equity.) An advantage of an augmented estate for years over conventional mortgage finance is that the protections and remedies provided against economic loss in the event of lessee default can be utilized and carried to completion in a more efficient manner. In applications to property finance, either an augmented estate for years or a conventional mortgage or both can be used, as may be desired.

A valuation (e.g., market-based) for a fractional interest in a contingent interest can be computed by discounting expected future net cash flows from the fractional interest at an appropriate risk-adjusted rate. For example, a valuation (e.g., market-based) for such an augmented estate for years component can be computed by discounting the expected cash flows of the estate for years interest at a market-based discount rate that reflects lessee creditworthiness together with the additional loss protection provided by the secondary contingent interests. This can frequently be a materially lower discount rate than the estate for years interest alone could be expected to receive in the marketplace. For example, in the case of medium below-investment-grade lessee credit ratings (e.q., single B or better), if the lowest value that can reasonably be expected for the combined contingent interests is always at least a material percentage (e.q., twenty percent or larger) of the expected estate for years value throughout the estate for years term, then an appropriate market-based discount rate for valuation of an augmented estate for years interest can frequently be a discount rate that corresponds to an investment-grade fixed-income credit rating for the augmented estate for years.

The valuation of the fractional interest in the contingent interest in the property can be inserted by the supporting computer system in a computer-generated document, and preferably the document is one of a group of documents used for securitization of the contingent interest (or any fractional interest therein) in the property. In such a case, the contingent interest can be an augmented estate for years interest, a complementary remainder interest, or both. Interestingly, a valuation of the contingent interest (or the fractional interest therein), usually including taxation, may need to be recomputed subsequent to elimination of a contingency in the contingent interest due to occurrence of the at least one lease default condition for the property. And as with the creation of the document including the initial valuation, the supporting computer can generate an additional document utilizing the recomputed tax. Of course, it is most efficient to have the documentation include text for paper-clipping (and/or stapling) shares in the augmented estate for years interest and/or complementary remainder interest.

The time period during which specified lessee nonperformance can activate a secondary contingent interest will frequently coincide with the estate for years term. However, the time period does not have to coincide with the estate for years term. Occasionally, the time period can be slightly longer than the estate for years term, in order give the secondary contingent interest holder additional time to verify that the lessee(s) has performed as required by the lease(s) during the estate for years term.

In addition, the time period for activation of a secondary contingent interest can sometimes be shorter than the estate for years term. The creation of a contingent interest with a shorter contingency period can be motivated by the fact that an estate for years interest in a property is an economic asset whose value totally amortizes away over the estate for years term, while the combined value of the corresponding complementary remainder interests slowly accretes towards 100% of the value of the property. This suggests that there can come a time during an estate for years term at which a contingent equity interest is a claim on an equity interest whose value is materially greater than the value of the estate for years interest. At this point, an activation of the entire secondary contingent interest could provide the estate for years holder with significantly more valuable property rights than needed for protection against economic loss due to lessee nonperformance. This situation can be avoided by creating several secondary contingent equity interests with different expiration dates for the respective specified contingencies, for example, secondary contingent interests with the same specified contingency but with staggered expiration dates for the respective periods during which the specified contingency can activate the respective equity interest.

An augmented estate for years interest can be viewed as having a term, the term coinciding with the term of vested property interests in the augmented estate for years, e.q., the longest term of the property interests that are included in the augmented estate for years other than the secondary contingent interests that are included in the augmented estate for years. For example, in the case wherein the actual property interests in the augmented estate for years consist of one estate for years interest, the augmented estate for years term and the estate for years term can usually be expected coincide.

In cases of property decomposition in which there is both an augmented estate for years interest and a preferred/residual decomposition of at least one remainder interest, it is usually preferable for both the at least one augmented estate for years interest and the at least one preferred interest in the at least one remainder interest to be fixed-income components such that neither fixed-income component is subordinated to the other. Accordingly, in such situations, a secondary contingent equity interest that comprises part of the at least one augmented estate for years interest will usually be a contingent equity interest in the at least one residual interest portion of the at least one remainder interest.

In cases in which there is an entity for a component, the purchase by investors of less-than-entire interests in the component may be facilitated by the division of the equity interest in the entity into one more classes of shares. If there is a single class of shares in the entity, then a purchase of shares in the entity is equivalent to the purchase of a fractional economic interest in the component.

One or more entities can also facilitate the creation of shares in an augmented estate for years. For example, there can be at least one entity that is an entity for both the at least one estate for years that is included in the augmented estate for years and at least one secondary contingent interest that is included in the augmented estate for years interest. In this case, at least one class of shares in the augmented estate for years interest can be fractional interests in the at least one entity. Alternatively, or in addition, in a second case, shares in at least one class of shares in the augmented estate for years interest can be interests in the at least one entity such that the shares represent equity interests in the at least one estate for years interest alone, and shares in a second class of shares in the augmented estate for years interest can be interests in the entity such that the second class of shares represents equity interests in the at least one secondary contingent interest but not in the at least one estate for years interest. In the second case, wherein there are separate classes of shares for the estate for years interest that is included in the augmented estate for years interest and the at least one secondary contingent interest that is included in the augmented estate for years interest, shares for the at least one estate for years interest and shares for at least one secondary contingent interest can be combined into and/or sold as equity units in the augmented estate for years interest.

In the second case, shares in equity units in the augmented estate for years interest can be "stapled" together, i.e., the equity units can be structured so that shares comprising individual units cannot be detached from each other during the estate for years term, but instead must be purchased and sold during the estate for years term as equity units. Alternatively, or in addition, equity units in the augmented estate for years can be "paper-clipped" together, i.e., the equity units can be structured so that, following issuance of the units or after the elapse of some time period (shorter than the remaining portion of the estate for years term) following issuance of the units, shares comprising individual units can either remain grouped into units or can be detached from each other and henceforth purchased and sold separately, these choices to be made by individual unit holders according to their individual preferences. Equity units can also be structured so that some shares (and/or groups of shares) in equity units are stapled together and other shares (and/or groups of shares) are only paper-clipped together.

A third case is for an entity for the at least one estate for years interest that is included in the augmented estate for years interest to be separate from each entity for the at least one secondary contingent equity interest that is included in the augmented estate for years. In this case, shares (e.q., equity units) in the augmented estate for years can be comprised of shares in the at least one entity for the at least one estate for years interest that is included in the augmented estate for years interest together with shares in the at least one secondary contingent equity interest that is included in the augmented estate for years. As in the second case of equity units in an augmented estate for years interest, equity units in this case can be structured so that shares in individual equity units are stapled together and/or paper-clipped together.

Although it is expected that entities associated with components will be special purpose entities established to facilitate specific transactions, more general entities not designed for specific transactions may be appropriate in some circumstances. For example, this could occur in order to avoid duplicative costs associated with creating multiple separate entities in situations wherein multiple equity interests with the appropriate investment characteristics can be created with fewer entities.

As in the case of special purpose entities with limited liability components, a more general entity for a component can affect both the extent of liability exposure on the part of investors in that component and also the degree of control investors in that component and possibly also investors in other components of the property as well have over the property in event of lessee default during the estate for years term. Thus market-based component valuation in the case wherein any component is held by an entity involves valuation of the investment characteristics of the component, including any effect of any entity on the investment characteristics of the component. So for example, a component that is a lease or leases packaged in an entity (e.g., a limited liability component) can have a different valuation than a naked lease or leases—more particularly, this is likely to be the case if more than one of the components is a limited liability component.

There can also be cases in which there is an entity for an equity interest in a component, which can be either in lieu of or in addition to an entity for the entire component. For example, in the case of publicly traded equity interests in a component, nominal ownership of the equity interest could be held by an investor's brokerage firm, or the equity interest could be in the form of depositary receipts for shares in a component such as American Depositary Receipts for shares whose registered ownership resides offshore, with no material impact from an investor's perspective on the investment characteristics of the equity interest. More generally, in cases in which an entity for an equity interest has no material effect on investment return, risk, or liquidity characteristics of the equity interest, and no material effect on the degree of investor control potentially available to an investor, the existence of the entity will have no effect on valuation of the equity interest.

In this way, there can be a concatenated sequence of entities for an equity interest. Such a functional sequence can be regarded for investment analysis and descriptive purposes as a single entity.

The effect of such a concatenated sequence on valuation of a component can be analyzed by successively valuing the impact of each entity in the sequence, starting with the entity that is legally closest to the property and working successively towards the entity that is legally closest to the investor.

The structure can be applied to finance residential property as well as commercial property, albeit with modifications. Moreover, the structure can accommodate both acquisition financings and refinancings. In this context, residential property refers to, for example, a single-family dwelling, including the following: a single-family house, a condominium (e.q., an individually-owned residential unit within a multi-family residential structure), and a single-family residential apartment within a multifamily residential cooperative. Residential property can also refer to an owner-occupied two-unit house, three-unit house, or four-unit house, e.q., a multi-unit house with up to four single-family units in which one of the units is a dwelling for an occupant with an equity interest in the property.

In acquisition financings (respectively, refinancings) of residential property, the intended financier purchases an estate for years interest or augmented estate for years interest in the property from the current owner, and the intended owner (respectively, current owner) of the property purchases (respectively, retains) the corresponding remainder interest or complementary remainder interest in the property. In addition, the intended owner (respectively, current owner) leases the property, usually on a triple net basis, e.q., sometimes on a bondable net basis, from the financier for the duration of the estate for years or augmented estate for years interest.

In this setting, the interest in the residential property purchased by the financier will be referred to as a residential estate for years interest, and the corresponding property interest purchased (respectively, retained) by the new (respectively, current) owner will be referred to as a residential remainder interest.

Modifications in the structure are needed to accommodate differences between the investment objectives of homeowners and commercial real estate investors, differences between the tax treatment of residential and commercial leases, and differences between the scale of residential and commercial financings.

In the case of acquisition financings, the residential lease should frequently be regarded as a conventional lease for tax purposes. In this case, a financing default will not create an income tax liability for the residential remainder interest investor if the property value is less than the financing value when the default occurs, because a lease is not a debt and a lease default does not involve any debt forgiveness.

Unlike commercial property financings, residential property financings need to be prepayable because homeowners are usually reluctant to be locked into occupying their homes for the anticipated duration of long-term financings. The residential remainder interest owner can sell the property with the existing financing in place by selling the residential remainder interest to a buyer and assigning the lease on the residential estate for years interest to the buyer. Such an assignment will usually require the approval of the financier.

If a substantial portion of the financing has been retired, the amount of leverage available from the residential estate for years interest may be insufficient from the perspective of the buyer. To accommodate this possibility from the outset of the financing, a purchase option for the residential estate for years interest (or the deed(s) underlying the residential estate for years interest) should be included in the lease or with the residential remainder interest. The purchase option will usually allow the residential estate for years interest to be purchased by the option holder for the discounted present value of the remaining (i.e., unpaid) scheduled net rent payments, at a discount rate close to the implied discount rate for the residential estate for years when the financing was created. The purchase option discount rate will usually be specified explicitly in the purchase option, although the option may instead specify a computation methodology for the discount rate, e.q., the implied discount rate for the residential estate for years when the financing was created by the original amount of the financing together with the scheduled net rent payments. The purchase option exercise price may also be increased by a nominal amount (e.q., one dollar, ten dollars, twenty-five dollars, fifty dollars, one hundred dollars, etc., or a time-varying nominal amount) or may have a positive minimum nominal exercise price (e.q., one dollar, ten dollars, twenty-five dollars, fifty dollars, one hundred dollars, etc., or a time-varying nominal amount). The purchase option will usually be exercisable only if the lessee is in compliance with all lease covenants, e.q., if the lessee is not in lease default.

The existence of a purchase option for the residential estate for years interest by the residential remainder interest holder raises the possibility that the tax code will view the financing as debt finance for tax purposes. This possibility is minimized if the option cannot be exercised by the residential remainder interest owner for whom the financing was created, i.e., if the option can only be exercised coincident with or following the sale of the residential residual interest.

On the other hand, some residential property owners may prefer their lease-based financings to be viewed by the tax code as debt finance, since the portion of their net rent payments attributable to interest on the financing will be tax deductible, e.q., for federal income tax purposes. In this case, the residential estate for years interest must be viewed by the tax code as debt of the residential remainder interest owner. Thus it may be desirable to make the purchase option as flexible as possible in order to increase the points of similarity between the lease-based financing and mortgage financings. In particular, the purchase option should be exercisable by the residential property owner for whom the financing was created as well as by any future owner.

The points of similarity between residential estate for years financings and mortgage financings can also be increased by including a rent prepayment option in the lease. Noncurrent rental payments will usually be prepayable at the discounted present value of the future rental payments. The prepayment discount rate will usually be specified explicitly in the lease, although the lease may instead specify a computation methodology for the discount rate, e.q., the implied discount rate for the residential estate for years when the financing was created by the original amount of the financing together with the scheduled net rent payments. If there is both a rental prepayment provision in the lease and a residential estate for years purchase option, the discount rates in the prepayment provision and the purchase option will usually have the same percentage value.

Finally, property values in the case of residential property finance are typically much smaller than the values of typical commercial properties, and net rents of leases of residential estate for years interests in residential properties are correspondingly smaller than net rents of typical single-tenant leases of commercial properties. This raises the possibility that some residential remainder interest investors might default on the last few rent payments, relying on the possibility that the prospective transaction cost of legal action to recover the defaulted rent payments might be large enough in relation to the prospective recoverable amount to deter the financier from any attempt to enforce the residential estate for years interest lease.

A way to protect the financier and simultaneously increase the remainder interest holder's deterrence against unnecessary lease defaults at the end of the lease term is to schedule the lease payments so that the financing is essentially repaid at least several months before the end of the term of the residential estate for years interest. This provides the financier with a terminal rent recovery period, i.e., a reserve time period at the end of the lease term during which to evict the lessee if the financing already has not been essentially retired as scheduled and re-let the property to defray any deficiency. On the other hand, if the financing already has been essentially retired as scheduled, then the lessee is essentially in the position of the property owner at the beginning of the reserve period, since the lessee is in possession of the property, has discharged essentially all lease obligations to the financier, and will become the owner in possession by the end of the terminal recovery period.

More specifically, a terminal rent recovery period is a period at the end of the lease on the residential estate for years interest of at least four months—usually at least six months, preferably at least eight months, frequently at least a year, sometimes as much as a year and a half, and possibly even two years or more—during which the rent is essentially free, i.e., the sum of the (undiscounted) net rent payments during the terminal rent recovery period is zero or very close to zero, and in any case is no more than one-half the average (undiscounted) net rent payment over the portion of the lease term that precedes the terminal rent recovery period.

In the case of refinancings, and more generally in the case where the current owner of a residential property retains a residential remainder interest in the property and does a sale-leaseback of the corresponding residential estate for years interest in the property, it is likely that the sale-leaseback will be viewed as debt finance for federal income tax purposes. In this case, the portion of the net rent payments attributable to interest on the financing will be tax deductible, e.q., for federal income tax purposes, regardless of the other attributes of the residential financing structure.

In many cases, most notably in the case of highly leveraged property, e.q., wherein the initial value of the residential estate for years interest represents at least 80% of the residential property value, the residential remainder interest owner may be required to deposit periodic (e.q., monthly) pro rata payments toward the next required property insurance and/or property tax payments into an escrow account controlled by the financier or an agent or the financier, and to maintain a positive excess balance in the escrow account sufficient to cover one or two missed pro rata payments. Such an escrow account may not continue to be required once the present value of the residential remainder estate for years interest declines either to or below a specified level. There may also be an escrow account for (pro rata) property insurance payments alone and a separate escrow account for (pro rata) property tax payments alone, in lieu of a combined account. Alternatively, there may be an escrow account for property insurance payments but not an escrow account for property tax payments, or there may be an escrow account for property tax payments but not an escrow account for property insurance payments.

The preferred scheduling for periodic pro rata escrow account payments is for the due dates to coincide with the due dates for the periodic rent payments, and for the lessee to make a combined payment to cover both the rent payment and the corresponding escrow account (respectively, accounts) payment (respectively, payments). However, it is possible for the lessee to make (or to be required to make) separate payments for the rent and for each escrow account associated with the residential estate for years, or to make one payment to cover all escrow accounts and a separate payment to cover the rent.

The preferred type of property insurance will usually be for full replacement cost, and will usually provide for the complete replacement of the structure and fixtures in case of damage or destruction. The insurance will usually also provide homeowner liability coverage sufficient to protect both the residential estate for years holder and the residential remainder interest holder against property-related legal liability (usually both compensatory and punitive).

Since residential properties are usually smaller in value than commercial properties, it is frequently inefficient unnecessarily costly to create and maintain one or two special-purpose entities (SPEs) each time a property is separated into a residential estate for years interest and a residential remainder interest, since lease default recourse is usually less complex if the estate for years interest doesn't need to be a securitized rated stand-alone fixed-income instrument. For example, this is the case if the residential remainder interest holder intends the residential estate for years interest is to be regarded as property debt for federal tax purposes. For these cases, it is possible to establish a single SPE or single pair of SPEs to hold the deeds associated with the residential estate for years interest and the residential remainder interest in more than one residential property financing, and frequently the pair will hold the deeds to many such financings. In the case of a pair of SPEs, it will usually be the case that one SPE will only hold deeds associated with residential estate for years interests, and the other SPE will only hold deeds associated with residential remainder interests. The SPEs will usually have expected lives that extend beyond the expected term of the initial financing (or financings) in which they participate, and it is not necessary for the SPEs to acquire all their deeds at the same time, though it may sometimes be preferable for all deeds to be acquired at the same time.

In the case of real estate, the purchase price of an estate for years (and/or an augmented estate for years and/or a residential estate for years) component alone, or a material interest therein, will almost never be large enough to cover the sale price of the property and the cost of component separation. This implies that a market-based valuation and sale of the remainder (and/or complementary remainder and/or residential remainder) component, or a material interest therein, is an essential factor in the implementation of component separation. In the case of tangible personal property, the purchase price of an estate for years (and/or augmented estate for years and/or residential estate for years) component also will almost never be large enough to cover the sale price of the property and the cost of component separation, except in those cases wherein the property can reasonably be expected to reach the end of its useful economic life during the estate for years (and/or augmented estate for years and/or residential estate for years) term.

B. Tax-Exempt Finance

Separating property into at least two components along a time dimension (e.g., into an estate for years interest and a remainder interest (and/or an augmented estate for years interest and a complementary remainder interest)) can also be used to enhance the investment value of tax-exempt securities such as tax-exempt general obligation bonds, tax-exempt industrial revenue bonds, and tax-exempt leases. This separation can be applied either to individual securities or to pools of tax-exempt securities. Value enhancement can be achieved in two ways: (1) cash flow streams from the components can appeal to investors who would not be interested in the entire cash flow stream of the original asset, and (2) the combined tax shelter benefits that accompany the components can be greater than the tax shelter benefits associated with the original asset. Both effects are significant, though in some situations, the tax effect will be the more dramatic of the two.

Unlike the example of taxable leased property discussed above, for the tax-exempt property example, both components can be viewed as fixed-income securities. One would expect that these fixed-income securities would be valued by investors in the marketplace by comparison with other fixed-income securities.

For tax-exempt securities, to effect a successful change in cash flow benefits from splitting the property or asset into components, one can proceed indirectly in separating the asset into components. Rather than directly separating ownership of the tax-exempt security itself, it is better to create an entity to hold the tax-exempt security, and then to separate one or more of the equity interests in the entity along the time dimension into estate for years and remainder components (and/or augmented estate for years and complementary remainder components).

From a legal perspective, creating tax-exempt components can be accomplished within the framework of a general or special purpose entity, examples of which include general and limited partnerships and mutual funds. However, to create limited-liability components, smooth the cash flow streams, and avoid an imposition of unusual bookkeeping requirements on fixed-income investors, an entity with one or more limited liability equity interests is the preferred format, with some limited liability equity interests as the assets that are subject to component separation. To enhance marketability of the components, and to facilitate investor valuation of the components by comparison with alternative fixed-income investments available in the marketplace, the entity may alter the frequency of cash flows to holders of equity interests from schedules of the original assets (e.g., the original assets could generate monthly cash flows, and the components could generate semiannual cash flows).

In general, component separation will produce two effects: (1) the estate for years (and/or augmented estate for years) components will generate more tax deductions for sheltering the cash flows of this component from taxes; and (2) the remainder (and/or complementary remainder) interest component will generate fewer tax deductions for sheltering the cash flows of this component from taxes (the tax obligations associated with the remainder (and/or complementary remainder) component will still be lower than those associated with a conventional taxable fixed-income security). It is also possible that, in some situations, purchasers of taxable securities may view remainder (and/or complementary remainder) interests as taxable securities and value those interests more highly than investors in tax-exempt securities.

The same component separation technology can be applied to separate the following fixed-income assets along the time dimension into components: a taxable fixed-income security, a portfolio of taxable fixed-income securities, a portfolio of taxable and tax-exempt fixed-income securities. More generally, the same component separation technology can be applied to any asset or portfolio of assets that is either ratable as if it were a fixed-income security (possibly of investment grade), where the term "ratable" refers in general to fixed-income ratings assigned by widely recognized investment rating agencies such as Standard and Poor's and Moody's Investors Service, or classifiable for regulatory purposes as a fixed-income security (possibly of investment grade) by a major regulatory agency for financial institutions or institutional investors, e.q., National Association of Insurance Commissioners (NAIC) investment classifications assigned by the NAIC Securities Valuation Office or the offices of individual state insurance commissioners. However, in general the maximum incremental tax benefits that can be generated are smaller than in the case of tax-exempt fixed-income securities.

The combined investment value of the tax deductions generated by the various components may be greater than, equal to, or lower than the tax deductions associated with the original tax-exempt or taxable asset (s). Since creating an entity to hold the original securities requires a diversion of a portion of the asset cash flow stream to pay administrative expenses associated with maintenance of the entity, component separation of securities is likely to be of interest only when the combined value of tax deductions generated by the components exceeds tax deductions associated with the original asset (s).

In general, determining a schedule of economic benefits associated with various equity interests in the entity, valuing the tax deductions associated with the components, and pricing of the components as fixed-income securities, are computation-intensive procedures.

C. Automated Support

To efficiently offer the above-described financial products, it would be best to use automated means to do computing and data processing, i.e., machine, manufacture, and process applied to supporting the proper structuring and pricing of the components. Efficiency also dictates a need to use automated means to incorporate the computational output in generating financial documents associated with a separated purchase transaction.

Therefore, an embodiment can include a machine, manufacture, and process applied to financial analytical data automation, including pricing data, for the decomposition of property.

A further embodiment can include the same applied to supporting a new financing product that is based on providing financing of up to forty years, while also allowing taxable investors to avoid tax problems encountered with typical mortgage financing.

Another embodiment can include the same applied to calculating financial particulars of the property based on the concept that the source of property value is property rights that can be split and separately valued.

Another embodiment can include the same applied to using the financial particulars in efficiently tailoring financial documents to support transactions involving property components.

Another embodiment can include the same applied to real estate as the property.

Still another embodiment can include the same applied to supporting the decomposition of real estate into an estate for years (and/or augmented estate for years and/or residential estate for years) and a remainder (and/or complementary remainder and/or residential remainder) interest, particularly for computing the price, including tax, of these components.

Still another embodiment can include the same to computing the after-tax yield for the estate for years and/or augmented estate for years (and/or residential estate for years) and the equivalent pretax yield that would be required to obtain the same after-tax return from a bond (and/or residential mortgage).

Yet another embodiment can include the same applied to equity interests in entities that hold tax-exempt securities or pools of tax-exempt securities as the property.

Yet another embodiment can include the same applied to supporting the decomposition of equity interests in entities that hold tax-exempt securities or pools of tax-exempt securities into estate for years (and/or augmented estate for years) and remainder (and/or complementary remainder) interests, particularly for computing the price, including tax, of these components.

Still embodiment can include the same applied to analyzing the returns offered based on certain assumptions to inform potential investors of the range of outcomes as they relate to certain inputs.

Still another embodiment can include the same applied to generating data so that comparisons can be made to alternative investment opportunities.

These and other embodiments can be addressed by a computer, for example, a digital computer, having a logic means for controlling signal processing and modification. The logic means can be completely hard wired or it can be programmable so that one or more computer programs can run on the computer. Preferably an embodiment includes a computer program running on a programmable computer system to provide financial analytical data concerning decomposed property. The computer system is connected to receive information representing a description of the characteristics of the property from a data input means, such as a keyboard. The computer system also outputs computed data and documentation to an output means and saves the output financial analysis to a memory system. The computer system also has a second means for automatically controlling the digital computer to produce financial documents from the financial analysis and model documents stored in the memory system.

The computer system uses as input data information obtained from a variety of sources, for example, The Wall Street Journal tabulation of daily Treasury bond interest rates, insurance company publications that list private placement debt risk premia, the property offering documents, and the property lease documents. For applications to residential real estate, the computer system uses current mortgage rates, e.q., for home loans, updated at least daily and available, for example, online or by fax from mortgage brokers and the mortgage finance departments of major commercial banks. For applications to tax-exempt finance, the computer system also uses tax-exempt bond finance interest rates tabulated and published daily.

With this information, it is possible to compute the following: (1) the optimal choice of the estate for years (and/or augmented estate for years and/or residential estate for years) term to maximize profitability of the components; (2) whether risk characteristics of either component are appropriate for inclusion in a prospective investor's portfolio; and if so, (3) whether an expected return justifies the system-determined purchase price.

Specimen 1 (Screens 1-4) is a series of computer screens constructed by the computer system, in accordance with the present invention.

Specimen 2 (Screens 1-4) is a series of four computer screens constructed by the computer system, for another embodiment in accordance with the present invention.

FIG. 1 illustrates the nature of the financial innovation that gave rise to the need for the computer system and methods, etc. Rights to a Subject Property 2 (any property whatsoever, but in a preferred embodiment, real estate) are leased to a Lessee 4, preferably an investment-grade lessee in the case of commercial property and the residential remainder interest equity holder in the case of residential property, for a definite term, in exchange for rent. All rights to the Subject Property 2 and cash flow from rent money from the Subject Property 2 are conveyed to an investor in an estate for years (and/or augmented estate for years and/or residential estate for years), or to an entity with one or more limited liability equity interests, for example a trust, that holds title to the estate for years (and/or augmented estate for years and/or residential estate for years) and that—absent any competing claims—flows the rent money through to the investor. Financial Intermediary 6 separates the Subject Property 2 and cash flow of rent money into at least two components, using a computer system and methods, etc. The components are usually securitized into rights to a Residential Estate For Years 8 and a Residential Remainder Interest 10. For example, property law provides mechanisms for the temporal decomposition of property. In the case of real estate, one mechanism is to create multiple deeds. For example, there can be a deed to a term (and/or augmented term and/or residential estate for years) interest in a property, and a separate deed to a remainder (and/or complementary remainder and/or residential remainder) interest in the property. In nearly all states, both deeds represent real interests in the property. As a further example, there can be at least three deeds in the case of an augmented estate for years/complementary remainder decomposition, which may be a residential estate for years/residential remainder decomposition: a deed to a term interest in the property, a second deed to a primary contingent interest in the property, and a third deed to a secondary contingent interest in the property. Similarly, in the case of tangible personal property there can be multiple titles, for example, a title to a term (and/or augmented term) interest in a property and a separate title to a remainder (and/or complementary remainder) interest in the property, and/or (in the case of an augmented estate for years/complementary remainder decomposition) there can be a title to a term interest in the property, a second title to a primary contingent interest in the property, and a third title to a secondary contingent interest in the property. Of course, there can be more titles for more interests, as may be desired. The use of a financial intermediary facilitates the separation process but is not necessary in all cases.

The term of separation usually coincides with the remaining term on the existing tenant lease, and is almost never longer than the shortest remaining tenant lease term. The estate for years (and/or augmented estate for years and/or residential estate for years) component can, therefore, be viewed as a fixed-income asset, but tax considerations may dictate whether the remainder (and/or complementary remainder and/or residential remainder) component is viewed as a pure equity asset or as a mixture of pure equity and fixed-income.

When component separation takes place, Subject Property 2 is sold to the Financial Intermediary 6, and at least two entities (e.q., two trusts) may be established to acquire actual titles to the respective components (or, in the case of an augmented estate for years, three entities may be established to acquire actual respective titles to the estate for years, the primary contingent interest, and the secondary contingent interests). For example, the estate for years (and/or augmented estate for years) can be a term (and/or augmented term) of years interest. In the case of real estate as the property, an entity (e.q., a trust) is issued a deed to the term (and/or augmented term and/or residential estate for years) of years interest by the property seller and a second entity (e.q., a second trust) is issued a deed to the remainder (and/or complementary remainder and/or residential remainder) interest by the property seller (or, in the case of an augmented estate for years, one entity is issued a deed to the term of years interest, a second entity is issued at least one deed to the at least one primary contingent interest, and a third entity is issued at least one deed to the at least one secondary contingent interest). In the case of tangible personal property as the property, an entity (e.q., a trust) is issued a bill of sale for the term of years interest by the property seller and a second entity (e.q., a second trust) is issued a bill of sale for the remainder (and/or complementary remainder) interest by the property seller (or, in the case of an augmented estate for years, one entity is issued a bill of sale for the term of years interest, a second entity is issued at least one bill of sale for the at least one primary contingent interest, and a third entity is issued at least one bill of sale for the at least one secondary contingent interest).

Any existing property debt is retired at, or prior to, the time of acquisition. An obligation of any manager of such an entity (e.q., trustee of such a trust) for the Residential Estate for Years 8 is to preserve title to the estate for years (and/or augmented estate for years) and to prevent any property encumbrances from being established during the separation term.

If there is an entity for an estate for years (and/or augmented estate for years) (e.q., a trust), it has a term (and/or augmented term) beneficial interest, and if there is an entity for a remainder (and/or complementary remainder) interest (e.q., a trust) it has a remainder (and/or complementary remainder) beneficial interest. The term (and/or augmented term) beneficiary has all rights and obligations of estate for years (and/or augmented estate for years) ownership during the life (or term) of the entity for the estate for years except a right to encumber the property or petition a court to terminate or dissolve the estate for years/remainder (and/or augmented estate for years/complementary remainder) interest structure. A remainder (and/or complementary remainder) beneficiary enjoys no rights or benefits until the term interest expires, and then enjoys all rights and benefits of the fee simple title.

In this case, the term (and/or augmented term) beneficial interest becomes the (fixed-income) estate for years (and/or augmented estate for years) component, and the remainder (and/or complementary remainder) beneficial interest becomes the remainder (and/or complementary remainder) component.

In the case of an augmented estate for years, several legal structures can transform a secondary contingent remainder interest into an unconditional (or less-conditional) remainder interest at the time of (or a specified amount of time after) occurrence of a specified contingency and also deactivate a corresponding primary contingent remainder interest. In the case wherein there are separate deeds (or bills of sale) to the primary and secondary contingent remainder interests, the transformation and deactivation can occur automatically for legal purposes if so specified in the deeds (or bills of sale), without any further action on the part of either contingent remainder holder. In order to guard against any possibility of unlawful taking or use (e.q., adverse possession) of the property after expiration of the term of years by the holder of the (formerly) primary contingent remainder, the secondary contingent remainder owner can register occurrence of the contingency and the resulting strengthened equity status of the (formerly) secondary contingent remainder with appropriate authorities (for example, in the case of real estate, with the appropriate county recorder of deeds or registrar of titles), and/or serve notice on relevant organizations and individuals (e.q., the holder and/or owner of the term of years interest). In the case wherein there are one or more entities for the deeds (or bills of sale) to the primary and secondary contingent remainders, the organizational document of the entity for the (formerly) secondary contingent remainder can direct the entity to perform the registrations and/or serve the notices for the (formerly) secondary contingent remainder holder.

In a second case, there may not be separate deeds (or bills of sale) for the primary and secondary contingent remainder interests. For example, there may be separate deeds (or bills of sale) to a term of years interest and a remainder interest, an entity for the term of years interest, a second entity for the remainder interest, and primary and secondary contingent interests in the entity for the remainder. In this case, the organizational document for the entity for the remainder interest can bestow all rights and obligations of beneficial ownership in the entity on the holder of the primary contingent remainder interest until (or a specified amount of time after) notification (for example, in a specified/acceptable format) of occurrence of the specified contingency, and afterwards to bestow all rights and obligations of beneficial ownership in the entity on the holder of the (formerly) secondary contingent remainder interest.

Examples of possible specified/acceptable formats for notification include the following: in the case wherein the entity for the term of years is distinct from the entity for the remainder, the organizational document of the entity for the estate for years can provide for automatic notification of the entity for the remainder in event of specified lessee defaults and/or bankruptcy. Alternatively, or in addition, in the case wherein the specified contingency is comprised of types of bankruptcy filings, the at least one holder of the secondary contingent remainder interest can attorn in an affidavit that the contingency has occurred, citing the court, jurisdiction, and date of the filing, etc. The organizational document of the entity for the remainder can direct the entity to contact the court to verify or disprove the information within a specified amount of time and, subject to verification, then transform the primary and secondary contingent interests as specified in the organizational document for the entity. In the case wherein there is one entity for the estate for years interest and the remainder interest, the entity will be aware of any lease default when it occurs, and will take any appropriate action to transform the primary and secondary contingent remainder interests as directed in the organizational document for the entity.

The components are both viewed as personal property for legal purposes. Ownership of either component can be transferred without affecting the legal status or investment characteristics of the Subject Property 2 or the other component. Similarly, while legal judgments against the owner of either component can create a lien against that component, such judgments cannot create a lien against the Subject Property 2 or the other component.

For tax purposes (usually for United States tax purposes), the holder of the estate for years (and/or augmented estate for years) component (or an equity interest therein) is usually entitled to amortize the acquisition cost (e.q., purchase price) of the estate for years (and/or augmented estate for years) component (or the acquisition cost of the equity interest therein) over the portion of the estate for years (and/or augmented estate for years) term remaining after acquisition of the estate for years (and/or augmented estate for years) component (or the equity interest therein).

Alternatively, the estate for years holder may be entitled to both depreciation and amortization deductions. In this case however, the value of the deductions is interleaved, not additive. That is, although the combined deduction would be greater than the amortization deduction alone, the combined deduction would be smaller than the sum of the amortization and depreciation deductions.

As an additional alternative, in some cases in which there is a single entity for both the estate for years (and/or augmented estate for years) and remainder (and/or complementary remainder) components, the estate for years (and/or augmented estate for years) holder may be entitled to cost recovery in the form of depreciation of the temporally decomposed property in lieu of amortization of the estate for years (and/or augmented estate for years) purchase price. These situations usually involve tangible personal property and leases with terms that are longer than the statutory cost recovery period for that type of property, in which cost recovery via depreciation is faster for the estate for years (and/or augmented estate for years and/or residential estate for years) investor than cost recovery via amortization of the estate for years (and/or augmented estate for years and/or residential estate for years) price over the lease term.

Whichever cost recovery deduction schedule is claimed by the estate for years (and/or augmented estate for years) holder, the tax treatment of the estate for years (and/or augmented estate for years) will usually be different from the treatment claimed by the holder of conventional taxable debt unless the remainder interest (and/or complementary remainder interest and/or residential remainder interest) holder creates the property separation by sale/leaseback of the estate for years (and/or augmented estate for years and/or residential estate for years), because for tax purposes, the estate for years (and/or augmented estate for years and/or residential estate for years) is an income-producing asset rather than a debt instrument. In the case where the remainder interest (and/or complementary remainder interest and/or residential estate for years interest) holder creates the property separation by sale/leaseback of the estate for years (and/or augmented estate for years and/or residential estate for years), the property separation will usually be regarded as equivalent to debt financing by the remainder (and/or complementary remainder and/or residential remainder) interest holder.

If the estate for years (and/or augmented estate for years) component holder is a corporate investor, then the tax write-offs accruing from component separation are available to offset taxes on either passive or operating income.

In the case of an augmented estate for years interest, tax treatment of the augmented estate for years is likely to be identical to the tax treatment that the estate for years alone would receive, so long as the future contingency (or contingencies) that could activate the beneficial property interest(s) represented by the secondary contingent interest portion of the augmented estate for years is viewed as reasonably unlikely to occur, based on available information at the time the temporal property decomposition takes place. However, the tax treatment of the augmented estate for years interest can change once a specified contingency provision has occurred and at least one corresponding secondary contingency interest has become an actual property interest that is held by the estate for years holder. Depending on the nature of the newly uncontingent (or less-contingent) property interest, the augmented estate for years holder may henceforth receive the tax treatment that would be accorded a holder of an interest in temporally undecomposed property. For this reason, it can be worthwhile to incorporate a time delay of a few weeks to a few months into the structure of a secondary contingent interest between the occurrence of a contingency event that activates the secondary interest and the consequent conversion of the contingent interest into an uncontingent (or less-contingent) interest. Such a time delay can give the augmented estate for years holder an opportunity to sell the soon-to-be uncontingent (or less-contingent) equity interest and thereby preserve any tax benefits due to separate component ownership that might otherwise cease at the time the conversion takes place.

Because the tax treatment of an augmented estate for years is likely to change after the occurrence of a contingency and consequent transformation of a secondary contingent interest into an uncontingent (or less-contingent) interest, all schedules of remaining tax payments and/or tax deductions for the augmented estate for years should be recomputed after an occurrence of such an occurrence and/or transformation. In addition, the at least one tax basis for the augmented estate for years together with all schedules of remaining tax payments and/or tax deductions should be recomputed after detachment and sale of any secondary contingent interest in the augmented estate for years, or more generally, any partial interest in the augmented estate for years.

Separation is facilitated if the lease(s) is triple-net, i.e., during the trust term, the lease(s) obligates the tenant to the estate for years (and/or augmented estate for years and/or residential estate for years) component holder for property management and maintenance, payment of taxes, and property insurance. Thus, absent a default by a tenant, the rights and obligations of the estate for years (and/or augmented estate for years and/or residential estate for years) component holder involve the right to receive scheduled net rental payments, while the benefits of property occupancy belong to the tenant. The only claim of the estate for years (and/or augmented estate for years and/or residential estate for years) component holder on any property asset is a contingent one, in event of a tenant default.

In a tenant default, the estate for years component holder has recourse against the tenant as prescribed by property law and the lease covenants. This recourse against both tenant financial assets and the remaining portion of term property occupancy rights is the subject of traditional principles of property law. The availability of tax write-offs accruing from component separation continues unaffected by a tenant default event.

The default risk associated with the estate for years (and/or augmented estate for years) is identical to the default risk associated with tenant general obligation debt. The expected value of the combined estate for years (and/or augmented estate for years) default claims compares favorably with the claims available to the holders of tenant unsubordinated debentures.

Leased and unleased property have different investment characteristics. The nature of this difference can be illustrated by considering the extreme cases of two unleveraged general purpose single-tenant properties of similar size, location, and architecture, one perpetually leased on a triple-net basis to an investment-grade tenant, the other momentarily unleased.

In the case of the perpetually leased property, all future rental cash flows are determined. Absent tenant default, there will be no future rental negotiations. Thus, there are no present values that fluctuate with changes in the spot market for comparable space, implying that the value of this property does not depend on the real estate market. Property value in this case depends solely on the contracted values of future net cash flows, tenant credit risk, and long-term interest rates. In other words, this asset has the investment characteristics of tenant debt.

By contrast, all future rentals from the unleased property are as yet undetermined, and the present value of these rentals fluctuates with expectations about the future evolution of the spot rental market. In short, this asset is a pure real estate equity investment, with no fixed-income component.

Typical institutional-grade property is not well represented by either extreme. Such property is usually fully leased or almost-fully leased for a reasonable period of time, with arrangements for tenant occupancy beyond that period open to future negotiation. As in the case of perpetually leased property, existing leases have the investment characteristics of fixed-income assets, whereas the speculative risk dimensions investors associate with equity real estate are due entirely to the remaining rights in the property asset: the right to future rental opportunities after existing leases expire.

By securitizing net-leased property to separate ownership of current leases from ownership of future leases, the net-leased property is decomposed into estate for years and pure equity remainder (and/or complementary remainder) components (and/or into augmented estate for years and complementary remainder (and/or complementary remainder) components). The estate for years (and/or augmented estate for years) components are appropriate for investors interested in traditional fixed-income investments, while the pure equity remainders (and/or complementary remainders) are appropriate for real estate investors, speculators, and tax-exempt institutions interested in acquiring portfolio diversification benefits of real estate at a fraction of the cost for all components of the real estate.

By contrast, complementary remainder interests are usually more specialized equity products related to corporate (in the case of commercial property) and mortgage (in the case of residential property) finance. Since the value of some equity interests in a complementary remainder interest can be affected negatively by lessee default during or at the end of the augmented estate for years term, such equity interest(s) will frequently be of more interest to investors that have an economic interest in least one property lessee than to investors interested only in a pure equity property investment.

Consider now a computer system for manipulating signals to produce an illustration of a decomposition of property into separately valued components. The computer system includes a computer, for example, a digital electrical computer, controlled by a processor. A first logic means controls the processor in manipulating signals representing input data to the computer, the input data characterizing at least two components decomposed from the property. The manipulating includes transforming the signals into modified signals representing respective values for each of the components, the values being computed to reflect taxation for the components. Input means is coupled to the computer and operable for converting the input data (which can be entered manually) into the signals and communicating the signals to the computer. Output means is coupled to receive the modified signals from the computer and to convert the modified signals representing the respective values into an illustration of the computed respective prices.

The computer system can additionally include a second logic means for controlling the processor in further manipulating the signals, the further manipulating producing at least one financial document for one of the components, the financial document being constructed in response to signals representing preexisting text and stored in memory accessed by said computer and in response to said modified signals representing the respective values.

The computer system can be used in cooperation with one or more computer systems in respective locations to either recompute the computations (i.e., signal processing) discussed above or do supplemental computations (i.e., signal processing) as discussed below.

The property can be any property or divisible property right. Preferably, the property is real estate, but in another preferred embodiment, the property is a tax-exempt security.

Figure 2:
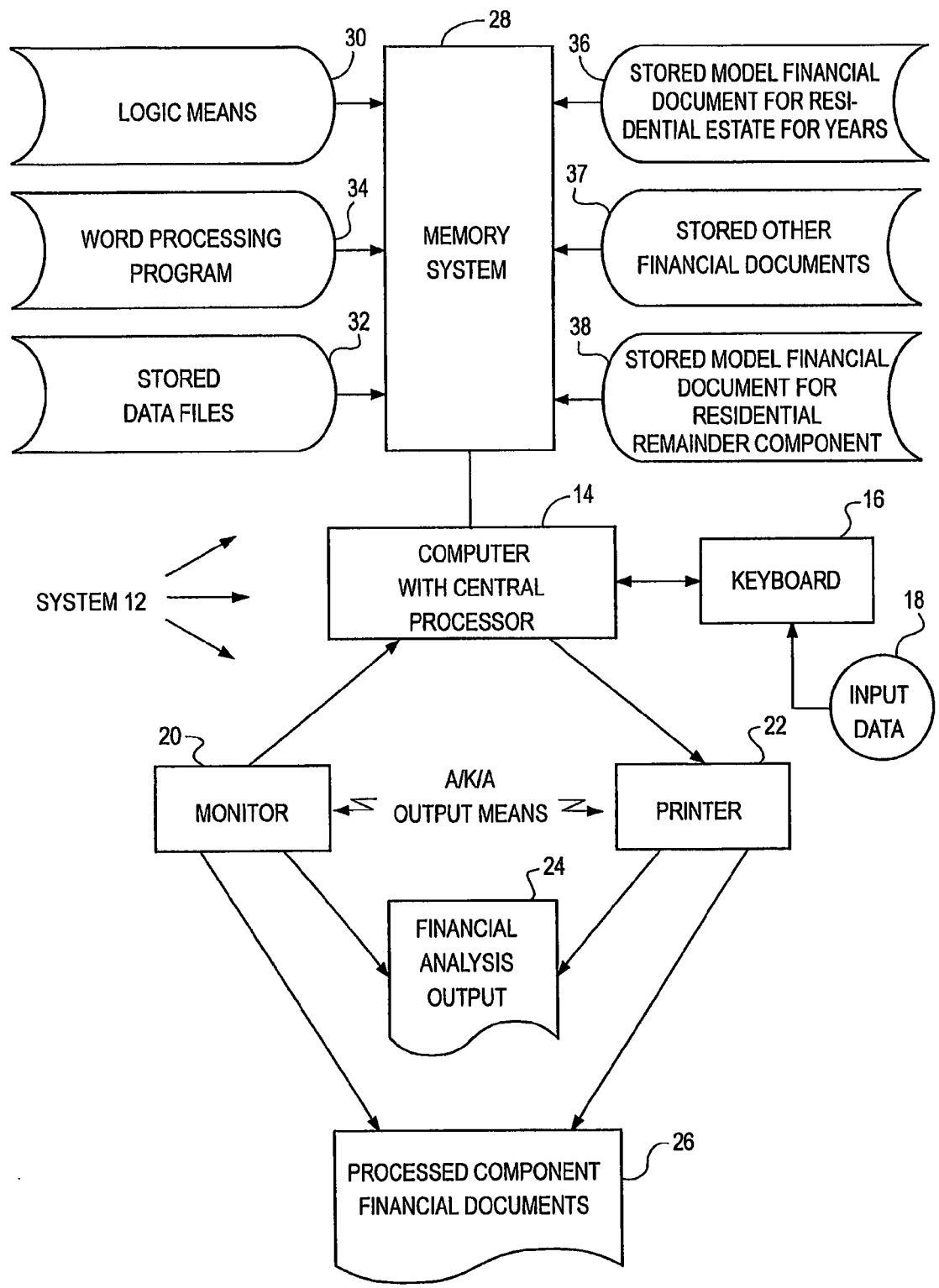
FIG. 2 is a diagram representing a computer system and its input and output.

More particularly, with reference to FIG. 2, the hardware, input, and output of a Computer System 12. The System 12 includes a Computer 14, such as an IBM-compatible personal computer with a DOS operating system. Computer 14 preferably has a model 486 central processor or a 386 central processor with a math coprocessor. Computer 14 is operably linked to a Keyboard 16, for receiving Input Data 18 (described more particularly below with regard to FIG. 3) and converting it into signals. Computer 14 also is operably linked to output means, such as a Monitor 20 and a Printer 22 (such as a dot-matrix or laser printer) for outputting Financial Analysis Output 24 (described more particularly below with regard to Specimen 1) and Processed Component Financial Documents 26 (described more particularly below with regard to Specimens 3 and 4). (The specimens 4-6 are representative of stored financial documents, in this case, for an estate for years and a remainder, but it should be understood that suitable corresponding financial documents would be utilized for an augmented estate for years and a complementary remainder or a residential estate for years and a residential remainder.)

Computer 14 is additionally operably linked to Memory System 28, comprising a means for storing Logic Means 30, such as a diskette or a hard disk, and a means for communicating the Logic Means 30 to the Digital Computer 14, such as a disk drive. Logic Means 30 can be a LOTUS 123 (Version 2.01 or higher) computer program, which is used to produce Specimen 1, though as described subsequently, a program dedicated to the purposes herein would be preferable.

When loaded and running on Computer 14, Logic Means 30 controls the Computer System 12 transforming the electrical signals from Keyboard 16 into signals associated with constructing files 32 (or records, if so desired) and of Financial Analysis Output 24. Storing a plurality of data files 32 would be appropriate, for example, for analyzing different separated purchase transactions or for analyzing how one or more changes in Input Data 18 influence the Financial Analysis Output 24.

Memory System 28 also stores a Word Processing Program 34, such as Word Perfect 5.1. Word Processing Program 34 is useful for constructing and editing text files to be printed via Printer 22 as Processed Component Financial Documents 26.

Preferably, one text file includes a Stored Model Financial Document For the Residential Estate For Years 36, for example, an organizational document (e.q., for an entity for the estate for years (and/or augmented estate for years and/or residential estate for years) real estate component such that certificates evidencing equity interest in the entity are securities) or a disclosure document for securities law purposes for the securitized estate for years (and/or augmented estate for years and/or residential estate for years) real estate component (e.q., for an equity interest in the securitized estate for years (and/or augmented estate for years and/or residential estate for years) real estate component). Another text file includes Stored Model Financial Document For Residential Remainder Component 38, for example, an organizational document (e.q., for an entity for the remainder (and/or complementary remainder and/or residential remainder) real estate component such that certificates evidencing equity interest in the entity are securities) or a disclosure document for securities law purposes for the securitized remainder (and/or complementary remainder and/or residential remainder) real estate component (e.q., for an equity interest in the securitized remainder (and/or complementary remainder and/or residential remainder) real estate component). Still another text file includes Stored Other Financial Documents 37, detailed subsequently herein.

It is to be explicitly understood that other implementations and modes, say, those using a different kind of computer, analogous hardware, multiple computer systems, comparable input and output, a computer program or programs written in a different language, or a hardwired system replacing the computer program, are entirely acceptable and equivalent to the present invention. Also, as indicated herein, implementations can be carried out by hardwired logic, e.g., in a handheld calculator. When software is loaded into, and running, a programmable computer, the software sets what in effect are many, many "switches," and the result can be considered a new computer machine, with logic formed from the set switches. Instead of setting the switches, an equivalent would be to hardwire the same or equivalent circuitry. Therefore, whether a configurable device is configured to the requirements to carry out what is discussed herein, or a device is constructed from scratch solely for meeting the requirements, it is a distinction without a difference from an electrical signal processing standpoint. All these embodiments are different species of the present invention that are within the scope contemplated herein.

Focusing more particularly on Logic Means 30, it should be recognized that System 12 is intended for a specific purpose, for operation under certain assumptions, to compute the values of components decomposed from property, and to provide documentation thereof; System 12 involves certain Input Data 18 and Financial Analysis Output 24, each of which is discussed below in greater detail.

The Logic Means 30, in conjunction with the rest of System 12, is intended to facilitate control over the computer system 12 and thus financial transactions involving the separate components of property, preferably residential real estate in a separated purchase transaction. For a separated purchase transaction to take place, the sum of the prices the two investors agree to pay for their respective components should theoretically be at least equal to a price at which the owner is willing to sell the property.

Logic Means 30 partially automates financial considerations that take into account the different investment characteristics of the two components. This facilitates or reduces the cost for, carving a property value into respective values, which can be treated as prices, for the residential estate for years and the residential remainder interest. In addition, Logic Means 30, in conjunction with Computer 14, calculates various financial parameters to assist prospective purchasers in deciding whether the components are suitable as investments at the respective sale prices.

Logic Means 30, in conjunction with Computer 14, calculates throughout the residential estate for years the values and tax bases of the separate components so that the sale and purchase of each component may take place privately or through a financial exchange established to provide liquidity in a market in which none presently exists.

Further, Logic Means 30, in conjunction with Computer 14, provides accounting support to the residential estate for years investor by computing, on both annual and quarterly bases, the tax deductions generated by the property and the residential estate for years. These deductions may be used by the residential estate for years investor to reduce taxes on income produced by the residential estate for years and in certain other taxable operations. Because these deductions affect the basis of the residential remainder interest upon expiration of the residential estate for years, the accounting support set forth is also useful for the residential remainder interest.

Logic Means 30 can also be used in conjunction with Word Processing Program 34 to efficiently incorporate Financial Analysis Output 24 into Financial Documents 26 (and to edit and revise the stored Model Financial Documents 36 and 38 for each separate purchase transaction) for each of the components.

The Logic Means 30 is intended to support the separated purchase transaction of real estate in which the residential estate for years has a definite and specified term, and in which the property is leased for rent prior to, or coincident with, the separated purchase transaction. For the residential estate for years to be an asset with fixed-income investment characteristics, the term of the residential estate for years is normally no longer than the term remaining on the lease. That is, the residential estate for years entitles the holder to the right to receive the net cash flows from the existing lease until the end of the term. Furthermore, the risk of default on the scheduled cash flow(s) from a residential estate for years interest or a (possibly securitized) pool of residential estate for years interests is usually determined by either the lowest-rated tenant credit risk or the value-weighted average credit risk of the tenants, with the former the norm.

It is assumed in this embodiment that ownership of the components is structured so that, after the separated purchase transaction, the purchaser(s) of the residential estate for years is (are) entitled to amortize the residential estate for years purchase price for tax purposes and also over the residential estate for years term. Additionally, it is assumed that any depreciation deductions are to be taken by the residential estate for years purchaser(s). Finally, it is assumed in this embodiment that the entire investment return on any preferred equity interest in the residential remainder component is insured via residual insurance, that the preferred equity interest does not have any participatory interest in the investment return on the residential remainder component other than the insured return, and that none of the residual value insurance is left over to insure the return on the residual equity interest in the residential remainder component. This implies that the preferred interest is a ratable fixed-income asset and that it is usually an investment-grade fixed-income asset in cases in which the residual value insurer has an investment grade credit rating.

In addition, it is assumed in this embodiment that the cost of the residual value insurance is payable in the form of a single up-front insurance premium at the time the property is separated into components. Other embodiments can incorporate general schedules and amounts of residual value insurance premium payments over the residential estate for years term. Still other embodiments can provide for the possibility that creation of a preferred interest in a residential remainder component, the purchase of residual value insurance for the preferred interest, or both the creation of a preferred interest in a residential remainder component and the purchase of residual value insurance for the preferred interest, can occur as one or more events subsequent to separation of the property into residential estate for years and residential remainder interests. These and yet other embodiments can also allow for the cost of possible interim financing for the residential remainder interest prior to the time the residual value insurance takes effect.

Under the above assumptions, the risk and return characteristics of the residential estate for years are those of a fixed-income asset. This implies that prospective investors will price the residential estate for years as a fixed-income investment, i.e., prospective purchasers will value the residential estate for years relative to comparable investments available in the bond market at the time of the separated purchase transaction.

Specifically, prospective purchasers of the residential estate for years will look at the available yield on Treasury securities of comparable cash flow characteristics for a comparable average life, and add a risk premium based on the credit risk of the tenant (and, in the case of an augmented estate for years, diminished loss risk due to the inclusion of one or more secondary contingent remainder interests. The sum of the appropriate Treasury rate plus the risk and the illiquidity premium is a typical fixed income market discount rate for the residential estate for years.

Generally, in order to value the residential estate for years as a fixed-income investment, a schedule of net cash flows during the residential estate for years term is determined. Typically, this will comprise a stream of scheduled monthly net rental payments. If the residential estate for years does not begin on the first day of a month and terminate on the last day of a calendar month, net rental payments could also include fractional monthly rental payments for the first and last months of the residential estate for years term. In addition, the date of the split purchase transaction, and the date that the residential estate for years terminates, are also entered as Input Data 18.

Residential estate for years valuation also includes the appropriate discount rate for the residential estate for years. But instead of inputting this number directly, the Logic Means 30 prompts a request (as Input Data 18) for the appropriate annualized Treasury bond interest rate for bonds of an equivalent average life to the residential estate for years, plus an appropriate risk/illiquidity premium, as discussed above.

To compute the residential remainder interest purchase price, the property sale price, together with any extra expenses (i.e., fees and commissions) arising in the securitization of the real estate components, are also entered as Input Data 18.

To estimate the depreciation and amortization deductions to which the residential estate for years purchaser is entitled, the Logic Means 30 assumes that the percentage of the property purchase price represented by land is not depreciable, but that the remaining portion of the purchase price is depreciable, as prescribed by the tax code. Thus, the Logic Means 30 requires the user to enter the percentage of property value that is not depreciable and the amounts and depreciation schedules for the remaining portions of the purchase price.

To project the after-tax cash flows of the residential estate for years investor, and hence this investor's projected after-tax income rate, the Logic Means 30 also uses the projected tax bracket schedule of the residential estate for years investor as Input Data 18.

To calculate the implied purchase price of the property for the residential remainder interest buyer at the time the residential estate for years expires, the Logic Means 30 further uses an implied risk-free opportunity cost of capital for the residential remainder interest buyer, typically though not necessarily the zero-coupon risk-free Treasury rate for the residential estate for years term, as Input Data 18.

Elements of the Financial Analysis Output 24 of Logic Means 30 include (1) a representation of the price for the estate for years (and/or augmented estate for years and/or residential estate for years) component, and (2) a representation of the price for the remainder (and/or complementary remainder and/or residential remainder) interest component. The price an estate for years (and/or augmented estate for years and/or residential estate for years) investor is willing to pay can be computed from the net rental cash flows, the interest rates in the bond markets, and the credit ratings of the tenants. The Logic Means 30 discounts the sequence of net rental payments scheduled during the estate for years (and/or augmented estate for years and/or residential estate for years) term at the required estate for years (and/or augmented estate for years and/or residential estate for years) discount rate to determine an appropriate purchase price for the estate for years (and/or augmented estate for years and/or residential estate for years). The price a remainder (and/or complementary remainder and/or residential remainder) interest investor must pay is computed as the difference between: (1) the sum of the property asking price plus the costs and fees associated with separating the components, and (2) the estate for years (and/or augmented estate for years and/or residential estate for years) valuation. This formula follows because between them the purchasers of the components must come up with the property asking price together with any extra expenses associated with creating the components. If these prices are acceptable to prospective component purchasers, then a separated purchase transaction of the real estate interests can be consummated.

In one embodiment, Logic Means 30 can have Compute Present Value of Enhancement 117, which computes the present value of any change in property value due to component separation. This value is computed as the difference between the present value of the residential estate for years after-tax cash flows, and the after-tax cash flows the residential estate for years would generate if the residential estate for years were still a part of undivided property and subject to the same tax deductions available to the owner of undivided property. The discount rate used to compute this present value is the after-tax income yield rate for both sets of cash flows.

Logic Means 30 outputs the present value of the change in two forms: expressed as a dollar amount, and expressed as a percentage of the gross property sale price.

The present value of the change must be greater than the cost of extra fees and commissions due to securitization, in order for component separation to be a value-enhancing process.

Value change is a rough measure of the attractiveness of component separation in each prospective transaction. However, it is not used directly in pricing components, nor in preparing documentation describing investment characteristics of the components.

Another embodiment involves a stand alone computer and a computer program (Logic Means 30) stored on a hard disk (of Memory System 28) of a 486 Personal computer (Computer 14). Unlike a hardwired equivalent embodiment, a programmable Computer System 12 is more readily adaptable to produce whatever output a user of Computer System 12 may desire with respect to a prospective separated purchase transaction. The preferred programming language is structured BASIC, although C, Fortran, or any other language with mathematical formulaic capabilities is acceptable. The operating version of the computer program for users should be in compiled code.

The Logic Means 30 includes Shell 40, which permits the option of accessing Word Processing Program 34 or a Title Screen 42 of a data processing system. Title Screen 42 informs the user of the name and ownership of the Logic Means 30, and provides notice of any copyrights or patents, etc.

The Title Screen 42 leads to a Menu 44 screen created by Computer System 12 to query the user as to whether the user wants to retrieve one of the Data Files 32 stored from a previous run of the Logic Means 30 that the user saved in Memory System 28 or to create a new data file to become a new one of the stored Data Files 32. If the user makes a menu selection indicating that the Logic Means 30 should retrieve one of the stored Data Files 32, the Logic Means 30 asks on a Retrieve Stored Data File Screen 46 for the name and directory of the selected Data File 32. Block 48 performs the function of recalling the appropriate one of Data File 32.

Otherwise, the user can make a menu selection at Block 44 to create a New Data File 50. Regardless of which of these selections is made, Logic Means 30 displays a Data Form 52 like Screen 1 of Specimen 1, which will either have blank spaces to receive Input Data 18 to fill in the Data Form or will already be completed as a stored Data File 32. Specimen 1, Screen 1, herein is a representation of a completed data form. This representation, which is illustrative only, involves 10-year leases and a certain pattern of rents, and as such, it is a limited illustration of the capabilities discussed herein. Also, a portion of the Financial Analysis Output 24 is presented in Screen 2 and Screen 3 of Specimen 1, which is a simplification over the use of a dedicated program to generate the Financial Analysis Output 24 after all of the Input Data 18 has been entered.

The Logic Means 30 has an Input/Edit Data Form 54 screen adapted to receive Input Data 18 from the user by manual operation of Keyboard 16. Thereby, the user is able to enter or edit a column of rents until all payments have been entered. The user is also able to edit data on the data form, as is discussed more particularly below. Editing a data form recalled from Data File 32 efficiently enables recomputing similar data without having to enter data all anew. Instructions informing the user of which keys perform the functions can appear at the top or bottom of the screen. After the user is satisfied that all information solicited in the data form has been entered correctly, the user enters a command to enable Data Processing 56. The Logic Means 30, in conjunction with Digital Computer 14, calculates the output parameters indicated in FIG. 4 to produce a new Data Form as Financial Analysis Output 24 in FIG. 2.

The Logic Means 30 also provides options to Print 58 the Financial Analysis Output 24 and to Store 60 the Financial Analysis Output 24 as a Data File 32. The user makes a selection at Blocks 58 and 60 by pressing an appropriate key on Keyboard 16.

The Logic Means 30 returns to the Main Menu 44 to either repeat the aforesaid sequence or to quit 62 to the Shell 40. The action of pressing an exit key at any point in the sequence, if this feature is used, should bring up a fail-safe screen requesting the user to confirm the exit instruction by pressing another designated key, or cancel the exit instruction by pressing any other key.

From Shell 40, the user can alternatively enter a selection to call up the Word Processing Program 34. Word Processing Program 34 can access the Stored Model Residential Estate For Years Financial Document 36 or the Stored Model Residential Remainder Component Financial Document 38 or other financial documents to modify the selected document to include information computed from Process Data 56. This information can include the expected returns under various performance scenarios, the price, and various quantitative descriptions of risk, e.q., prices under various scenarios. Process Data 56 can be contained entirely within one computer or can encompass a group of at least two computers that communicate, e.q., electronically. Thus, computations of the expected returns under the various performance scenarios can take place entirely within one computer or can take place within a group of computers that communicate computations and/or data on the expected returns under the various investment scenarios, e.q., electronically, within the group. Similarly, computations of the prices under the various performance scenarios can take place entirely within one computer or can take place within a group of computers that communicate computations and/or data on the prices under the various investment scenarios, e.q., electronically, within the group.

Edit 63 involves editing any of the stored model documents of Block 36, Block 37, and Block 38, particularly to incorporate information from a Stored Data File 32. Print Document 64 permits printing the modified selected document at Printer 22 as one of the Processed Component Financial Documents 26. Store Document 66 permits storing the modified selected document via Memory System 28. Quit to Word Processing Program 68 inquires whether the user prefers to return to Word Processing Program 34 to repeat a loop defined thereby, or to go to the Shell 40.

Other Stored Model Financial Document 37 represents other financial documentation required to successfully place the securitized components. For each component, these include at least one securities document, e.q., one or more of the following group: an organizational document for an entity such that a certificate evidencing an ownership or equity interest in the entity is a security, a security evidencing an ownership or equity interest in such an entity, and a disclosure document for securities law purposes, such as an offering memorandum, prospectus, or term sheet, which would normally include some or all of the following.

Security Description
Property Description and Legal Description
Lease Synopsis(ses) and Lease Agreement(s)
Financial Assessment(s) of Tenant(s)—
Financial Analysis Based Upon Various Assumptions and Inputs
Presentation of Risk Characteristics (In this description, the term "securities law" can refer to United States federal securities law alone or to all applicable United States federal, state and territorial securities law.)

The computer-aided method for generating financial documentation for a fractional interest in a contingent interest in property best includes generating at least one document of a set of documents collectively used in securitizing a fractional interest in a contingent interest in the property, the contingency interest associated with at least one lease default condition for the property, and printing the document, wherein at least a member of the set of documents is made by a computerized valuation of the fractional interest in the contingent interest in the property inserted in text data obtained from a memory.

Similarly, the computer-aided method for generating financial documentation for an equity interest in an entity for a residential estate for years interest best includes generating at least one document of a set of documents collectively used in securitizing an equity interest in an entity for the residential estate for years interest, the entity preferably a special purpose entity (SPE) for the residential estate for years interest, and printing the document, wherein at least a member of the set of documents is made by a computerized valuation of the equity interest in the entity for the residential estate for years interest inserted in text data obtained from a memory.

A portion of the Financial Analysis Output 24 is presented in Screens 2-4 of Specimen 2, which is a simplification over the use of a dedicated program to generate the Financial Analysis Output 24 after all of the Input Data 18 has been entered.

Figure 4A:
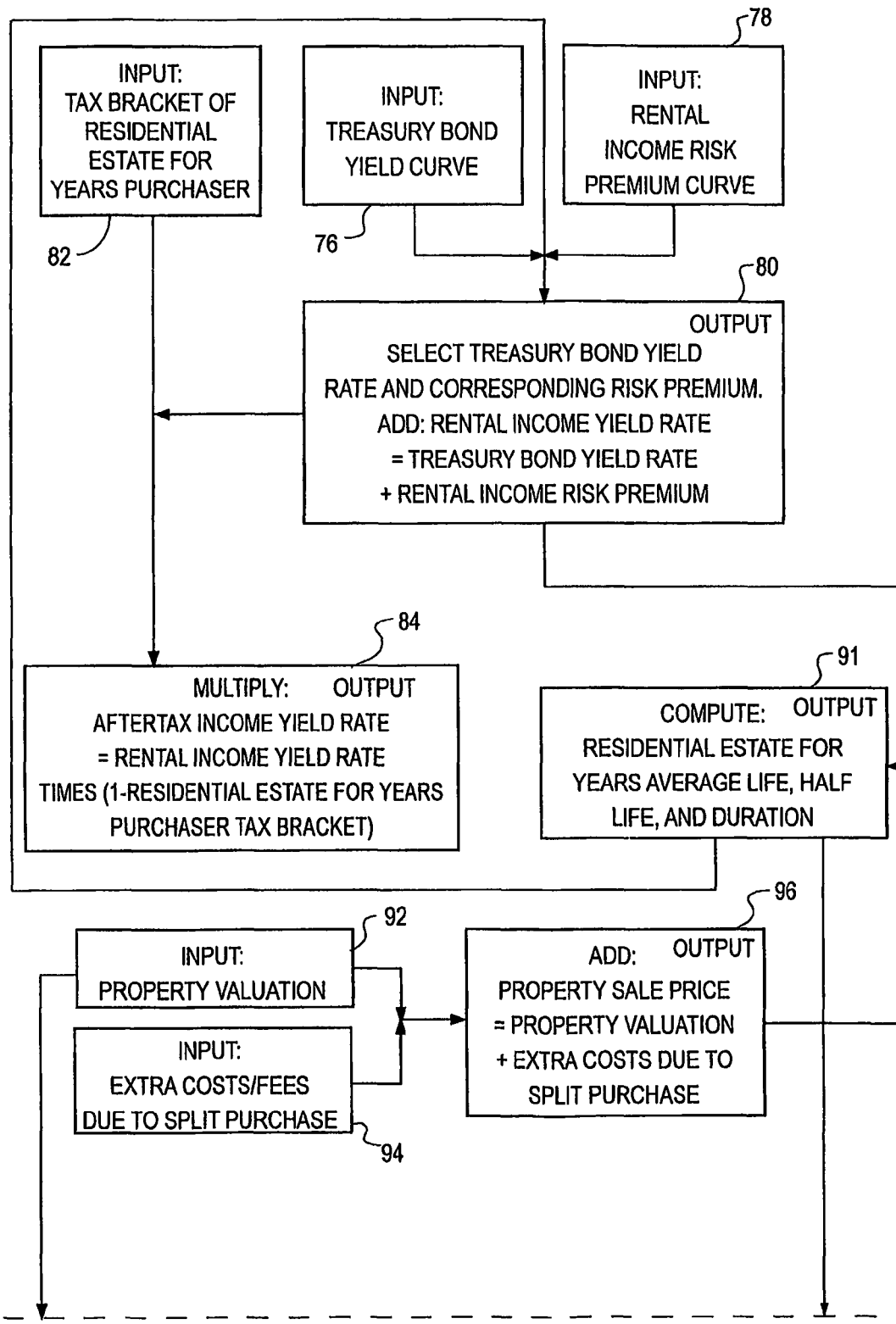
Figure 4B:
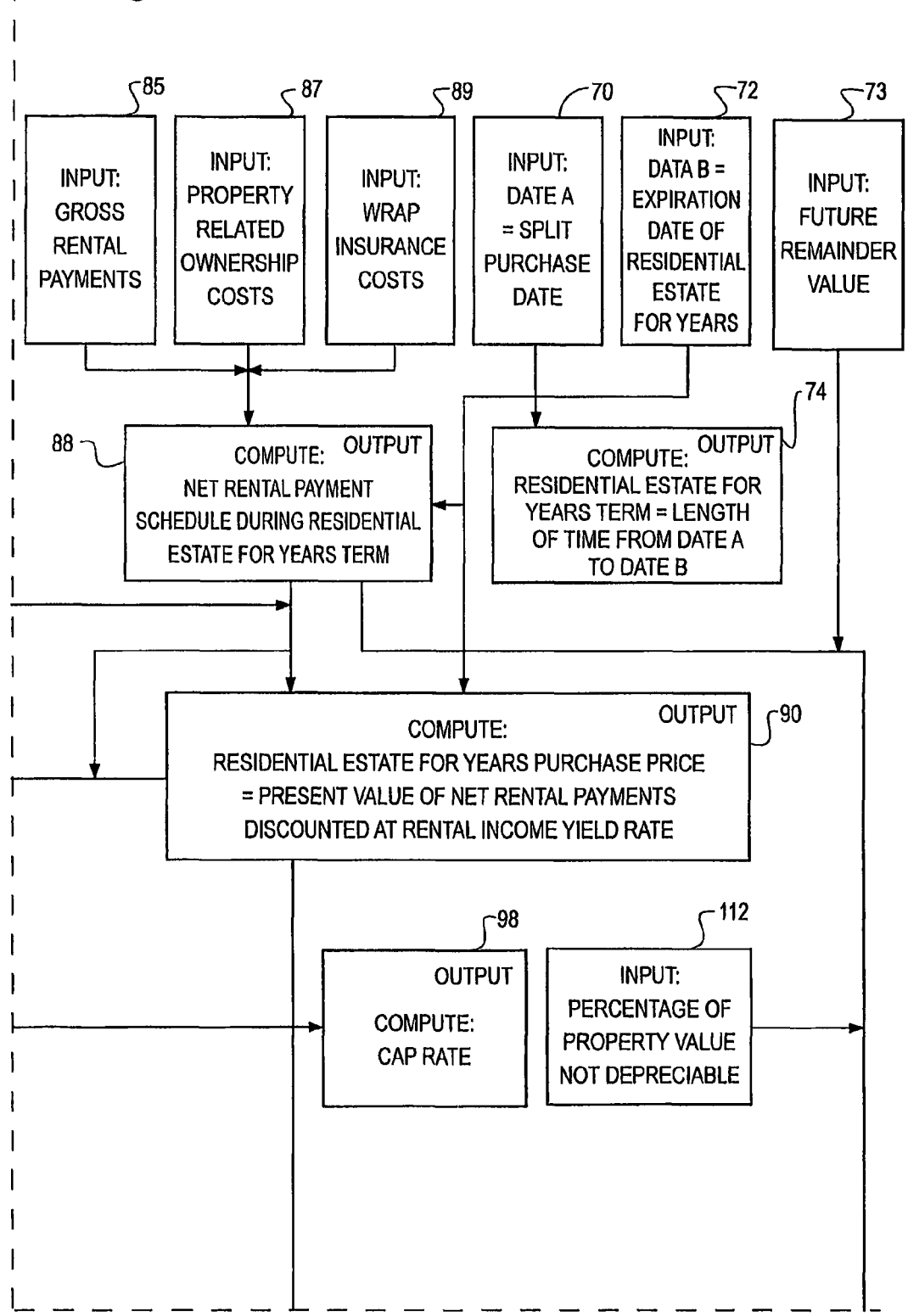
Figure 4E:
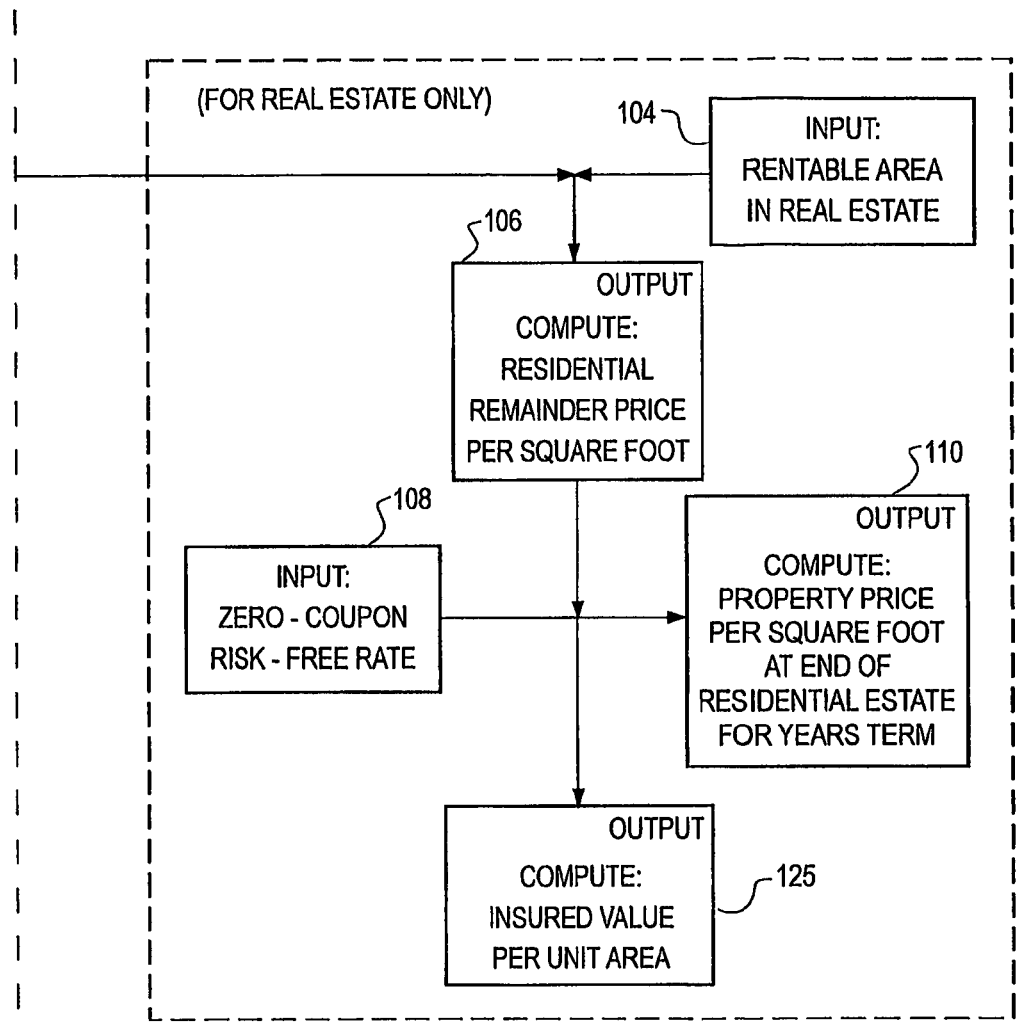

Turning now to FIG. 4, the input and computational logic of a preferred embodiment of Logic Means 30 is detailed. The logic of Input Date A 70 receives entry of the date on which a separated purchase transaction is to take place, and Input Date B 72 receives entry of the expiration date for the residential estate for years. The transaction date and the residential estate for years expiration date should be entered as numbers, i.e., the number of the month, the number of the day, so that the length of the period between the two dates can be easily computed in Compute Residential Estate For Years Term 74. Block 74 computes the number of whole and fractional months in the residential estate for years term, both as an output and for use elsewhere in the logic in computing discounted presented values and the schedules of annual and quarterly depreciation and amortization deductions, as discussed subsequently.

Usually, the end of the residential estate for years term will be on the last day of a calendar month, and the transaction date will be on the first or last day of a calendar month. Thus Block 72 stores the number of days in any fractional calendar month at the beginning or end of the term, if any, separately from, and in addition to, the length of the term (i.e., Block 72 keeps the number of days in beginning and end fractional calendar months separate from each other). By subtracting the separated purchase date from the expiration date of the residential estate for years, the Logic Means 30 can be used to compute the length of the residential estate for years term (e.q., "10 years", "9 years 8 months", or "9 years 10 months 11 days").

The Treasury yield curve input for Block 76 can be obtained, e.q., electronically, for example, from Treasury bond market database services (such as Bloomberg L.P.) accessible by subscription. The rental income risk premium curve input for Block 78 can also be obtained, e.q., electronically, for example, from one or more data services. More precisely, in the case of property leased to a single lessee with a fixed-income rating from one of the major fixed-income rating agencies, such as Standard and Poor's and Moody's Investors Service, the lessee credit rating can be obtained, e.q., electronically, for example, from one of the rating agencies. Bond market databases accessible electronically by subscription furnish data on corporate bond fixed-income risk premia, thereby enabling the computer to translate the lessee fixed-income rating into a current numerical risk premium by comparison of the lessee credit rating with the credit ratings corresponding to the numerical risk premia for bonds of similar average life in the database.

In the case of financings of residential property with the residential estate for years interests based on estate for years interest/remainder interest separation, rental income risk premia are competitive with risk premia in the home mortgage market. In this embodiment, the respective risk premia are taken to be identical, although they may differ slightly in other embodiments. Accordingly, current mortgage rates, e.q., for home loans, updated at least daily and available, for example, from mortgage brokers or from online home mortgage web sites, are the sum of current Treasury rates (e.q., usually the 10-year Treasury note rate in the case of financings of 20 years or longer) and the rental income risk premia.

The case of a residential estate for years based on an augmented estate for years involves slightly different processing. In this case, the expected loss rate due to default is less than the expected loss rate due to an estate for years alone. In the case wherein there is not a credit-wrap insurance policy for the estate for years, a numerical risk premium can be computed by comparing the reduced loss risk of the augmented estate for years with the expected loss risk of the estate for years component of the augmented estate for years. In the case wherein there is a credit-wrap insurance policy for the estate for years, a numerical risk premium for the augmented estate for years is computed by replacing the credit rating of the lessee with the credit rating of the insurer and then following the procedure for the case of commercial property to compute a numerical risk premium for the estate for years alone.

The Logic Means 30 also includes Input Treasury Bond Yield Rates 76 and Input Rental Income Risk Rates 78 for respectively receiving entry of the Treasury bond yield curve and the rental risk premium curve as a function of the yield curve. The output of Block 91, which is only slightly sensitive to changes in position on the yield curve, is used interactively to select the appropriate Treasury bond rate and rental income risk premium.

The data entered in Blocks 76 and 78 are used in Compute Rental Income Rate 80, which adds the data to compute the rental income yield rate, which is the discount rate used to value the pretax net rental payment cash flows. Rather than treating the value as an input, the Logic Means 30 has the user input the corresponding Treasury bond yield rate and the rental income risk premium appropriate for the tenant credit ratings (in the case of a residential estate for years based on an augmented estate for years, the risk premium as adjusted for the inclusion of one or more secondary contingent interests). The rental income yield rate is computed in Block 80 as the sum of the Treasury bond yield rate and the rental risk premium.

The Logic Means 30 also has Tax Bracket 82 for receiving input data representing the tax bracket of the residential estate for years purchaser. The residential estate for years purchaser will usually be a taxable investor, in order to take advantage of any tax deductions associated with ownership of the residential estate for years asset. The Logic Means 30 computes the after-tax income yield rate, (i.e., the marginal after-tax interest rate the residential estate for years investor receives on income from senior debentures of the same default risk as the residential estate for years in Block 84. The computation is the product of the pretax interest rate on those debentures (obtained from Block 80) multiplied by one minus the tax bracket of the residential estate for years purchaser (obtained from Block 80).

Input Gross Rental Payment 85, which is applicable for non-triple net leases, receives the projected gross rental payment. Input Property-Related Ownership Costs 87, which is also applicable for non-triple net leases, receives the projected ownership costs. In the case of triple-net leases, this can include the amounts of future property tax and property insurance payments. Block 87 also receives information updates throughout the life of the residential estate for years on lease payments, including amounts of rent paid and when the payments are received. Block 87 also receives information updates on deposits to any residential estate for years escrow accounts, including escrow account amounts paid and when the payments are received.

Input Wrap Insurance Costs 89 is actually a part of Input Block 87 in the case of non-triple net leases, but is broken out and made a separate input in the case of inadequate net leases i.e., net leases in which lessees are not responsible for property taxes and insurance. This is the schedule of insurance payments for the wrap insurance policy(ies) used to upgrade an inadequate net lease and/or to credit-enhance a residential estate for years, for example, for the case in which the residential remainder owner is a poor credit risk.

Input Wrap Insurance Costs 89 can also receive the schedule of insurance payments for credit-enhancement insurance in the case of a residential estate for years interest based on an augmented estate for years interest, in which the augmentation to the estate for years due to at least one secondary contingent interest in the at least one remainder (and/or complementary remainder) interest provides the holder with greater protection against economic loss than could be expected based on lessee creditworthiness alone. In this case, the inclusion in the augmented estate for years of at least one secondary contingent property interest can materially reduce the loss risk for the provider(s) of credit-enhancement insurance relative to the expected loss risk that would be incurred by insuring the estate for years interest alone. Such a reduction in relative loss risk can reasonably be expected to result in a material reduction in the cost of the credit-enhancement insurance relative to the corresponding expected cost of credit-enhancement insurance for the estate for years interest alone.

Compute Scheduled Net Rental Payments 88 receives the data input in Blocks 85, 87, and 89 to compute net rental payments during the residential estate for years term, as mentioned above. However, for net leases, and in particular, triple-net leases, Block 88 can be an input of net rental payments, with Blocks 85 and 87 unnecessary, and Block 89 optional or unnecessary: (1) unnecessary in the case of adequate, e.q., bondable, net leases; and (2) optional for other net leases, depending on whether or not insurance to upgrade the net lease to adequate status is implemented, which is usually the case if the insurance is expected to be cost-effective. If the user selects to enter the monthly rental payments manually, the Logic Means presents Screen 54 with the aforementioned two columns: a list of the calendar months in the residential estate for years term (beginning with the month that includes the transaction date, and ending with the month that includes the expiration date of the residential estate for years security) on the left, and corresponding spaces for rental payments on the right. Alternatively, in the (typically occurring) cases of leases which have constant net rental payments, or for which the term can be divided into a small number of subterms during each of which the net rental payments are constant, the various net rents and the periods to which they apply may be entered in lieu of a month-by-month net rent schedule. Throughout the term of the residential estate for years, Compute Scheduled Net Rental Payments 88 can also compute the amount of any rent in arrears from information updates on amounts actually paid that are received from Block 87. Block 88 can compute the amount of the next required rent payment, and the amount of the next required payment combining the next rent payment due and the amount of the rental arrearage, which can include a penalty.

In the case of a residential estate for years with an escrow account for pro rata property tax and/or property insurance payments, Compute Scheduled Net Rental Payments 88 can also compute the schedule of future pro rata property tax and/or pro rata property insurance payments. Throughout the term of the residential estate for years, Block 88 can compute the amount of the next required pro rata escrow payment in each applicable category (usually, there will be a single account for both tax and insurance), as well as any amounts in arrears in each applicable category, the total arrearage, and the total amount due including any arrearage, which can include a penalty, from information updates received from Block 87. Block 88 can combine escrow account arrearages with rental arrearages to compute the total amount of arrearages. Block 88 can also compute the total amount due on the due date for the next rent payment, including arrearages, by combining the total amount due for each escrow account with the total rental amount due. Block 88 can also compute the total amount due without allowing for arrearages.

The information update function of Block 87 and the computations of Block 88 based on the information updates can be performed by the computer system, but also may be performed by another computer system, which can also generate documentation containing at least some of the output from Block 88.

The data input in Block 88 is used in Compute Residential Estate for Years Purchase Price 90 (see, equation 1 below). The residential estate for years purchase price, which is implied by the rental income yield rate, is the discounted present value of the net scheduled rental payments, valued at the rental income yield rate computed in Block 80. If the transaction date is the first day of a calendar month, and the residential estate for years term consists of a whole number of months, then Formula 1 gives this value.

$$\text{Residential Estate for Years Purchase Price} = \sum_{j=1}^{N} \frac{(\text{rent in } j\text{th month})}{(1 + r/12)^{j-1}}, \quad (1)$$

where r=the annual rental income yield rate, and N=the number of months in the residential estate for years term.

The data input for Block 90 together with the output of Block 90 is used in Block 91 to compute the weighted average life, half life, and duration, for the Residential Estate for Years. One or more of these values—the weighted average is currently the preferred choice—is typically used by investors to determine which value on the Treasury yield curve is the most suitable choice for input through Block 76. Because these values only vary by relatively small amounts as the inputs from Blocks 76 and 78 are varied, rough estimates of the correct place on the yield curve can be used for these inputs, with the output of Block 91 then used iteratively to correct the original estimates; alternatively, the iterative loop can be omitted, and instead performed manually by the user to select among candidate yield curve values and converge interactively to the appropriate place on the yield curve based upon the output of Block 91. If the manual mode is employed, one, two or at most three, iterations will be required to converge to the correct yield curve value.

The Logic Means 30 additionally has Input Property Valuation 92 for receiving input data representing a property valuation of the real estate; Input Extra Fees 94 is for receiving input data representing fees and expenses incurred in structuring the separated purchase transaction. The securitization and separation of a property into components often entails greater costs than a traditional real estate sale.

The gross property sale price is computed in Property Sale Price 96 as the sum of the value of the undivided property (from Block 92) and the incremental expenses required to split the real estate into components (from Block 94). Expenses beyond those required in a conventional real estate transaction are considered here.

Compute Cap Rate 98 computes a rather crude indicator of the return on the investment. The cap rate is computed by dividing the total first year rent (from Block 88) by the gross property sale price of the undivided property (from Block 96).

Residential Remainder Interest Purchase Price 100 computes the residential remainder interest purchase price as whatever amount in addition to the residential estate for years purchase price is required to put together the price required to purchase the real estate. This value is computed by subtracting the residential estate for years purchase price (from Block 90) from the gross property sale price (from Block 96).

Residential Remainder Interest Implied Annual Return 102 computes the residential remainder interest component implied annual return, which is the annualized return the residential remainder interest investor will have earned if the value of the property when the residential estate for years expires is determined by multiplying Input Future Residential Remainder Value 73 by Input Property Valuation 92. Input Future Residential Remainder Value 73 is the expected residential remainder value at the end of the residential estate for years term, expressed as percentage of Input Property Valuation 92. In the case of institutional grade real estate, the input value received by Input Future Residential Remainder Value 73 will frequently be close or equal to 100%, reflecting the frequently applicable assumption that the value of the decomposed property is expected to change little or not at all across the residential estate for years term.

This interest rate is the only unknown quantity in Formula 2, which is set forth below.

$$\text{Expected Property Valuation} = (\text{Residential Remainder Component Purchase Price})(1+x)^{[N/12]}(1+(N/12-[N/12])x) \quad (2)$$

where Expected Property Valuation is the product of Input Future Residential Remainder Value 73 and Input Property Valuation 92, N=number of months in the residential estate for years term, [N/12]=the largest integer that is less than or equal to N/12, and x=residential remainder component implied annual return, i.e., the output of Residential Remainder Interest Implied Annual Return 102.

Input Rental Area 104 is for receiving data input representing the rentable area in the real estate. This data is used in Residential Remainder Price Per Square Foot 106 to compute the residential remainder price per square foot, which is computed by dividing the residential remainder interest purchase price (from Block 100) by the number of rentable square feet in the property (from Block 104).

Input Zero-Coupon Risk-Free Rate 108 is for receiving data input representing the zero-coupon risk-free rate. Then, in Block 110, the price per square foot that the residential remainder interest buyer is paying at the time the residential remainder interest matures into full ownership of the property is computed as equaling the amount to which the residential remainder price per square foot increases when it accrues interest at the zero-coupon risk-free rate. Formula 3 is used to compute this value.

$$\text{Price/Sq. Ft.} = (\text{Residential Remainder Price/Sq. Ft.})(1+\text{zero-coupon risk-free rate})^{[N/12]}(1+(N/12-[N/12])(\text{zero-coupon risk-free rate})) \quad (3)$$

where N=number of months in the residential estate for years term, and [N/12]=the largest integer that is less than or equal to N/12.

Although this is the correct formula for a comparison of residential remainder interest prices at the beginning and end of the residential estate for years term in an arbitrage-free market, the residential remainder interest investor may find it more instructive to transforming this equation into a capital budgeting relation by substituting the residential remainder interest investor's opportunity cost of equity or debt capital for the risk-free rate.

Percentage of Property Value Not Depreciable 112 is for receiving input data representing a percentage of property value represented, in the case of real estate, by the land. If a conservative cost recovery position is taken by the residential estate for years investor and only amortization is claimed as a tax deduction, which is the likeliest scenario at the current time, then this input is unnecessary. If depreciation as well as amortization is claimed by the residential estate for years holder, then this value is used in Block 114 to compute the schedule of depreciation and amortization tax deductions, together with the resulting adjustments to the residential estate for years tax basis. These must be computed very carefully because if both deductions are claimed then the deductions are not completely independent of each other, and because the interaction is complex and subtle.

Under present tax law, during the residential estate for years term, the residential estate for years is usually entitled at least to a deduction computed by straight line amortization of the residential estate for years acquisition cost, and possibly depreciation deductions as well, with reductions in each end-of-year tax basis computed in accordance with established tax accounting principles. The amortization will usually take place over the portion of the lease term that precedes any terminal rent recovery period. In the case where the residential estate for years interest is viewed as debt of the residential remainder interest holder, the residential estate for years holder may be required to take amortization deductions according to a debt amortization schedule.

After computing the values of these annual deductions, the investor allocates fractions of the deductions to each tax quarter as instructed in the present tax code (e.q., if the first year is the entire calendar year, one quarter of each deduction is allocated to each quarter), and the tax basis is reduced accordingly on a quarterly basis.

The quarter-by-quarter amortization and depreciation deductions, and the corresponding quarterly adjustments to the residential estate for years tax basis, will be entered into a preformatted table. This table will be available for viewing on the Monitor 20, can be stored with the other output data if saved in Data File 32 by the user of Computer System 12, and can be printed at Printer 22 if the user presses a designated key on the Keyboard 16. (It should be noted that this embodiment uses the tax code, whatever it may require, in decomposing the real estate into separate components; the computer system and methods involving it of course do not depend upon the present tax laws.)

Block 116 computes quarterly tax payments by subtracting the quarterly tax deductions from the quarterly net rental payments, and multiplying the result by the tax bracket of the residential estate for years investor. This is output since it is part of the accounting support for the residential estate for years investor.

Typically, tax payments are made by institutional investors four times per year, in the middle of months 1, 4, 7, and 10. The after-tax income component yield, which is computed in Block 118, is the after-tax yield to the residential estate for years buyer, and is the internal rate of return on the after-tax net rental cash flows. For rental payments made at the beginning of each month, it is preferred to divide the year into twenty-four (24) semi-monthly periods with cash flows at the beginning of each period. With this approach, the pretax rents are the cash flows in the odd-numbered periods (i.e., periods 1, 3, 5, . . . , 21, 23), while the tax payments are the cash flows in periods 2, 8, 14, 20 (in the other even-numbered periods, the cash flows are treated as being equal to zero).

An alternative is to simplify the calculation conceptually for the residential estate for years holder by assuming that tax deductions occur with the same frequency as the cash flows (typically, on a monthly basis), and matching the occurrence of the tax deductions with the corresponding cash flows. In this case, for computational purposes the year will be divided into the same number of periods as the expected frequency of cash flows—typically, twelve periods, or monthly.

In Pretax Income Component Yield 120, the pretax income component yield is computed as the pretax interest rate that the residential estate for years buyer would have to receive if the residential estate for years were a bond, in order to be left with the same amount of after-tax income that results from owning the residential estate for years. This number is computed by dividing the after-tax income component yield (from Block 118) by one minus the tax bracket of the residential estate for years investor (from Block 82).

If the residential estate for years purchaser is a taxable investor, this number will usually be larger than the rental income yield rate of Block 80. This occurs because the residential estate for years is an income-producing asset rather than a bond, and hence income from the residential estate for years is subject to different tax regulations than income from a bond.

Block 122 computes the equivalent after-tax residential estate for years value by discounting the after-tax net rental payments at the after-tax income yield rate. This is the discount rate that would be applied to the after-tax cash flows if the residential estate for years were a bond.

Block 122 may compute other measures of the residential estate for years value by discounting different components of the after-tax cash flows at different discount rates that reflect the different risk characteristics of those components (e.q., discounting the pretax cash flows, tax payments, and tax deductions at rates that reflect the different degrees of certainty that they will be realized as projected at the time of component separation).

In cases in which the residential remainder component is to be decomposed into a preferred fixed-income interest and a residual equity interest, Input Credit Risk Premium Curve 105 receives the credit risk premium curve of the insurer for the preferred interest. Input Extra Months to Retire Preferred 103 receives the amount of time beyond the residential estate for years term, if any, that the residual equity interest investor has to refinance or sell the property and pay off the preferred interest holder. Average Life 95 computes the expected life of the preferred interest in the residential remainder component by adding the residential estate for years term to the value received by Input Extra Months to Retire Preferred 103, which equals the average life of the preferred interest since the preferred interest is a zero-coupon bond. Preferred Interest Annual Return 97 selects the Treasury bond yield rate from Input Data 78 and corresponding insurance credit risk premium from Input Data 105 corresponding to the preferred equity interest average life, and computes the preferred interest annual return by adding the Treasury bond yield rate to the insurance credit risk premium.

Input Insured Property Value 101 receives the insured value for the property at a date specified by the residual value insurance (e.q., at maturity of the preferred interest), expressed as a percentage of Input Property Valuation 92. Preferred Interest Purchase Price 99 converts the insured value for the property to a nominal amount by multiplying Input 101 and Input 92 together, and then computes the preferred interest purchase price by discounting the insured property value at maturity of the preferred interest back to the date of the temporal decomposition by the equation:

$$\text{Preferred Interest Purchase Price} = \text{Insured Property Value}/((1+y)^{[M/12]}(1+(M/12-[M/12])y)) \quad (4)$$

where y=preferred interest annual return, and M=number of months in the expected life of the preferred interest.

The cost of decomposing the residential remainder component into preferred and residual interests is computed in Residual Interest Purchase Price 113 as the sum of the cost of residual value insurance from Input Insurance Policy Premium 107 and any additional associated up-front fees from Input Additional Up-Front Fees 109, such as the costs of obtaining a credit rating for the preferred interest and of generating financial disclosure documents for the preferred and residual interests. Residual Interest Purchase Price 113 then computes the residual interest purchase price from the equation that the sum of the preferred interest and residual interest purchase prices is equal to the sum of the purchase price of the residential remainder component from Residential Remainder Interest Purchase Price 100 and the cost of decomposing the residential remainder component into the preferred and residual interests. This is a linear equation in which the only unknown quantity is the purchase price of the residual interest, which implies that the equation can be solved for the residual interest purchase price as follows:

$$\text{Residual Interest Purchase Price} = \text{Residential Remainder Component Purchase Price} + \text{Residual Value Insurance Policy Premium} + \text{Additional Up-Front Fees} - \text{Preferred Interest Purchase Price} \quad (5)$$

In some exceptional cases, it may be desirable to use a fraction of the residual value insurance to insure the return on the preferred interest, reserving the remaining fraction of the residual value insurance to insure a portion of the return on the residual interest. This can lower the investment risk associated with the residual interest, enhancing the marketability of the residual interest by sacrificing some residual interest leverage. In such cases, the expression on the right side of Equation (4) for the preferred interest purchase price must be modified as follows: the right side of the equation must be multiplied by the fraction that represents the portion of residual value insurance that is allocated to insurance for the preferred interest return. Equation (5) still provides the solution for the residual interest purchase price in terms of the preferred interest purchase price.

Input Exit Fees 111 receives the expected future cost of liquidating or refinancing the residential remainder interest in order to raise the funds required to retire the preferred interest, which cost is expressed as a percentage of the expected property valuation at maturity computed in Block 102.

Residual Interest Annual Return 115 computes the expected annual return on the residual interest over the expected life of the preferred/residual decomposition. This interest rate is the only unknown quantity in the following equation:

$$\text{Expected Residual Interest Valuation at Maturity} = (\text{Residual Interest Purchase Price})(1+z)^{[M/12]}(1+(M/12-[M/12])z) \quad (6)$$

where Expected Residual Interest Valuation at Maturity is the value obtained by subtracting the sum of the preferred interest valuation at maturity and the expected nominal amount of exit fees from the expected property valuation at maturity from Block 102, z=residual interest annual return, and M=number of months in the expected life of the preferred interest. The preferred interest valuation at maturity equals the value of the portion of the minimum property value specified by the residual value insurance that is allocated to the preferred interest, which portion usually is equal to the entire amount of the specified minimum property value. The expected nominal amount of exit fees is obtained by multiplying the percentage value from Input Exit Fees 111 by the nominal value of the expected property valuation at maturity.

Residential Remainder-to-Residual Ratio 119 divides the residential remainder interest valuation by the residual interest valuation. This represents the factor by which the amount of equity risk capital required to complete the acquisition and decomposition of the property is reduced via the use of residual value insurance to carve a fixed-income preferred interest out of the residential remainder component.

Residual Leverage Ratio 121 computes the factor by which leverage for the equity investor is increased (for the case of the scenario specified by the input values) by carving a preferred fixed-income interest out of the residential remainder component. This is computed by the following equation:

$$\text{Residual Leverage Ratio} = (\text{Residential Remainder-to-Residual Ratio})(\text{Expected Residual Valuation at Maturity}/\text{Expected Property Valuation}) \quad (7)$$

where Residential Remainder-to-Residual Ratio is obtained from Block 119, Expected Residual Valuation at Maturity is obtained from Block 115, and Expected Property Valuation is obtained from Block 102.

In Blocks 115 and 121, the residual interest annual return and the residual leverage ratio are computed net of fees associated with raising the funds required to retire the preferred interest. This is a financially conservative approach to the computation of these values and differs from the approach frequently taken in disclosure documents, which is to compute returns and leverage ratios based on asset values before imposition of any back-end liquidation or refinancing fees. It is important to note that the alternative values for the residual annual return and residual leverage ratio before imposition of back-end fees are also generated by this software, by setting Input Exit Fees 111 equal to zero.

By contrast, the incorporation of an assumed exit fee at the end of the residential estate for years term in Residential Remainder Interest Implied Annual Return 102 and the expected property valuation input to Residual Leverage Ratio 121 is usually inappropriate in the case of a residential remainder interest that is not leveraged or decomposed into components, since in this case the residential remainder interest holder usually does not face an automatic need to refinance the property at the end of the residential estate for years term. In cases in which the residential remainder holder is expected to face such a need, expected exit fees can be subtracted from Input Future Residential Remainder Value 73 either before or after data entry. This modification will flow through automatically to make appropriate modifications for expected residential remainder holder exit fees to the calculations for Residential Remainder Interest Implied Annual Return 102 and Residual Leverage Ratio 121.

Insured Value Per Unit Area 125 computes the insured value of the property per unit area of rentable space by multiplying the property valuation from Input Property Valuation 92 by the insured value for the property from Input Insured Property Value 101 (as specified at maturity of the preferred interest by the residual value insurance and expressed as a percentage of Input Property Valuation 92) and dividing the resulting product by the rentable area of the property, usually in square feet, received from Input Rental Area 104.

In using Computer System 12 and the Financial Analysis Output 26, the user of Computer System 12 can construct financial documents by using a Word Processing Program 34 to revise such documents as those in Specimen 2 and the Stored Other Financial Document 37. These documents contain other terms and conditions and other particulars for the separated purchase transaction of the components of the real estate, in accordance herewith.

In another embodiment, that applies the component separation technology to intangible property, the Logic Means 30, in conjunction with the rest of System 12, is used in connection with financial transactions involving separate components of one or more partnership interests in tax-exempt securities.

In this embodiment, Logic Means 30 partially automates the dividing of the partnership interest into respective, valued interests for the estate for years (and/or augmented estate for years) and the remainder (and/or complementary remainder) interest. Computation of the values is based on fixed-income pricing techniques widely accepted by fixed-income investors.

In this other embodiment, the hardware, logic, and computer screens are as described above, with modifications to reflect the different kind of property being divided. Reflecting these modifications, Data Form 52, of which Screen 1 of Specimen 2 is an example, accepts inputs for a tax-exempt security with constant debt service payments.

The user enters or edits a column of debt service payments (instead of the rents in the above-mentioned embodiment) until all payments have been entered.

Other Stored Model Financial Document 37 represents other financial documentation required to successfully place the securitized components. For each component, these include a securities document, e.q., one or more of the following group: an organizational document for an entity such that a certificate evidencing an ownership or equity interest in the entity is deemed a security for securities law purposes, a security evidencing an ownership or equity interest in such an entity, and a disclosure document for securities law purposes, such as an offering memorandum, prospectus, or term sheet, which would normally include some or all of the following:

Security Description
Entity Description
Tax-Exempt Fixed-Income Security(ies) Held by Entity (Description)
Description of Borrower(s) Financial Assessments
Financial Analysis Based Upon Various Assumptions and Inputs
Presentation of Risk Characteristics In this description, the term "securities law" can refer either to United States federal securities law alone or to all applicable United States federal, state and territorial securities law.

FIG. 5 represents the input and computational logic of this embodiment of Logic Means 30, which again is substantially as discussed in the above-mentioned embodiment. The pricing logic for components is analogous to the pricing of the estate for years (and/or augmented estate for years) in the case of tangible property. However, unlike the application to tangible property, every financial asset in the present embodiment—the original asset together with all components—is treated as a fixed-income asset, and is valued via fixed-income technology.

Values can be expressed, and computations performed, in absolute terms of a currency unit such as dollars, or in relative terms such as percentages of current value or original issue value of the tax-exempt securities in the partnership portfolio of interest. While all contracts ultimately require values to be expressed in absolute terms, comparisons of profitability are more easily made in relative terms. Specimen 2 illustrates both modes of expression for System 12 input and output.

To simplify the language in what follows, the remaining discussion will refer to "securities" in the singular only, i.e., "security;" however, it will be understood that the discussion applies both to single-security portfolios and multiple security portfolios held by the partnership.

Where possible, the discussion will simply refer to the security as the "partnership portfolio." Similarly, the term "investor," when applied to the holders of estate for years (and/or augmented estate for years) and remainder (and/or complementary remainder) components, is intended to refer to both the singular and plural cases.

The logic of Input Data 124 receives a schedule of interest rates for AAA publicly traded general obligation municipal bonds of annual maturities from one to thirty-five years. This serves as the analogue of the yield curve for the tax-exempt bond market, i.e., the basis for pricing all other tax-exempt securities, and this input is used by each pricing calculation herein. Input Data 126 receives a schedule of additional interest investors expect for holding a type of tax-exempt portfolio held by a limited partnership. Block 136 roughly estimates a remaining average life of the partnership portfolio, selects the corresponding AAA general obligation rate and risk premium, and adds them to obtain the current yield required by the fixed-income market for the partnership portfolio.

Input Data 132 receives the schedule of payments expected from the partnership portfolio. This will usually be in the form of a file specifying payment values and dates. However, in some cases an alternate description may be appropriate. For example, in the case of a single-security portfolio with constant debt service, the specification of principal value, frequency of payments, and amortization term constitutes a description from which, together with the yield rate from Input Data 134, a schedule of debt service payments may be reconstructed.

Using data received by Input Data Blocks 130 and 132, Block 142 extracts a schedule of remaining cash flows expected from the partnership portfolio, and computes a present value by discounting the cash flows at the rate received from Block 136. Based on this present value, an improved estimate of the average life of the portfolio is computed by Block 140.

Block 136 uses this improved estimate iteratively to recompute the current portfolio yield, and the recomputed portfolio yield is used by Blocks 142 and 140 to recompute the portfolio value and average life, respectively. As discussed earlier, average life is relatively insensitive to changes in the discount rate, so one or two iterations is almost always sufficient to obtain consistent output values that will not change with additional iterations.

This linked iteration is used four more times in the logic of Logic Means 30: in the calculations of discount rate, and the price, and the average lives of the estate for years (and/or augmented estate for years) and the remainder (and/or complementary remainder) interests. The other examples are virtually identical, and will not be discussed separately.

Box 146 receives a percentage of the partnership that will be separated into estate for years and remainder (and/or augmented estate for years and complementary remainder) components, and Box 148 computes a complementary value of the partnership that will not be separated into components. It is possible that several partnership interests will be separated into components, and that various estate for years (and/or augmented estate for years) components will have distinct terms; however, typically there will be only one partnership interest that will be separated into components, and it will be the entire limited partnership interest. Consequently, the "term" of the estate for years (and/or augmented estate for years) is clear because usually there is only one estate for years (and/or augmented estate for years). However, the disclosure is intended to include the more general case of multiple component separations as well.

The choice of partnership percentage that will be separated into components as an input is arbitrary, at least in the case in which one component is separated into components. It is equally acceptable to input the partnership percentage that will not be separated into components, and to output the percentage of the partnership that will be separated into components.

Block 148 receives the schedule of partnership cash flows that will be received after the date the components are separated and decomposes the cash flows into interest and repayment of principal portions, using the original interest rate at which the security was issued (from Input Data 134). These distinctions are important in valuing the components because, under current federal tax law, only the interest portion of each payment is automatically tax-exempt; the repayment of principal portion is sheltered from federal taxation only to the extent that cost recovery deductions generated by the security are available to the security holder(s).

It will frequently be the case that the original tax-exempt interest rate received by Input Data 134 equals the current tax-exempt yield rate computed by Block 136. One natural way for this to occur is if the tax-exempt security in the partnership portfolio is created at the same time as the estate for years and remainder (and/or augmented estate for years and complementary remainder) components. In this case, the embodiment defined herein will generate documentation for the tax-exempt security as well as documentation for the estate for years and remainder (and/or augmented estate for years and complementary remainder) components.

Block 152 multiplies the payment schedules for interest and repayment of principal by the percentage of the partnership that will be separated into components to compute schedules for interest payments and repayment of principal payments that will be split between the components.

The length of the estate for years (and/or augmented estate for years) term received by Input Data 150 is used by Blocks 154 and 156 to split the schedules of interest and repayment of principal payments into schedules of payments that will be received by the estate for years (and/or augmented estate for years) investor and the remainder (and/or complementary remainder) investor, respectively.

Block 158 receives the schedule of risk premium values for a security of the type represented by the estate for years (and/or augmented estate for years). The estate for years (and/or augmented estate for years) risk premium schedule is related to the partnership portfolio risk premium schedule, but may differ due to different investor perceptions of risk in the two types of investments. While credit risk for the estate for years (and/or augmented estate for years) is usually the same as credit risk for the partnership portfolio, liquidity risk may be different. The liquidity risk will be increased if the estate for years (and/or augmented estate for years) is viewed as more difficult to sell prior to maturity than the partnership portfolio, as will be the case before this product is well-established in the fixed-income marketplace. But the liquidity risk will also lessen because the average life of the estate for years (and/or augmented estate for years) is shorter than the average life of the partnership portfolio. The combined effect on liquidity risk as perceived by investors is difficult to predict, and may have to be dealt with on a case-by-case basis.

The estate for years (and/or augmented estate for years) risk premium may also contain a component due to perceived tax risk, i.e., the risk that not all of the predicted incremental tax benefits associated with the estate for years (and/or augmented estate for years) will be received by the estate for years (and/or augmented estate for years) investor. This risk may be substantial in some cases, and nonexistent in others. For example, if the estate for years (and/or augmented estate for years) component carries insurance against loss of economic benefits due to a change in the tax laws, the estate for years (and/or augmented estate for years) investor would not be expected to demand additional return for tax risk, because this investor is not exposed to any risk of economic loss as a consequence of this risk dimension.

For marketing purposes, the estate for years (and/or augmented estate for years) component may disburse cash payments according to a different schedule than the partnership portfolio. For example, the partnership portfolio may receive payments monthly, or at irregular intervals (e.g., if the portfolio contains several securities), whereas the estate for years (and/or augmented estate for years) makes disbursements semiannually. Input Data 160 receives the frequency of estate for years (and/or augmented estate for years) cash disbursements, and Input Data 162 receives the tax-exempt interest rate the general partner(s) guarantee to accrue on warehoused payments from the partnership portfolio, usually from a tax-exempt money market fund.

Block 166 computes the cash payment schedule of the estate for years (and/or augmented estate for years) component. Each payment is computed by adding together the portion of the partnership portfolio disbursements warehoused for the estate for years (and/or augmented estate for years) investor since the last disbursement, and adding to that the interest accrued on the warehoused payments.

Block 164 computes the estate for years (and/or augmented estate for years) yield rate as in the case of the partnership portfolio yield rate (cf. Block 136).

Block 174 computes the estate for years (and/or augmented estate for years) purchase price by discounting the cash flows from Block 168. In general, this computation is an interactive process. First, Block 170 discounts the aftertax estate for years (and/or augmented estate for years) cash flows at the estate for years (and/or augmented estate for years) yield rate computed by Block 164. This discounts all of the interest portions of the cash flows, but assumes that repayment of principal portions are reduced by tax payments before discounting, where tax payments are computed using the projected tax rates from Input Data 162.

Figures 1, 5A:
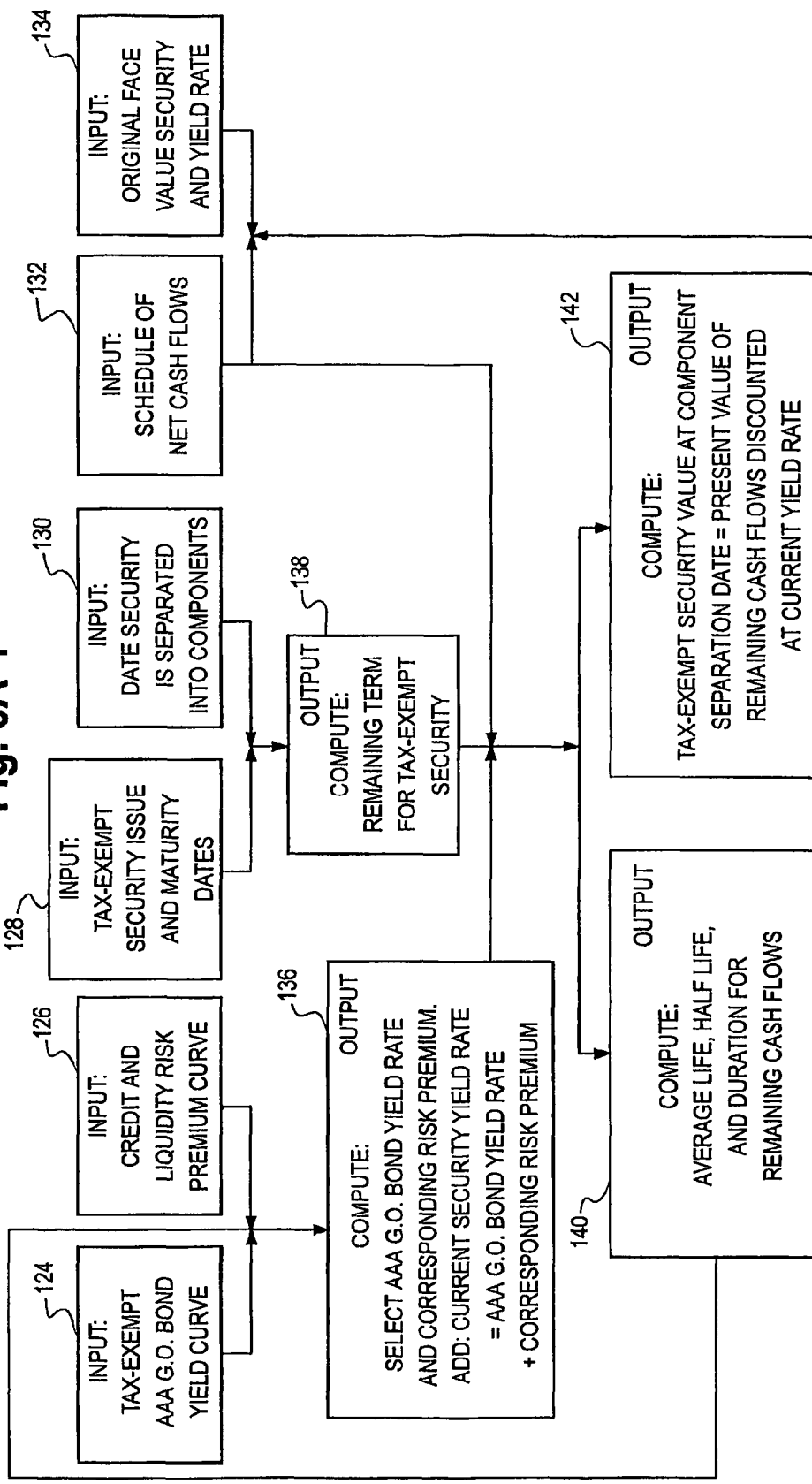
FIGS. 5a-5d is a flow chart showing the data input, computational and other logic, and data output of the logic means for controlling the computer system, as applied to tax-exempt property.
Figures 2, 5A:
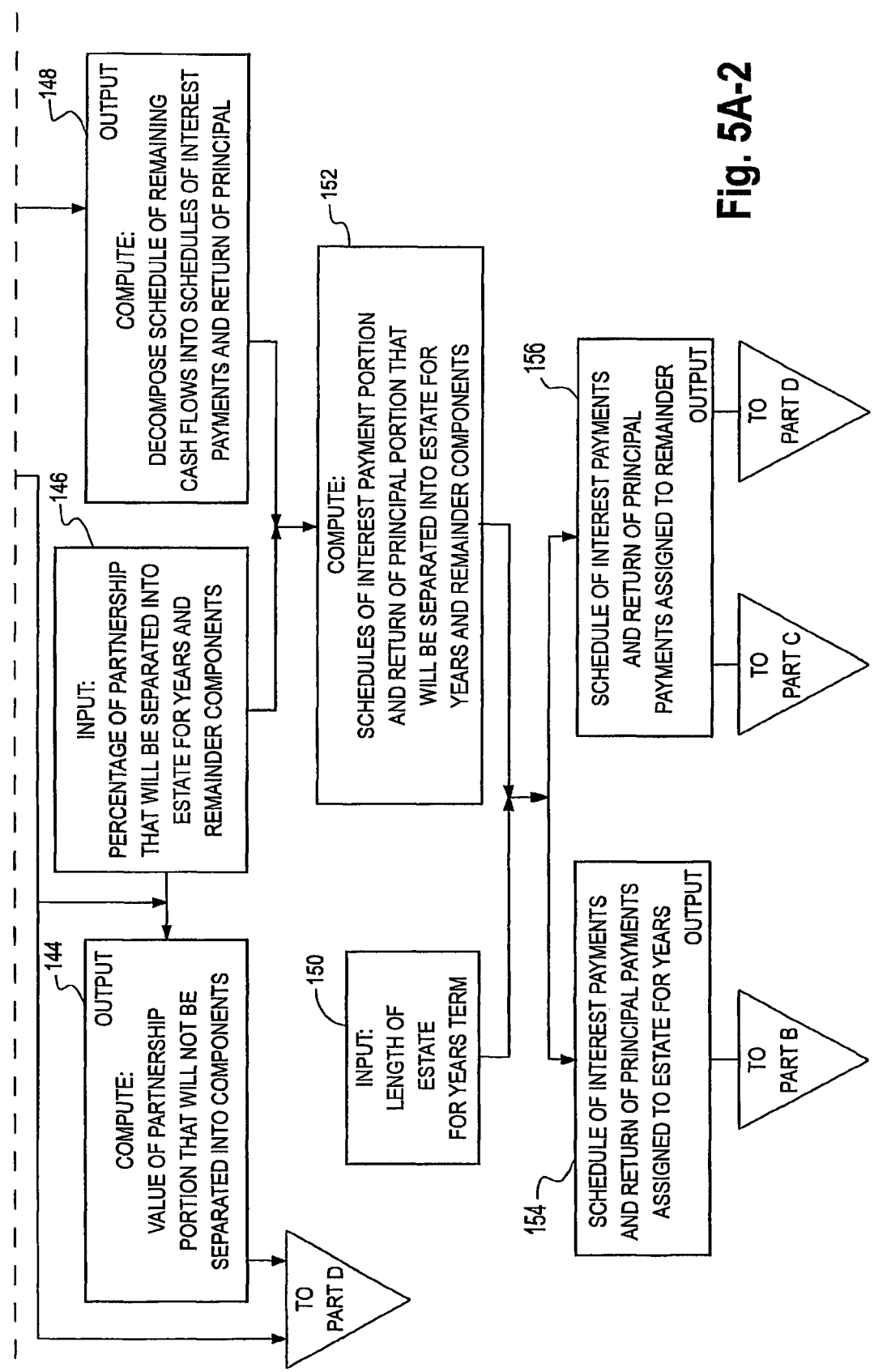
Figures 1, 5B:
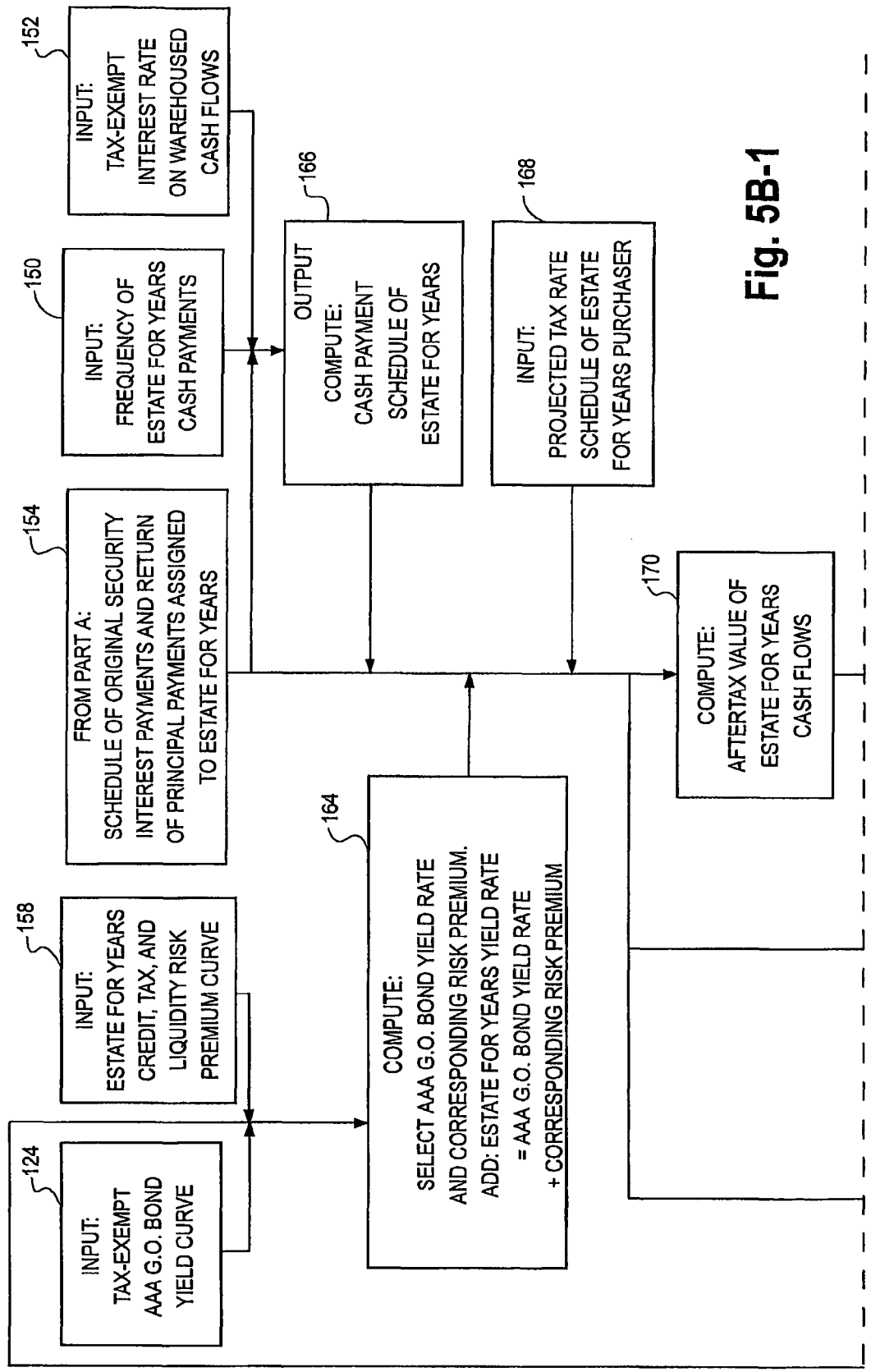
Figures 2, 5B:
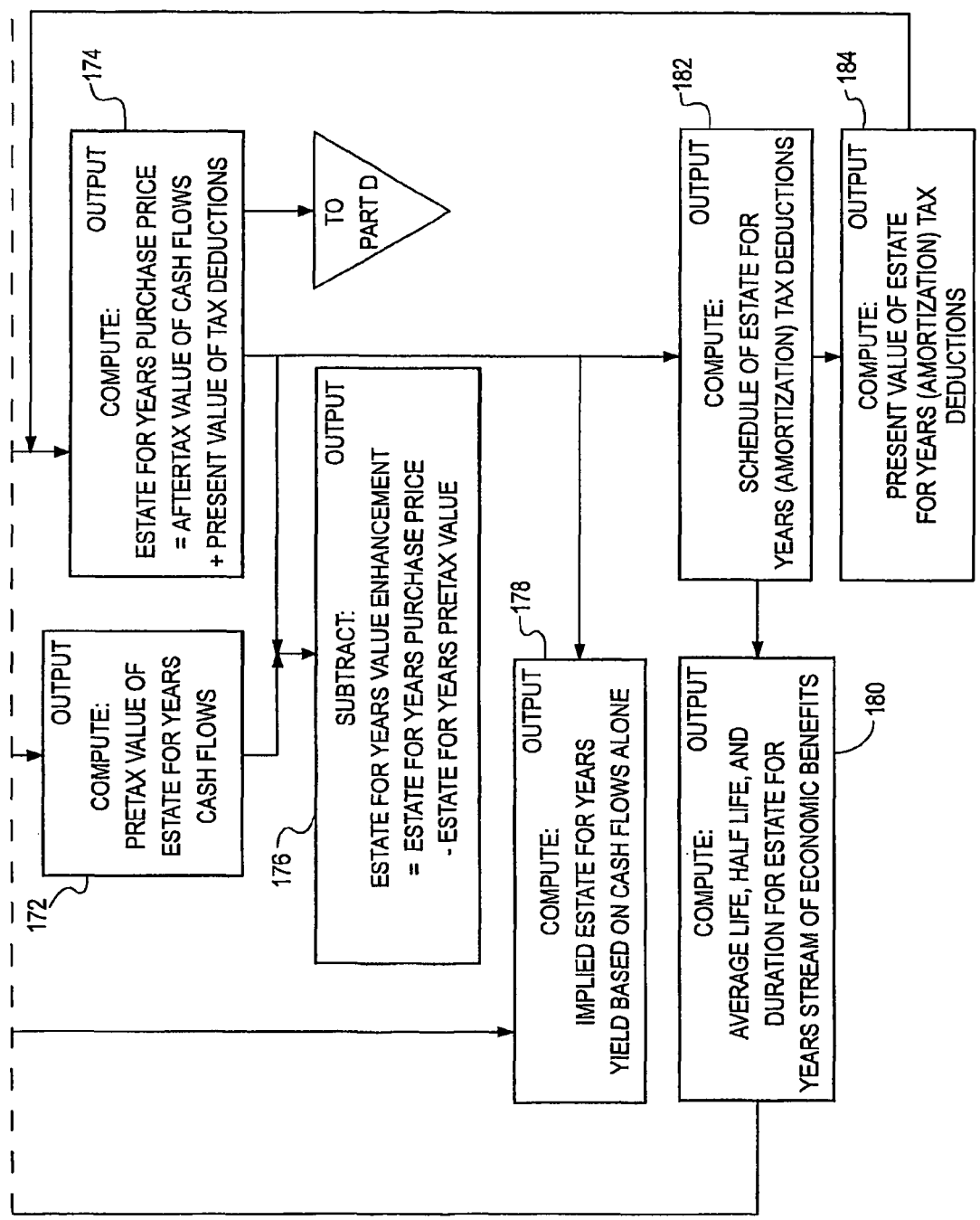
Figures 1, 5C:
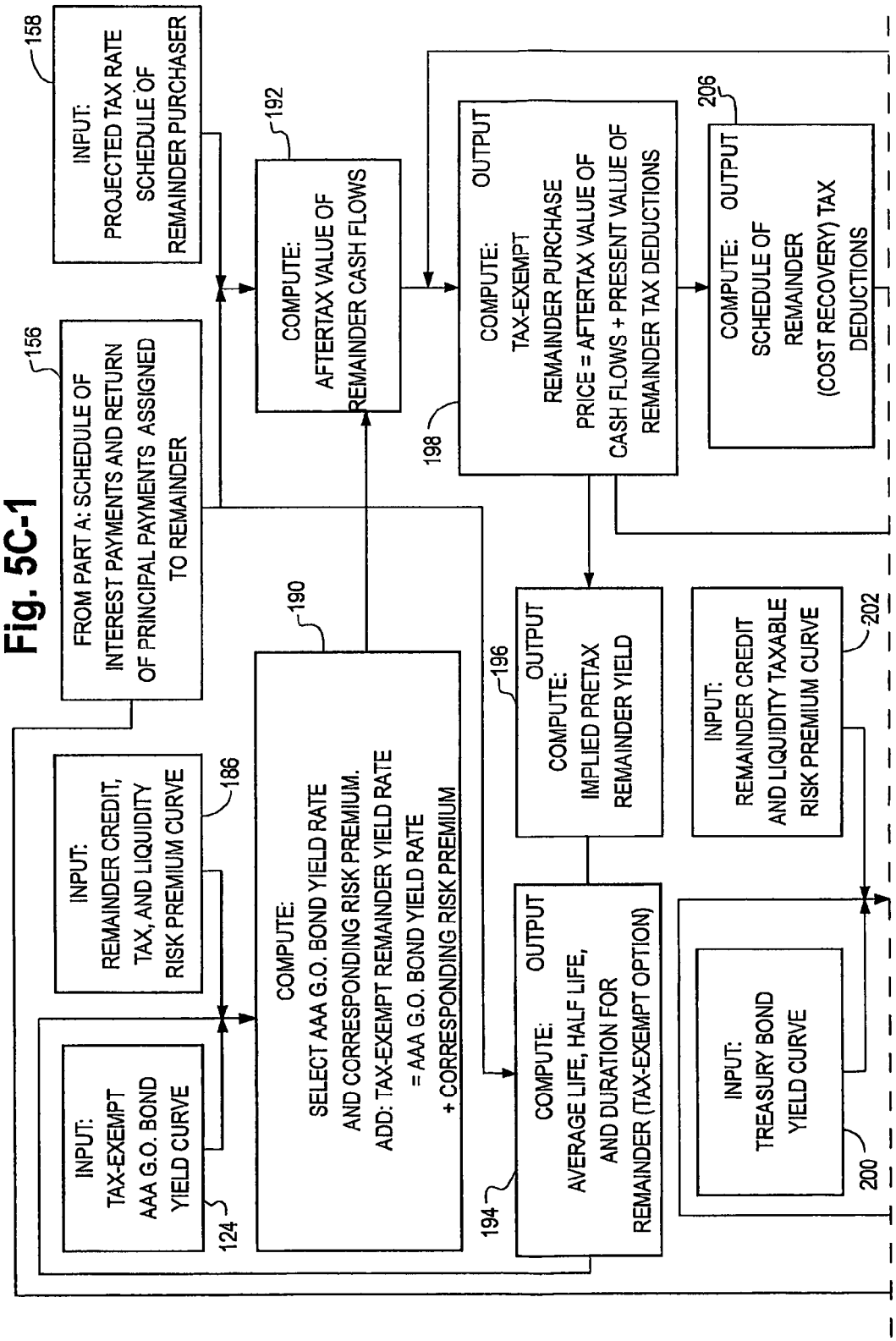
Figures 1, 5C:
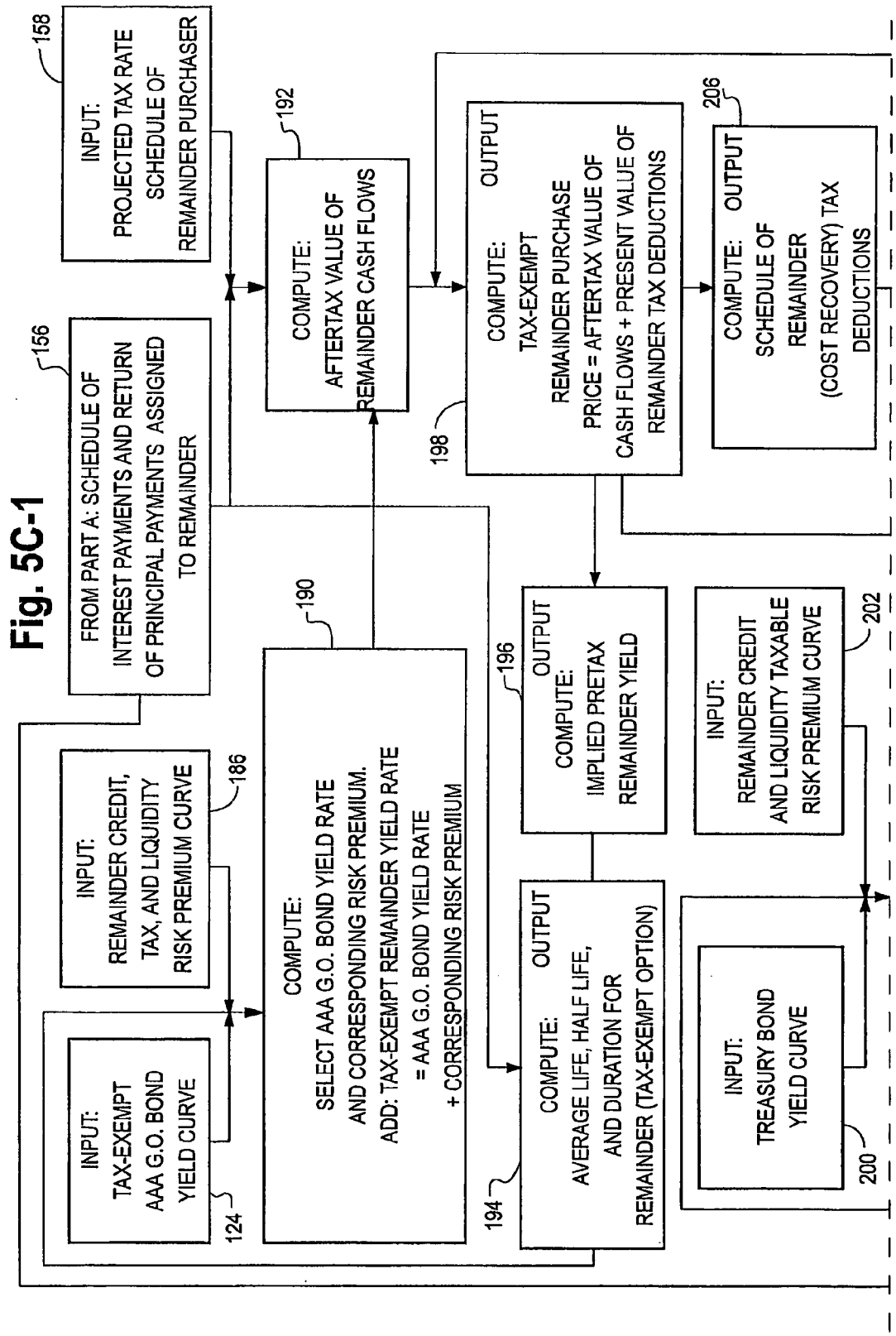
Figures 2, 5C:
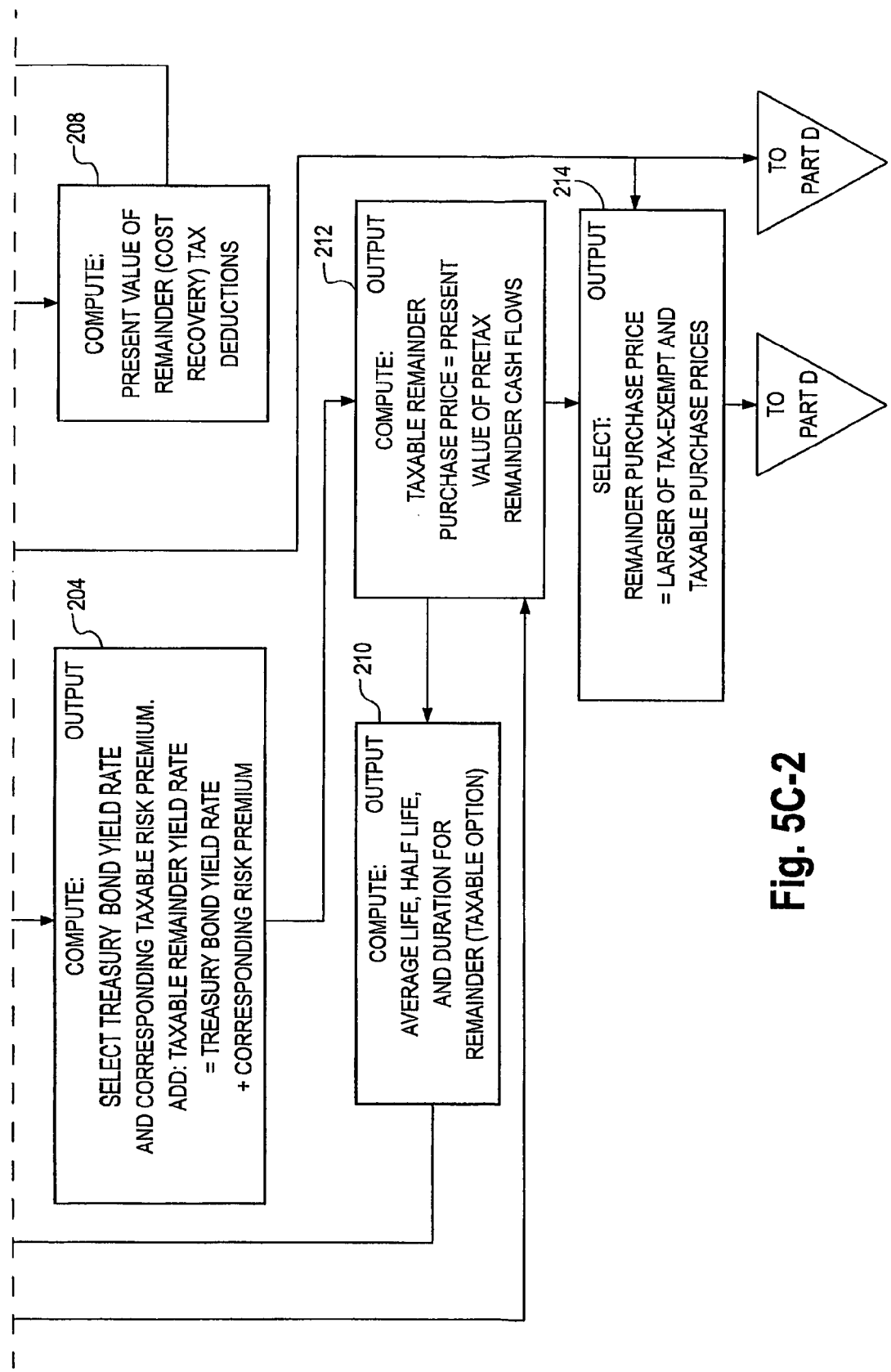
Figures 1, 5D:
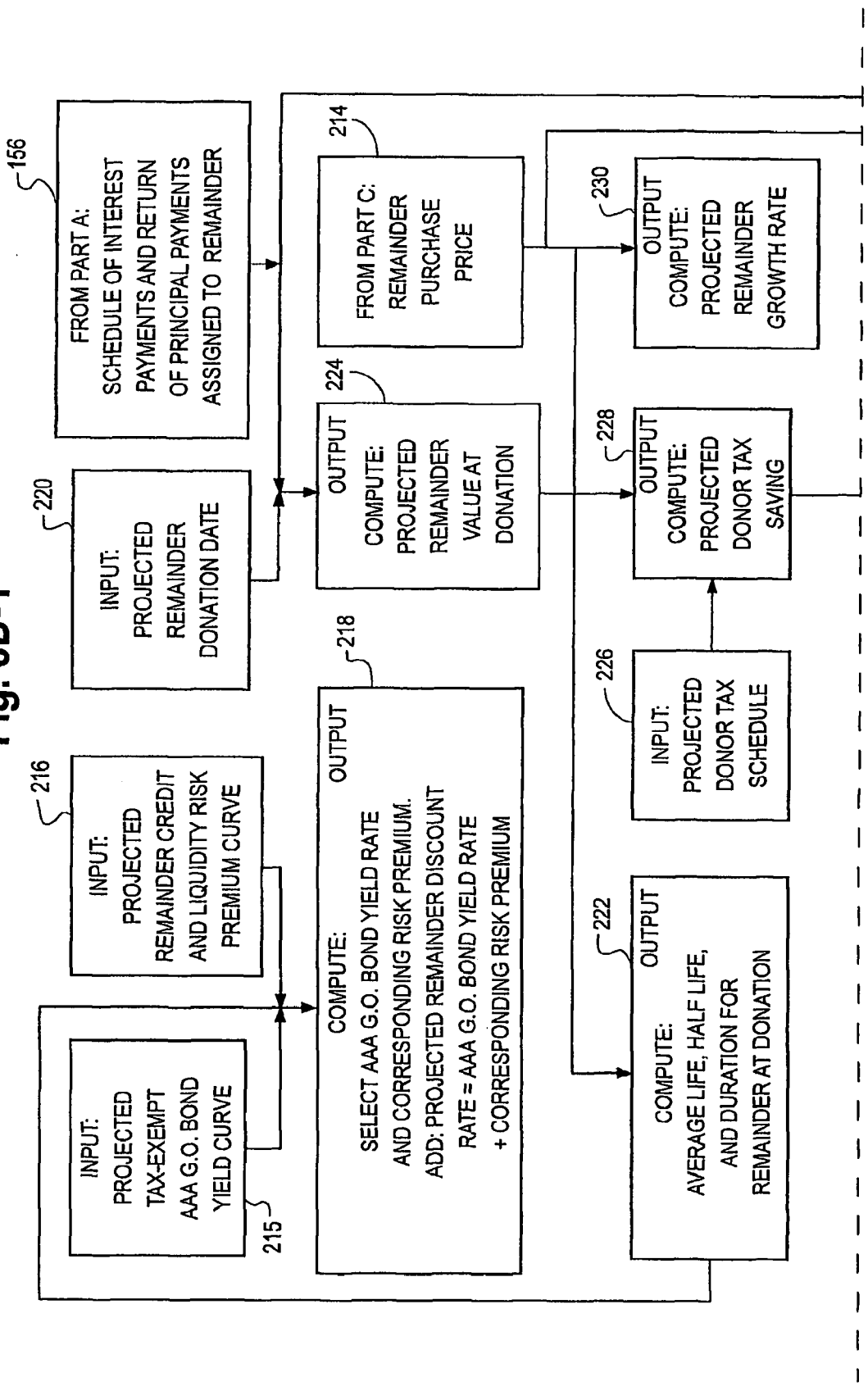

Next a schedule of estate for years (and/or augmented estate for years) amortization deductions is computed in Block 182, a present value of amortization deductions is computed by Block 184, and an updated iterate for the estate for years (and/or augmented estate for years) purchase price is computed by summing the output of Blocks 170 and 184. Then the loop is repeated as shown in FIG. 5(B), until the computed value of the estate for years (and/or augmented estate for years) purchase price ceases to change significantly with additional iterations.

The projected tax schedule of the estate for years (and/or augmented estate for years) purchaser received from Input Data 168 is useful for the valuation of amortization of tax deductions in Block 184. If the estate for years (and/or augmented estate for years) purchaser were assumed to be a tax-exempt investor, the present value of the tax deductions would be zero. This reveals an important point: as with conventional tax-exempt securities, the estate for years (and/or augmented estate for years) component is worth more to a taxable investor than to a tax-exempt investor. Furthermore, as the tax bracket of the estate for years (and/or augmented estate for years) investor increases, so does the value of the estate for years (and/or augmented estate for years) component.

Typically, the projected tax rate schedule received from Input Data 168 will consist of a single tax rate, and some implementations of Logic Means 30 will make this simplification.

It is not always necessary to compute the value of the estate for years (and/or augmented estate for years) component iteratively. If the cash flows from the partnership portfolio are sufficiently regular, for example if debt service payments do not vary and are made at regular intervals (e.q., as is the case for a single-security partnership portfolio with constant debt service payments, and possibly a balloon payment at maturity), then computation of the estate for years (and/or augmented estate for years) purchase price in Block 174 is made via an analytic formula without Block 170 and without iterative computations.

The output of Block 174 shows the value of applying the innovation to tax-exempt securities. The estate for years (and/or augmented estate for years) component generates amortization deductions to shelter a portion of the cash flows received by the estate for years (and/or augmented estate for years) component from taxes. However, because the partnership portfolio is tax-exempt, portions of the cash flows attributed to interest are already tax-exempt. For cases in which tax-exempt interest represents a sufficiently large part of estate for years (and/or augmented estate for years) cash flow, estate for years (and/or augmented estate for years) amortization deductions will be greater than needed to shelter the repayment of principal portions of estate for years (and/or augmented estate for years) cash flows from taxes. These excess amortization deductions can be used to reduce taxes on disbursements from (other) taxable investments, which implies that the estate for years (and/or augmented estate for years) value is greater than the value of the estate for years (and/or augmented estate for years) cash flows alone.

The incremental value represented by excess amortization deductions is computed in Block 176, which subtracts the value of the tax-exempt estate for years (and/or augmented estate for years) cash flows computed in Block 172 from the estate for years (and/or augmented estate for years) purchase price computed in Block 174. Block 176 reveals the business/economic value created by the application of component separation to tax-exempt securities. This embodiment is not tied to any particular amortization or cost recovery schedule for the estate for years (and/or augmented estate for years), as long as the contribution of the present value of tax deductions generated by the estate for years (and/or augmented estate for years) component enhances the estate for years (and/or augmented estate for years) value relative to its value as a schedule of tax-exempt cash flows.

Block 178 computes the implied yield on the estate for years (and/or augmented estate for years) component based on cash flow alone. This is an important safety check on the validity of the estate for years (and/or augmented estate for years) amortization deductions, because under current tax law deductions are invalid if they create an asset with negative or zero expected investment return. Because the estate for years (and/or augmented estate for years) is a fixed-income asset, implied yield to maturity based on cash flow alone equals expected investment return. Thus the output of Block 178 must be greater than zero for the prices computed to be valid.

Block 180 computes the average life, half life, and duration of the estate for years (and/or augmented estate for years) using the full schedule of estate for years (and/or augmented estate for years) cash flows plus projected tax savings. This output is used in the iterative calculation of the estate for years (and/or augmented estate for years) yield rate as in the previous examples of this process.

Computation of the remainder (and/or complementary remainder) component price entails a complication not present in computing the estate for years (and/or augmented estate for years) price, due to the fact that is a zero-coupon security, i.e., due to the fact that no cash flow is generated during the estate for years (and/or augmented estate for years) term. Consequently, the tax basis of the remainder (and/or complementary remainder) component will never be large enough to tax shelter all of the return of principal payments received by the remainder (and/or complementary remainder), so that a portion of the cash flows received by the remainder (and/or complementary remainder) investor is subject to federal taxation.

This implies that the remainder (and/or complementary remainder) component can be valued in at least two ways: (1) as a tax-exempt security, on the basis of its aftertax cash flows; or (2) a conventional taxable security, valued on the basis of its pretax cash flows. In case (1), the projected tax rate schedule of the purchaser affects the computation of the purchase price, whereas in case (2), the purchase price computation is independent of the tax bracket of the purchaser. Logic Means 30 computes the remainder (and/or complementary remainder) value as a tax-exempt security in Block 198, and the remainder (and/or complementary remainder) value as a taxable security in Block 212. Logic Means 30 selects the larger value in Block 214, and outputs a recommendation as to the appropriate marketing strategy, i.e., whether to market the remainder (and/or complementary remainder) as a tax-exempt fixed-income security or a taxable fixed-income security.

As a longer term zero-coupon investment, the regularity or irregularity of remainder (and/or complementary remainder) cash flows has little to do with asset marketability. Because there is little to gain by rescheduling the remainder (and/or complementary remainder) cash flows via cash flow warehousing, this degree of complexity is omitted from the structure of the remainder (and/or complementary remainder) component by the logic means.

Block 190 computes the yield rate for the remainder (and/or complementary remainder) under the assumption that it is regarded as a tax-exempt security.

The computation of the remainder (and/or complementary remainder) price in Block 198 proceeds iteratively exactly as in the case of the estate for years (and/or augmented estate for years), substituting Block 192 for Block 170, Block 206 for Block 182, and Block 208 for Block 184. Also, again as with computation of the estate for years (and/or augmented estate for years) purchase price, the iterations can be avoided and replaced by an analytic formula for the tax-exempt remainder (and/or complementary remainder) purchase price if the remainder (and/or complementary remainder) cash flows are assumed to be sufficiently regular.

The computation of the average life of a fixed-income security is based on pretax cash flows and pretax interest rate. Block 196 computes the implied pretax remainder (and/or complementary remainder) interest rate. This value is identical to the tax-exempt yield rate computed by Block 190 if the tax rate schedule from Input Data 188 is zero, and in general the value computed by Block 196 differs only slightly from the tax-exempt yield rate. The interest rate computed by Block 196 together with the pretax cash flows and the tax-exempt remainder (and/or complementary remainder) purchase price from Block 198 are used to compute the tax-exempt average life for the remainder (and/or complementary remainder) in Block 194.

Viewing the remainder (and/or complementary remainder) as a taxable fixed-income security, the corresponding computations become much simpler. Input Data 200 receives the conventional Treasury yield curve, and Input Data 202 the corresponding (taxable) risk premium curve. Block 204 computes the taxable remainder (and/or complementary remainder) yield rate, and Block 212 computes the taxable remainder (and/or complementary remainder) purchase as the present value of the pretax remainder (and/or complementary remainder) cash flows discounted at the yield rate computed in Block 204. As in previous cases, Block 210 computes the average life, half life, and duration for the taxable remainder (and/or complementary remainder), and the average life is fed back to Block 204 to iterate the computation of the taxable remainder (and/or complementary remainder) yield rate.

Block 240 computes the sum of the estate for years and remainder (and/or augmented estate for years and complementary remainder) prices. Block 242 computes a measure of profitability for the separation transaction by computing the difference between: (1) the sum of the estate for years (and/or augmented estate for years) price, the remainder (and/or complementary remainder) price, the value of the unseparated portion of the partnership interests, and any underwriting fees received in connection with the overall transaction, and (2) the price of the tax-exempt fixed-income portfolio acquired by the partnership.

An additional feature of component decomposition applied to tax-exempt fixed-income portfolios arises because of the zero-coupon nature of the remainder (and/or complementary remainder) interest.

During the estate for years (and/or augmented estate for years) term, the remainder (and/or complementary remainder) is a zero-coupon security, and the return earned on the remainder (and/or complementary remainder) is tax-deferred for a remainder (and/or complementary remainder) investor; taxes are only due when the estate for years (and/or augmented estate for years) term has expired and the remainder (and/or complementary remainder) investor begins to receive cash flows, or when the remainder (and/or complementary remainder) is sold. Consequently, a tax-effective strategy for a philanthropic remainder (and/or complementary remainder) purchaser would be the following: hold the remainder (and/or complementary remainder) during the estate for years (and/or augmented estate for years) term while it earns tax-deferred returns, then make a charitable donation of the remainder (and/or complementary remainder) when the estate for years (and/or augmented estate for years) term expires and take a charitable deduction enhanced by the increase in the remainder (and/or complementary remainder) value. In addition, the remainder (and/or complementary remainder) purchaser receives the satisfaction of seeing a favorite charitable foundation or institution receive a substantial fixed-income security as a gift.

Logic Means 30 computes values to describe and measure the value generated by a remainder (and/or complementary remainder) purchaser through a remainder (and/or complementary remainder) donation. The value to the remainder (and/or complementary remainder) purchaser is the projected value of the remainder (and/or complementary remainder) at the time of the donation. This value is a fixed-income present value computation analogous to the other present value computations made by Logic Means 30 in this application.

Input Data 220 receives the projected date of a remainder (and/or complementary remainder) donation. Frequently, though not necessarily, the projected donation date will be near the expiration of the estate for years (and/or augmented estate for years) term.

Input Data 215 receives the AAA g. o. curve projected for the date of the donation, and Input Data 216 receives the corresponding risk premium curve projected for that date. Block 218 selects the appropriate AAA base rate and risk premium based on the average life of the remainder (and/or complementary remainder) at the projected time of the remainder (and/or complementary remainder) donation, and sums these two rates to obtain the projected discount rate used to compute the projected present value of the remainder (and/or complementary remainder) at the time it is donated.

Block 224 computes the projected value of the remainder (and/or complementary remainder) at the projected donation date; using this value, Block 222 computes the average life, half life, and duration for the remainder (and/or complementary remainder) at the projected donation date. Using the remainder (and/or complementary remainder) purchase price computed earlier, Block 230 computes the projected growth rate in the remainder (and/or complementary remainder) value between the remainder (and/or complementary remainder) purchase date and the remainder (and/or complementary remainder) donation date.

Using a projected donor tax rate schedule received by Input Data 228, Block 228 computes the projected value of the donor tax saving generated for the remainder (and/or complementary remainder) investor by the remainder (and/or complementary remainder) donation.

Block 232 computes the rate of return for the remainder (and/or complementary remainder) purchaser from an investment equal in value to the remainder (and/or complementary remainder) purchase price on the component separation date that generates a return equal in value to the projected value of the donor tax saving at the remainder (and/or complementary remainder) donation date.

Finally, under the additional assumption that the tax-exempt portfolio held by the partnership is a financial obligation of the intended recipient of the remainder (and/or complementary remainder) donation, Block 234 subtracts the remainder (and/or complementary remainder) cash flows after the projected donation date from the tax-exempt portfolio cash flows and recomputes the cost of debt capital on the tax-exempt portfolio based on the remaining cash flows and the initial value of the tax-exempt portfolio. This is an additional piece of financial information to aid the remainder (and/or complementary remainder) purchaser in gauging the effectiveness of a prospective remainder (and/or complementary remainder) donation under the assumption that the intended donation recipient is the original issuer of the tax-exempt portfolio; in this case, Block 234 measures the reduction in the cost of capital for the fixed-income debt obligations in the partnership portfolio due to the cancellation of the portion of the debt represented by the remainder (and/or complementary remainder) component.

Figure 6:
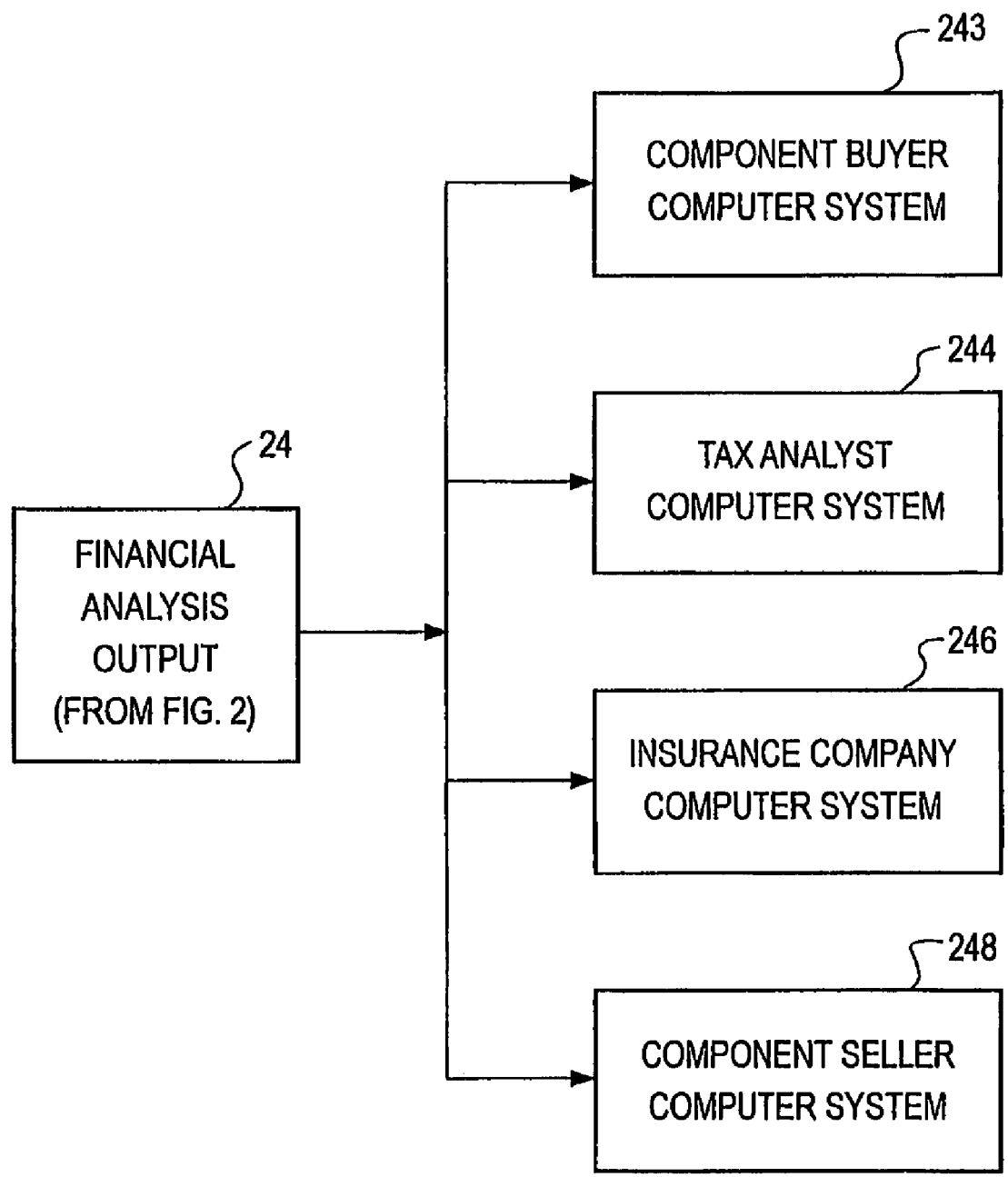
FIG. 6 is a graphic representation of interrelated computer systems.

That aspect of the embodiment illustrated with respect to FIG. 2, etc., can function in cooperation with other computer systems respectively in different institutions involved in the decomposition. One or both component buyers preferably employ a digital electrical Computer System 243, comprised of a processor in a computer, input means, output means, and logic means, such as preferably a computer program. Computer System 243 in FIG. 6 is programmed to receive and store cash flow and tax deduction schedules provided to the component buyer, or at least some of the Output 24 of System 2. This data can be communicated electronically or by manually entering the data from hard copy produced by System 2 into Computer System 243 by a keyboard. The Computer System 243 is programmed to: (1) compute and/or recompute taxes, (2) complete and/or generate annual and/or interim tax filing schedules, and/or (3) generate investment portfolio and income accounting reports for regulatory agencies on a periodic basis from regulated institutional investors. This can include generation of an accounting income and valuation schedule to value an equity interest in a component and income therefrom for accounting purposes between the purchase date of the equity interest and the end of the residential estate for years term or beyond, based on generally accepted accounting principles, and can include insertion of the income and valuation schedule or portions thereof in investment portfolio and income accounting reporting and documentation. Parameters for this programming are straightforward: the tax code and accounting standards of the regulator(s).

More particularly, this can be characterized as providing a second digital electrical computer controlled by a processor, the processor being controlled by logic means for receiving and storing in memory accessible by the computer electrical signals representing cash flow and tax deduction schedules provided to a component buyer. The logic means is also for manipulating the electrical signals representing cash flow and tax deduction schedules to produce altered electrical signals corresponding to at least one of the group consisting of (1) computing the tax, (2) generating a tax filing schedule, and (3) generating documentation at an output means electrically connected to said second computer.

Computer System 244 has hardware and logic means analogous to Computer System 243, except that the computer system is programmed particularly to examine a different tax and/or investment scenario than that used in the decomposition conducted in accordance with System 2 for at least one of the components, e.q., a tax scenario under a different interpretation of the tax code or a change in the tax code. Computer System 244 is programmed to generate a tax schedule from input data representing: (1) a breakdown of the cash payment schedule into schedules of interest/income payments and return of principal payments, (2) the security purchase price, and—in the case of residential estate for years securities—(3) the residential estate for years term. This input data includes at least some of the output 24. The Computer System 244 in FIG. 6 can also be programmed to format the schedule of tax deductions for transmittal to other computer systems, and to store and transmit this schedule in exactly the same way that System 2 does.

Computer System 244 thus can be programmed to compute: (1) independent verification of the tax deduction schedules furnished to purchasers by sellers, and/or (2) a sensitivity analysis of the effect of future modifications in the tax code on the tax deduction schedule generated by the security and/or the effect of these modifications on the present value of the aftertax cash flows.

More particularly, the Computer System 244 can be characterized as providing a second digital electrical computer controlled by third logic means controlling a second processor in manipulating other digital electrical signals representing next input data to the second computer, the next input data characterizing at least one of the at least two components decomposed from the property, the manipulating by the second processor including transforming the other digital electrical signals into other modified digital electrical signals representing a respective value for the at least one of the two components, the respective value being computed to reflect taxation for the components under a second tax and/or investment scenario. Additionally involved is providing second input means electrically connected to the second computer converting the next input data into the other digital electrical signals, and communicating the corresponding other digital electrical signals to the second computer; and providing second output means electrically connected to the second computer for receiving the other modified digital electrical signals from the second computer, and converting the other modified digital electrical signals representing the respective value into a printed document.

Computer System 244 usually computes output values, for example, component prices and expected returns for a specific set of input parameter values at the time property decomposition into components occurs. Computer System 244 can also be programmed to perform risk analysis for the output parameters, e.q., by Monte Carlo analysis, for example, for the expected residential remainder.

More particularly, an example of a risk analysis input (e.q., in the case of expected residential remainder annual return) is a probability distribution for the expected property value at a future time (e.q., at the end of the residential estate for years term) and a set of values for the other input parameters for the embodiment. Computer System 244 can be programmed to generate random samples from the probability distribution for expected future property value, and each random sample for the expected future property value can be combined with the fixed values for the other input parameters and processed to generate a set of output values, including a value for expected annual residential remainder return. By generating repeated random samples of the multiple future property value (e.q., normally at least one thousand, and usually at least ten thousand), Computer System 244 generates a probability distribution for the expected annual residential remainder return and can compute investment risk parameters for the expected annual residential remainder return from the distribution, for example, standard deviation, skewness, and kurtosis.

In cases involving further decomposition of the residential remainder component into a preferred interest and a residual interest, Computer System 244 also generates a probability distribution for the expected annual residual return and can compute investment risk parameters for the expected annual residual return from the distribution, for example, standard deviation, skewness, and kurtosis.

For the case of support for a decision about a commitment to component decomposition significantly in advance of the expected date for the component decomposition or in advance of the expected date for at least one component purchase, Computer System 144 can compute the probability that the decomposition of property into components and the at least one component purchase will become uneconomical due to changes in the values of input parameters between the date of the analysis and the expected date of component separation.

More particularly, in this case, an example of an additional input for a Computer System 244 risk analysis is a probability distribution for at least one input parameter, for example, a multivariate probability distribution for the following group of input parameters: the yield curve, the risk premium curve for the residential estate for years component, the risk premium curve for the preferred interest (in cases wherein there is or will be a preferred interest), and the future property value that will be expected at the time of component decomposition. An example of an additional input value for Computer System 244 in this case is at least one of the following: a value for the minimum annual return for residential remainder interest investor(s), a value for the minimum annual return for residual interest investor(s), and a value for the minimum annual return for residential estate for years interest investor(s). Computer System 244 generates a multivariate distribution for the output parameters, from which it can compute a risk analysis of the financial success or failure of the transaction. For example, Computer System 244 can compute at least one of the values for the following risk parameters: the probability that the sum of the residential estate for years purchase price and the residential remainder interest purchase price will not be sufficient to cover the sale price of the property together with associated expenses such as real estate brokerage commissions and the cost of component decomposition, the expected magnitude of the deficit, the expected magnitude of the deficit given that a deficit does occur, and the below-target semivariance of the deficit.

Computer System 246 is again structurally analogous to that of Computer System 243, with the digital electrical computer being controlled in its signal processing by a processor, etc. However, Computer System 246 can be used by an insurance company, for example, in computing premiums for writing insurance against any savings that accrue to the component purchaser from tax deductions generated by the component. Computing insurance premiums for a given event is a well explored discipline, though in the present case, it would reflect sensitivity analyses of the effect of tax code modifications too. Thus, the embodiment discussed with respect to FIG. 2 can be employed in combination with software for determining insurance premiums. Because tax deductions are default free, there is no credit risk associated with these deductions that might be reduced by insurance. However, insurance can be written against legislative risk that results from potential (future) changes in the tax law, such as: (1) changes in tax brackets and rates that inversely affect the value of tax deductions generated by the security, and (2) modifications of tax code regulations regarding availability and/or scheduling of tax deductions.

More particularly, Computer System 246 can be characterized as providing a second digital electrical computer controlled by third logic means controlling a second processor in manipulating other digital electrical signals representing next input data to the second computer, the next input data characterizing at least one of the two components decomposed from the property, the manipulating by the second processor including transforming the other digital electrical signals into other modified digital electrical signals representing a respective value under a second tax scenario for the at least one of the two components, the manipulating by the second processor also including transforming the other digital electrical signals into still other modified digital electrical signals representing an insurance premium for insurance against the second tax scenario. Additionally involved is providing second input means electrically connected to the second computer converting the next input data into the other digital electrical signals, and communicating the corresponding other digital electrical signals to the second computer; and providing second output means electrically connected to the second computer for receiving the still other modified digital electrical signals from the second computer, and converting the still other modified digital electrical signals representing the insurance premium into a printed document.

Computer System 246 can also be used by an insurance company in computing premiums for writing insurance against an economic risk in a component. For the case of a residential estate for years component, this can include insurance to protect the residential estate for years holder against any property-related risk that might otherwise be assumed by purchase of the residential estate for years component in cases wherein the existing leases are not bondable net. Insurance for the residential estate for years component can also include credit enhancement insurance to raise the credit rating of the residential estate for years component to investment grade in cases wherein one or more existing lessees for the property have below-investment-grade credit ratings. For the case of a residential remainder component, this can include residual value insurance, which sets a minimum target valuation for the property and insures the residential remainder interest holder against the risk that the property value will be below the target valuation when the residential remainder interest matures into ownership of the property.

In the case of residual value insurance for residential remainders, such policies have been discussed in recent years for conventional real estate ownership. However, in this case they suffer from the defect that the insurer has a subordinate claim on the real estate to any mortgage lender. Thus the insurer can suffer huge losses if tenants default and the mortgage lender forecloses because of temporary cash flow deficiencies, events which have nothing to do with the underlying economics of the real estate. By contrast, residual value insurance on the residential remainder provides the insurer with an unsubordinated claim on the real estate. This is the rationale for the innovation of residual value insurance for residential remainders.

Computer System 248 in FIG. 6 is again structurally analogous to that of Computer System 244, except it is programmed, to: (1) receive market-based interest rate inputs, (2) compute the current market-based yield/discount rate for the component, (3) determine the current market/based price of the component by computing the sum of the present values of expected aftertax future cash flows and future purchaser tax savings from tax deductions generated by the component.

Computer System 248 is adapted to provide analytic support for purchasers who might need to sell or resell the component security at some time prior to the maturity date of the security. Thus, making use of logic such as that in FIG. 2, Computer System 248 is programmed to price the security for resale and to compute the schedule of tax deductions generated by the security for the subsequent owner if a resale effort is successful.

More particularly, Computer System 248 can be characterized as providing a second digital electrical computer controlled by third logic means controlling a second processor in manipulating other digital electrical signals representing next input data to the second computer, the next input data characterizing at least one of the two components decomposed from the property, the manipulating by the second processor including transforming the other digital electrical signals into other modified digital electrical signals representing a respective value under a tax scenario for the at least one of the two components, the manipulating by the second processor also including computing current market-based yield/discount rate for the at least one component, and determining a market/based price of the at least one component by computing a sum of present values of expected aftertax future cash flows and future purchaser tax savings from tax deductions generated by the at least one component. Additionally involved is providing second input means electrically connected to the second computer converting the next input data into the other digital electrical signals, and communicating the corresponding other digital electrical signals to the second computer; and providing second output means electrically connected to the second computer for receiving the other modified digital electrical signals from the second computer, and converting the other modified digital electrical signals into an illustration of data corresponding to the other modified electrical signals.

As with any of the above-referenced computer systems and methods for making or using them, the embodiments can extend to any kind of property, including a portfolio of at least one tax-exempt fixed income security. Further, the tax may be computed in different ways, including with an accelerated deduction for at least one of the components, as well as taxation under different interpretations of the existing tax code, or under a changed tax code altogether, without at all departing from the spirit herein disclosed, and the computer system and methods related to electrical signal processing.

While particular embodiments have been disclosed, it is to be understood that various different modifications are possible and are within the true spirit of what has been set forth here as a teaching, the scope of which is to be determined with reference to the claims. For brevity, apparatus has been a focus of discussion, but methods of making and using the apparatus embodiments, products produced thereby, manufactures, and necessary intermediates of the data processing are explicitly included. Thus consider as embodiments a computer program product having computer code stored thereon, which when run on a computer causes a computer to perform the steps in accordance herein. For example, the steps can include: arranging a computer system for receiving data into a memory, the data representing residential property; controlling the computer system with logic means to change the data to produce modified signals representing a valuation of one of at least two components temporally decomposed from the residential property, the components including a residential estate for years interest and a residential remainder interest; and converting, an output device, the modified signals into documentation including the valuation of the components. In another embodiment, for example, the steps can include: arranging a computer system for receiving data into a memory, the data representing residential property; controlling the computer system with logic means to change the data to produce modified signals representing a valuation of property including an equity interest in only one of at least two components temporally decomposed from the residential property, the components including a residential estate for years interest and a residential remainder interest; and converting, an output device, the modified signals into documentation including the valuation of the property. All such permutations can be carried out within the spirit herein disclosed.

As yet another embodiment, consider a computer-readable media tangibly embodying a program of instructions executable by a computer to perform the steps of: arranging a computer system for receiving data into a memory, the data representing residential property; controlling the computer system with logic means to change the data to produce modified signals representing a valuation of one of at least two components temporally decomposed from the residential property, the components including a residential estate for years interest and a residential remainder interest; and converting, an output device, the modified signals into documentation including the valuation of each of the components; wherein the receiving includes standardizing the data with at least one computer-generated screen; and wherein the controlling includes forming the documentation as standardized documentation by obtaining from computer-accessible memory. Again such permutations are explicitly contemplated, and indeed, the foregoing media can comprise at least one of a RAM, a ROM, a disk, an ASIC, and a PROM.

Of course, an embodiment can be carried out by using multiple computers or by using the same computer to handle operations sequentially, as would be equivalent under the circumstances—software embodiments being equivalent to hardwired embodiments, as is well known in the art. There is no intention, therefore, to limit the embodiments to the exact disclosure presented herein as a teaching.

SPECIMEN 1, SCREEN 1

| RESIDENTIAL ESTATE FOR YEARS/RESIDENTIAL REMAINDER INPUT PARAMETERS | |
|---|---:|
| PROPERTY VALUATION: | $350,000 |
| TREASURY BOND YIELD BASIS: | 4.50% |
| (AVG. LIFE = 19 YRS 2 MOS) | |
| RENTAL INCOME RISK PREMIUM: | 1.50% |
| RESIDENTIAL ESTATE FOR YEARS TAX RATE: | 34.00% |
| COMPONENT SEPARATION COSTS/FEES: | $ 14,000 |
| RENTABLE SQUARE FOOTAGE: | 2,500 |
| ZERO-COUPON RISK-FREE RATE: | 4.80% |
| WRAP INSURANCE COST: | 0.00% |
| FUTURE RESIDENTIAL REMAINDER VALUE: | 100.00% |
| INITIAL ANNUAL RENT: | $ 20,045 |
| TERM (MONTHS): | 360 |
| SECOND ANNUAL RENT: | $ 0 |
| TERM (MONTHS): | 0 |
| THIRD ANNUAL RENT: | $ 0 |
| TERM (MONTHS): | 0 |
| FOURTH ANNUAL RENT: | $ 0 |
| TERM (MONTHS): | 0 |
| FIFTH ANNUAL RENT: | $ 0 |
| TERM (MONTHS): | 0 |
| SIXTH ANNUAL RENT: | $ 0 |
| TERM (MONTHS): | 0 |
| SEVENTH ANNUAL RENT: | $ 0 |
| TERM (MONTHS): | 0 |
| EIGHTH ANNUAL RENT: | $ 0 |
| TERM (MONTHS): | 0 |
| NINTH ANNUAL RENT: | $ 0 |
| TERM (MONTHS): | 0 |
| TENTH ANNUAL RENT: | $ 0 |
| TERM (MONTHS): | 0 |

SPECIMEN 1, SCREEN 2

| RESIDENTIAL ESTATE FOR YEARS/ RESIDENTIAL REMAINDER OUTPUT PARAMETERS | |
|---|---:|
| RESIDENTIAL ESTATE FOR YEARS PURCHASE PRICE: | $280,005 |
| RESIDENTIAL ESTATE FOR YEARS TERM (MONTHS): | 360 |
| RESIDENTIAL ESTATE FOR YEARS YIELD RATE: | 6.00% |
| AFTERTAX BOND YIELD RATE: | 3.96% |
| AFTERTAX RESIDENTIAL ESTATE FOR YEARS YIELD: | 4.22% |
| PRETAX BOND EQUIVALENT RESIDENTIAL ESTATE FOR YEARS YIELD: | 6.39% |
| BOND EQUIVALENT RESIDENTIAL ESTATE FOR YEARS VALUE: | $288,655 |
| INITIAL RENT/SQUARE FOOT: | $ 8.02 |
| RESIDENTIAL REMAINDER PURCHASE PRICE: | $ 83,995 |
| GROSS PROPERTY SALE PRICE: | $364,000 |
| ANNUAL RESIDENTIAL REMAINDER RETURN: | 4.87% |
| RESIDENTIAL REMAINDER PRICE/SQUARE FOOT: | $ 33.60 |
| RESIDENTIAL REMAINDER PRICE/SQ.FT. AT RESIDENTIAL ESTATE FOR YEARS MATURITY: | $ 137.14 |
| CURRENT PRICE/SQ.FT. NET TO SELLER: | $ 140.00 |
| INITIAL CAP RATE = | 5.73% |

SPECIMEN 1, SCREEN 3

| ADDITIONAL OUTPUT PARAMETERS | |
|---|---:|
| PRESENT VALUE OF ENHANCEMENT: | 0.49% |
| PV OF ENHANCEMENT: (DOLLARS) | $1,706 |

SPECIMEN 1, SCREEN 4

| ADDITIONAL INPUT PARAMETERS | |
|---|---|
| INSURED MINIMUM PROPERTY VALUE: | 35.00% |
| RESIDUAL VALUE INSURANCE PREMIUM FEE: | $ 6,125 |
| ADDITIONAL ASSOCIATED FEES: | $ 0 |
| TREASURY BOND YIELD BASIS: | 4.80% |
| INSURER CREDIT RISK PREMIUM: | 0.00% |
| LIQUIDATION/REFINANCING FEES: | 1.00% |
| EXTRA MONTHS TO RETIRE PREFERRED: | 2 |
| ADDITIONAL OUTPUT PARAMETERS | |
| PREFERRED INTEREST ANNUAL RETURN: | 4.80% |
| PREFERRED INTEREST PURCHASE PRICE: | $29,774 |
| RESIDUAL INTEREST PURCHASE PRICE: | $60,346 |
| RESIDUAL INTEREST ANNUAL RETURN: | 4.44% |
| RESIDENTIAL REMAINDER-TO-RESIDUAL RATIO: | 1.39 |
| RESIDUAL LEVERAGE RATIO: | 0.89 |
| INSURED VALUE/SQUARE FOOT: | $ 49.00 |

The invention claimed is:

1. An apparatus configured to transform data representing components temporally decomposed from residential property, the apparatus including:
   a computer system configured to receive input data including data representing a plurality of components temporally decomposed from residential property, the components including a residential estate for years interest and a residential remainder interest, the computer system comprising:
   a processor programmed to manipulate the data representing the plurality of components to produce a separate valuation of each of the plurality of components, wherein at least one of the valuations reflects that there is a terminal rent recovery period for the residential estate for years interest, and to generate digital data representing documentation including the separate valuation of each of said plurality of components; and
   an output device to produce the documentation.

2. The apparatus of claim 1, wherein at least one of the valuations reflects that the residential estate for years interest is an augmented estate for years interest.

3. The apparatus of claim 2, wherein the residential property is a single-family dwelling.

4. The apparatus of claim 1, wherein at least one of the valuations reflects that the residential estate for years is a term of years interest.

5. The apparatus of claim 4, wherein the residential property is a single-family dwelling.

6. The apparatus of claim 1, wherein at least one of the valuations reflects that one of the components includes a fractional interest in only one of a contingent equity interest in the residential property that is a primary equity interest and a corresponding contingent equity interest in the residential property that is a secondary equity interest.

7. The apparatus of claim 6, wherein the residential property is a single-family dwelling.

8. The apparatus of claim 1, wherein the residential property is a single-family dwelling.

9. The apparatus of claim 8, wherein the terminal rent recovery period has a length of at least eighteen months.

10. An apparatus configured to transform data representing a component temporally decomposed from residential property, the apparatus including:
    a computer system configured to receive input data including data representing one component of residential property, the one component being one member of a group of at least two components temporally decomposed from the residential property, the group of at least two components including a residential estate for years interest and a residential remainder interest, the computer system comprising:
    a processor programmed to manipulate the data representing the one component to produce a valuation of the one component, wherein the valuation reflects that there is a terminal rent recovery period for the residential estate for years interest, and to generate digital data representing documentation including the valuation of the one component; and
    an output device to produce the documentation.

11. The apparatus of claim 10, wherein the terminal rent recovery period has a length of at least eighteen months.

12. The apparatus of claim 10, wherein the valuation reflects that the residential estate for years interest is an augmented estate for years interest.

13. The apparatus of claim 12, wherein the residential property is a single-family dwelling.

14. The apparatus of claim 10, wherein the valuation reflects that the residential estate for years interest is an augmented estate for years interest.

15. The apparatus of claim 14, wherein the residential property is a single-family dwelling.

16. The apparatus of claim 10, wherein the valuation reflects that the residential estate for years includes a term of years interest.

17. The apparatus of claim 16, wherein the residential property is a single-family dwelling.

18. The apparatus of claim 10, wherein the valuation reflects that one of the at least two components includes a fractional interest in only one of a contingent equity interest in the residential property that is a primary equity interest and a corresponding contingent equity interest in the residential property that is a secondary equity interest.

19. The apparatus of claim 18, wherein the residential property is a single-family dwelling.

20. The apparatus of claim 10, wherein the residential property is a single-family dwelling.

21. The apparatus of any one of claims 1, 8, 3, 5, 7, 10, 11, 20, 13, 15, 17, 19, the apparatus further including:
    a second computer system configured to receive at least some of the documentation, the second computer system further comprising:
    a second processor programmed to control the second computer to change said at least some of the documentation to generate second digital data representing second documentation including an amount of a residential lease payment including at least one of a rental payment arrearage and an escrow account payment arrearage; and
    a second output device connected to the second processor to produce the second documentation including the amount of the residential lease payment.

22. The computer apparatus of claim 21, wherein the residential lease payment includes an arrearage penalty.

23. The apparatus of any one of claims 1, 2, 4, 6, 8, 3, 5, 7, 10, 11, 12, 14, 16, 18, 20, 13, 15, 17, 19, the apparatus further including:
    a second computer system configured to receive at least some of the documentation, the second computer system comprising:
    a second processor programmed to control the second computer system to change said at least some of the documentation to produce second digital data representing second documentation including an other valuation of an equity interest in one of the components; and a second output device to produce the second documentation.

24. An apparatus configured to transform data representing components temporally decomposed from residential property, the apparatus including:
- a computer system configured to receive, into a memory, input data representing residential property, wherein the property is temporally decomposed into components including a residential estate for years interest and a residential remainder interest, wherein there is a terminal rent recovery period for the residential estate for years interest, the computer system further comprising:
- a processor programmed to manipulate the input data to produce digital data representing documentation including a computed tax valuation of at least one of said components; and
- an output device to produce the documentation.

25. An apparatus configured to transform data representing components temporally decomposed from residential property, the apparatus including:
- a computer system configured to receive input data, the data representing residential property, wherein the property is temporally decomposed into components including a residential estate for years interest and a residential remainder interest, wherein there is a terminal rent recovery period for the residential estate for years interest, the computer system further comprising:
- a processor programmed to manipulate the input data to produce digital data representing documentation including a computed insurance premium on one of said components; and
- an output device to produce the documentation.

26. An apparatus configured to transform data representing an equity interest in a component of residential property, the apparatus including:
- a computer system configured to receive input data including data representing an equity interest in a component of residential property, wherein the property is temporally decomposed into components including a residential estate for years interest and a residential remainder interest, wherein the component of residential property is one of the residential estate for years interest and the remainder interest, wherein there is a terminal rent recovery period for the residential estate for years interest, the computer system comprising:
- a processor programmed to manipulate the data representing the equity interest to compute a tax valuation of the equity interest and to generate digital data representing documentation including the tax valuation; and
- an output device to produce the documentation.

27. The apparatus of claim 26, wherein the residential property is a single-family dwelling.

28. An apparatus configured to transform data representing an equity interest in a component of residential property, the apparatus including:
- a computer system configured to receive input data including data representing an equity interest in a component of residential property, wherein the property is temporally decomposed into components including a residential estate for years interest and a residential remainder interest, wherein the component of residential property is one of the residential estate for years interest and the remainder interest, wherein there is a terminal rent recovery period for the residential estate for years interest, the computer system further comprising:
- a processor programmed to manipulate the data representing the equity interest to compute a valuation of the equity interest and to generate digital data representing documentation including the valuation of the equity interest; and
- an output device to produce the documentation.

29. The apparatus of claim 28, wherein the residential property is a single-family dwelling.

30. A method of using an apparatus to transform data representing components temporally decomposed from residential property, the method including:
- receiving, by a computer system, including a processor and an output device, input data representing a plurality of components temporally decomposed from residential property, the components including a residential estate for years interest and a residential remainder interest, wherein there is a terminal rent recovery period for the residential estate for years interest;
- manipulating the data representing the plurality of components, by the processor, to produce a separate valuation of each of the plurality of said components and to generate digital data representing documentation including the separate valuation of each of the plurality of said components; and
- outputting, by the processor, the documentation to the output device.

31. A method of using an apparatus to transform data representing a component temporally decomposed from residential property, the method including:
- receiving, by a computer system, including a processor and an output device, input data including data representing a temporally decomposed component of residential property, wherein the temporally decomposed component of the residential property is one of a residential estate for years interest and a residential remainder interest, wherein there is a terminal rent recovery period for the residential estate for years interest;
- manipulating the data representing the temporally decomposed component, by the processor, to produce a valuation of the component and to generate digital data representing documentation including the valuation, wherein the valuation reflects that there is a terminal rent recovery period for the residential estate for years interest; and
- outputting, by the processor, the documentation including the valuation to the output device.

32. The method of any one of claims 30, 31, wherein the terminal rent recovery period has a length of at least two years.

33. The method of claim 32, wherein the residential property is a single-family dwelling.

34. A method of using an apparatus to transform data representing a component temporally decomposed from residential property, the method including:
- receiving, by a computer system, including a processor and an output device, input data including data representing a temporally decomposed component from residential property, wherein the temporally decomposed component from the residential property is one of a residential estate for years interest and a residential remainder interest, wherein there is a terminal rent recovery period for the residential estate for years interest;
- manipulating the data representing the temporally decomposed component, by the processor, to produce digital data representing documentation including a computed tax valuation of the temporally decomposed component; and
- outputting, by the processor, to the output device, the documentation including the tax valuation.

35. A method of using an apparatus to transform data representing a component from residential property, the method including:
- receiving, by a computer system, including a processor and an output device, input data including data representing a component from residential property, wherein the component from the residential property is one of a residential estate for years interest and a residential remainder interest, wherein there is a terminal rent recovery period for the residential estate for years interest;
- manipulating the data representing the component, by the processor, to produce digital data representing documentation including a computed insurance premium on the component; and
- outputting, by the processor, the documentation including the insurance premium to the output device.

36. A method of using an apparatus to transform data representing an equity interest in a component of residential property, the method including:
- receiving, by a computer system, including a processor and an output device, input data including data representing an equity interest in a component of residential property, wherein the component of the residential property is one of a residential estate for years interest and a residential remainder interest, wherein there is a terminal rent recovery period for the residential estate for years interest;
- manipulating the data representing the equity interest in the component, by the processor, to produce digital data representing documentation including a computed tax valuation of the equity interest; and
- outputting, by the processor, to the output device, the documentation including the tax valuation.

37. A method of using an apparatus to transform data representing including an equity interest in a component of temporally decomposed residential property, the method including:
- receiving, by a computer system, including a processor and an output device, input data including data representing an equity interest in a component of residential property, wherein the component of the residential property is one of a residential estate for years interest and a residential remainder interest, wherein there is a terminal rent recovery period for the residential estate for years interest:
- manipulating the data representing the equity interest in the component, by the processor, to compute a valuation of the equity interest and to generate digital data representing documentation including the valuation of the equity interest, wherein the valuation reflects that there is a terminal rent recovery period for the residential estate for years interest; and
- outputting, by the processor, to the output device, the documentation including the valuation.

38. A computer program product having computer code stored thereon, which when run on a computer causes a computer system to perform the steps of:
- receiving input data at the computer system including data representing a component of residential property, wherein the component is one of a residential estate for years interest and a residential remainder interest, wherein there is a terminal rent recovery period for the residential estate for years interest, the computer system including a processor and an output device;
- controlling the processor to manipulate the data representing the component to produce a separate valuation of each of the residential estate for years interest and the residential remainder interest, wherein the valuation of the residential estate for years interest reflects that there is a terminal rent recovery period for the residential estate for years interest, and to generate digital data representing documentation including at least one of the valuations; and
- producing the documentation at the output device.

39. A computer program product having computer code stored thereon, which when run on a computer causes a computer system to perform the steps of:
- receiving input data at the computer system, the computer system including a processor and an output device, the input data representing an equity interest in a component of residential property, wherein the property is temporally decomposed into at least two components including a residential estate for years interest and a residential remainder interest, wherein there is a terminal rent recovery period for the residential estate for years interest;
- controlling the processor to manipulate the input data to produce a valuation of the equity interest and to generate digital data representing documentation including the valuation, wherein the valuation reflects that there is a terminal rent recovery period for the residential estate for years interest; and
- producing the documentation at the output device.

40. The computer program product of any one of claims 38, 39, wherein the documentation includes a financial document.

41. A computer-readable non-transitory media tangibly embodying a program of instructions executable by a computer to perform the steps of
- receiving input data at a computer system, the computer system including a processor and an output device, wherein the receiving includes standardizing the input data with at least one computer-generated screen, the input data representing residential property, wherein the property is temporally decomposed into at least two components including a residential estate for years interest and a residential remainder interest, wherein there is a terminal rent recovery period for the residential estate for years interest;
- controlling the processor to change the input data to produce a valuation of one of the components and to generate digital data representing documentation including the valuation, wherein the valuation reflects that there is a terminal rent recovery period for the residential estate for years interest, wherein the controlling includes forming the documentation as standardized documentation by obtaining at least one stored model document from computer-accessible memory; and
- producing the documentation at the output device.

42. The media of claim 41, wherein the media comprises at least one of a ROM, a disk, an ASIC, and a PROM.

43. The computer-readable media of any one of claims 41, 42, wherein the documentation includes a financial document.

44. An apparatus configured to manipulate data representing components temporally decomposed from residential property, the apparatus including:
- a computer system configured to receive input data representing components of temporally decomposed residential property, the components including a residential estate for years interest and a residential remainder interest, wherein at least one of the valuations reflects that there is a terminal rent recovery period for the residential estate for years interest, the computer system comprising:
- a processor programmed to manipulate the input data to produce a respective valuation of each of a plurality of the components and to generate digital data representing documentation including each respective valuation, wherein at least one of the valuations reflects that there is a terminal rent recovery period for the residential estate for years interest; and
- an output device to produce the documentation.

45. The apparatus of claim 44, wherein at least one of the valuations reflects that the residential estate for years interest is an augmented estate for years interest.

46. The apparatus of claim 44, wherein the residential property is a single-family dwelling.

47. The apparatus of claim 44, wherein at least one of the valuations reflects that one of the components includes a fractional interest in only one of a group of assets with two members, the group of assets comprising a contingent equity interest in the residential property that is a primary equity interest and a corresponding contingent equity interest in the residential property that is a secondary equity interest.

48. The apparatus of claim 44, wherein at least one of the valuations reflects that the residential estate for years is a term of years interest.

49. The apparatus of claim 44, wherein at least one of the valuations reflects that one of the components includes a fractional interest in only one of a contingent equity interest in the residential property that is a primary equity interest and a corresponding contingent equity interest in the residential property that is a secondary equity interest.

50. An apparatus configured to manipulate data representing a component temporally decomposed from residential property, the apparatus including:
- a computer system configured to receive input data including data representing a component of temporally decomposed residential property, wherein the component is one of a residential estate for years interest and a residential remainder interest, wherein there is a terminal rent recovery period for the residential estate for years interest, the computer system further comprising:
- a processor programmed to manipulate the data representing the component to produce a valuation of the component and to generate digital data representing documentation including the valuation, wherein the valuation reflects that there is a terminal rent recovery period for the residential estate for years interest; and
- an output device to produce the documentation.

51. The apparatus of claim 50, wherein at least one of the valuations reflects that the residential estate for years includes a term of years interest.

52. The apparatus of claim 50, wherein the residential property is a single-family dwelling.

53. The apparatus of claim 50, the apparatus further including:
- a second computer system configured to receive at least some of the documentation, the second computer system comprising:
- a second processor programmed to control the second computer system to change said at least some of the documentation to produce second digital data representing second documentation including an other valuation of an equity interest in one of the components; and
- a second output device to convert the second digital data into the second documentation including the other valuation.

54. The apparatus of any one of claims 1, 8, 15, 17, 50, 46, 47, wherein the terminal rent recovery period has a length of at least two years.

55. An apparatus configured to manipulate data representing a temporally decomposed component of residential property, the apparatus including:
- a computer system configured to receive input data representing a temporally decomposed component of residential property, the computer system comprising:
- a processor programmed to manipulate the input data to generate digital data representing documentation including a computed tax on the component, wherein temporally decomposed components of the residential property include a residential estate for years interest and a residential remainder interest, wherein there is a terminal rent recovery period for the residential estate for years interest; and
- an output device to produce the documentation including the tax.

56. An apparatus configured to manipulate data representing a temporally decomposed component of residential property, the apparatus including:
- a computer system configured to receive input data, the data representing a temporally decomposed component of residential property, wherein temporally decomposed components of the residential property include a residential estate for years interest and a residential remainder interest, wherein there is a terminal rent recovery period for the residential estate for years interest, the computer system further comprising:
- a processor programmed to manipulate the input data to generate digital data representing documentation including a computed tax on at least one of said components; and
- an output device to produce the documentation including the tax.

57. A method of using an apparatus to manipulate data representing a component temporally decomposed from residential property, the method including:
- receiving, by a computer system, input data, the computer system including a processor and an output device, the input data representing residential property, wherein the property is temporally decomposed into components including a residential estate for years interest and a residential remainder interest, wherein there is a terminal rent recovery period for the residential estate for years interest;
- manipulating the input data, by the processor, to compute a tax on one of the components and to generate digital data representing documentation including the tax; and
- converting, at the output device, the digital data into documentation including the tax.

58. The method of any one of claims 30, 31, 34-37, 57, wherein the documentation includes a financial document.

59. An apparatus configured to manipulate data representing a component temporally decomposed from residential property, the apparatus including:
- a computer system configured to receive input data representing a component of temporally decomposed residential property, the components of the residential property including a residential estate for years interest and a residential remainder interest, wherein there is a terminal rent recovery period for the residential estate for years interest, the computer system further comprising:

a processor programmed to manipulate the input data to compute a valuation of the component, wherein the valuation reflects that there is a terminal rent recovery period for the residential estate for years interest, and to generate digital data representing documentation including the valuation; and an output device to convert the digital data into documentation including the valuation.

* * * * *